United States Patent
Zhao et al.

(10) Patent No.: US 12,223,740 B2
(45) Date of Patent: Feb. 11, 2025

(54) IMAGE PROCESSING METHOD, NETWORK TRAINING METHOD, AND RELATED DEVICE

(71) Applicant: HUAWEI TECHNOLOGIES CO., LTD., Guangdong (CN)

(72) Inventors: Xinhai Zhao, Shanghai (CN); Zhen Yang, Shanghai (CN); Wei Zhang, London (GB)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 349 days.

(21) Appl. No.: 17/975,922

(22) Filed: Oct. 28, 2022

(65) Prior Publication Data

US 2023/0047094 A1  Feb. 16, 2023

Related U.S. Application Data

(63) Continuation of application No. PCT/CN2021/088263, filed on Apr. 20, 2021.

(30) Foreign Application Priority Data

Apr. 30, 2020 (CN) .......................... 202010366441.9

(51) Int. Cl.
  *G06T 7/73* (2017.01)
  *G06V 10/22* (2022.01)
  *G06V 20/58* (2022.01)

(52) U.S. Cl.
  CPC ............... *G06V 20/58* (2022.01); *G06T 7/73* (2017.01); *G06V 10/22* (2022.01); *G06T 2207/30261* (2013.01)

(58) Field of Classification Search
  CPC .......... G06V 10/22; G06V 20/58; G06T 7/73
  See application file for complete search history.

(56) References Cited

U.S. PATENT DOCUMENTS

2018/0144202 A1* 5/2018 Moosaei .............. G06V 20/584

OTHER PUBLICATIONS

Xu, Bin; Chen, Zhenzhong . (2018). [IEEE 2018 IEEE/CVF Conference on Computer Vision and Pattern Recognition (CVPR)—Salt Lake City, UT, USA (Jun. 18, 2018-Jun. 23, 2018)] 2018 IEEE/CVF Conference on Computer Vision and Pattern Recognition—Multi-level Fusion Based 3D Object Detection from Monocular Images. pp. 2345-2353. doi:10.1109/CVPR.2018.00249.

(Continued)

*Primary Examiner* — Sam Bhattacharya

(57) ABSTRACT

This application provides an image processing method, a network training method, and a related device, and relates to image processing technologies in the artificial intelligence field. The method includes: inputting a first image including a first vehicle into an image processing network to obtain a first result output by the image processing network, where the first result includes location information of a two-dimensional (2D) bounding frame of the first vehicle, coordinates of a wheel of the first vehicle, and a first angle of the first vehicle, and the first angle of the first vehicle indicates an included angle between a side line of the first vehicle and a first axis of the first image; and generating location information of a three-dimensional (3D) outer bounding box of the first vehicle based on the first result.

20 Claims, 19 Drawing Sheets

(56) References Cited

OTHER PUBLICATIONS

Li, Buyu; Ouyang, Wanli; Sheng, Lu; Zeng, Xingyu; Wang, Xiaogang. (2019). [IEEE 2019 IEEE/CVF Conference on Computer Vision and Pattern Recognition (CVPR)—Long Beach, CA, USA (Jun. 15, 2019-Jun. 20, 2019)] 2019 IEEE/CVF Conference on Computer Vision and Pattern Recognition (CVPR)—GS3D: An Efficient 3D Object Detection Framework for Autonomous Driving. pp. 1019-1028. doi:10.1109/cvpr.2019.00111.

J. Ku, A. D. Pon and S. L. Waslander, "Monocular 3D Object Detection Leveraging Accurate Proposals and Shape Reconstruction," 2019 IEEE/CVF Conference on Computer Vision and Pattern Recognition (CVPR), Long Beach, CA, USA, 2019, pp. 11859-11868, doi: 10.1109/CVPR.2019.01214.

Naiden, Andretti; Paunescu, Vlad; Kim, Gyeongmo; Jeon, ByeongMoon; Leordeanu, Marius . (2019). [IEEE 2019 IEEE International Conference on Image Processing (ICIP)—Taipei, Taiwan (Sep. 22, 2019-Sep. 25, 2019)] 2019 IEEE International Conference on Image Processing (ICIP)—Shift R-CNN: Deep Monocular 3D Object Detection With Closed-Form Geometric Constraints. pp. 61-65. doi: 10.1109/icip.2019.8803397.

Manhardt, Fabian; Kehl, Wadim; Gaidon, Adrien . (2019). [IEEE 2019 IEEE/CVF Conference on Computer Vision and Pattern Recognition (CVPR)—Long Beach, CA, USA (Jun. 15, 2019-Jun. 20, 2019)] 2019 IEEE/CVF Conference on Computer Vision and Pattern Recognition (CVPR)—ROI-10D: Monocular Lifting of 2D Detection to 6D Pose and Metric Shape. pp. 2064-2073. doi:10.1109/CVPR.2019.00217.

Zengyi Qin, Jinglu Wang, et al., "MonoGRNet: A Geometric ReasoningNetwork for Monocular 3D Object Localization."The Thirty-Third AAAI Conference on Artificial Intelligence. (AAAI-19), 2019, total 8 pages.

* cited by examiner

CONT. FROM FIG. 3B

↓

308 — The vehicle equipped with the image processing apparatus obtains coordinates of a vertex of the 3D outer bounding box of the first vehicle from coordinates of at least two first points

↓

309 — The vehicle equipped with the image processing apparatus generates coordinates of the centroid point of the first vehicle in a vehicle body coordinate system based on the coordinates of the vertex of the 3D outer bounding box of the first vehicle and a ground plane assumption principle

↓

310 — The vehicle equipped with the image processing apparatus generates dimensions of the first vehicle based on the coordinates of the first points and the ground plane assumption principle 311 — The vehicle equipped with the image processing apparatus obtains a second image, where the second image includes the first vehicle, and an image capturing angle of the second image is different from an image capturing angle of the first image

↓

312 — The vehicle equipped with the image processing apparatus obtains coordinates of at least two second points based on the second image by using the image processing network, where the at least two second points are all located on a side of the 3D outer bounding box of the first vehicle in the second image

↓

313 — The vehicle equipped with the image processing apparatus generates the dimensions of the first vehicle based on the coordinates of the first points and coordinates of second points

FIG. 3C

1115 — Thevehicle equipped with the image processing apparatus generates the orientation angle of the first rigid body relative to the vehicle equipped with the image processing apparatus based on the coordinates of the center point of the 2D bounding frame of the first rigid body and the pinhole imaging principle

CONT. FROM FIG. 11A

1114 — The vehicle equipped with the image processing apparatus determines whether the side face of the first rigid body is exposed in the third image No → 1115

Yes → 1116 — The vehicle equipped with the image processing apparatus generates the orientation angle of the first rigid body relative to the vehicle equipped with the image processing apparatus based on the coordinates of the third point according to a second calculation rule

CONT. FROM FIG. 11A

1105 — The vehicle equipped with the image processing apparatus determines whether a side face of the first rigid body is exposed in the third image Yes → 1107 — The vehicle equipped with the image processing apparatus generates the orientation angle of the first rigid body relative to the vehicle equipped with the image processing apparatus based on coordinates of a third point according to a first calculation rule

TO FIG. 11C

No → 1106 — The vehicle equipped with the image processing apparatus generates an orientation angle of the first rigid body relative to the vehicle equipped with the image processing apparatus based on coordinates of the center point of a 2D bounding frame of the first rigid body and a pinhole imaging principle

IMAGE PROCESSING METHOD, NETWORK TRAINING METHOD, AND RELATED DEVICE

CROSS-REFERENCE TO RELATED APPLICATIONS

This application is a continuation of International Application No. PCT/CN2021/088263, filed on Apr. 20, 2021, which claims priority to Chinese Patent Application No. 202010366441.9, filed on Apr. 30, 2020. The disclosures of the aforementioned applications are hereby incorporated by reference in their entireties.

TECHNICAL FIELD

This application relates to the artificial intelligence field, and in particular, to an image processing method, a network training method, and a related device.

BACKGROUND

Artificial intelligence (AI) is a theory, method, technology, and application system that simulates, extends, and expands human intelligence, perceives an environment, obtains knowledge, and uses the knowledge to obtain an optimal result by using a digital computer or a digital computer-controlled machine. In other words, artificial intelligence is a branch of computer science, and is intended to understand the essence of intelligence and produce a new intelligent machine that can react in a manner similar to human intelligence. Artificial intelligence is to study design principles and implementation methods of various intelligent machines, so that the machines have perception, inference, and decision-making functions. Research in the artificial intelligence field include robots, natural language processing, computer vision, decision-making and inference, human-computer interaction, recommendation and search, an AI basic theory, and the like.

Autonomous driving is a mainstream application in the artificial intelligence field. Currently, in the autonomous driving field, after capturing a complete image of a surrounding vehicle, a vehicle equipped with an image processing apparatus may output information such as an orientation angle and dimensions of the vehicle in a vehicle body coordinate system based on the complete vehicle in the image by using a neural network, to locate a 3D outer bounding box of the vehicle.

However, if the vehicle in the image of the surrounding vehicle captured by the vehicle equipped with the image processing apparatus is incomplete, the information output by the neural network has a large error, resulting in low accuracy of the located 3D outer bounding box. Therefore, a solution for improving accuracy of the obtained 3D outer bounding box urgently needs to be launched.

SUMMARY

Embodiments of this application provide an image processing method, a network training method, and a related device. Location information of a three-dimensional (3D) outer bounding box of a first vehicle is generated based on three parameters: location information of a two-dimensional bounding frame of a second vehicle, coordinates of a wheel, and a first angle, thereby improving accuracy of the obtained 3D outer bounding box.

To resolve the foregoing technical problem, embodiments of this application provide the following technical solutions:

According to a first aspect, an embodiment of this application provides an image processing method, and the method may be applied to the image processing field in the artificial intelligence field. The method includes: An execution device obtains a first image, where the first image includes a first vehicle. The execution device inputs the first image into an image processing network to obtain a first result output by the image processing network. When a side face of the first vehicle is exposed in the first image, the first result includes location information of a two-dimensional (2D) bounding frame of the first vehicle, coordinates of a wheel of the first vehicle, and a first angle of the first vehicle. Further, the location information of the 2D bounding frame of the first vehicle may include coordinates of the central point of the 2D bounding frame and side lengths of the 2D bounding frame. The coordinates of the wheel of the first vehicle may be coordinates of a location found on an outer side of the wheel, coordinates of a location found on an inner side of the wheel, or coordinates of a location found in the middle of a wheel thickness. The first angle of the first vehicle indicates an included angle between a side line of the first vehicle and a first axis of the first image. The side line of the first vehicle is an intersection line between the exposed side face of the first vehicle and the ground plane on which the first vehicle is located. The first axis of the first image is parallel to one side of the first image. The first axis may be parallel to a U axis of the first image, or may be parallel to a V axis of the first image. A value range of the first angle may be 0 degrees to 360 degrees, or may be negative 180 degrees to positive 180 degrees. The execution device generates location information of a three-dimensional 3D outer bounding box of the first vehicle based on the location information of the 2D bounding frame of the first vehicle, the coordinates of the wheel, and the first angle. The location information of the 3D outer bounding box of the first vehicle includes coordinates of at least two first points, the at least two first points are all located on a side of the 3D outer bounding box of the first vehicle, two first points in the at least two first points are used to locate the side of the 3D outer bounding box of the first vehicle, and the coordinates of the at least two first points are used to locate the 3D outer bounding box of the first vehicle.

In this implementation, the obtained image is input into the image processing network, and the image processing network outputs the location information of the two-dimensional bounding frame of the vehicle, the coordinates of the wheel, and the first angle. The location information of the three-dimensional 3D outer bounding box of the first vehicle is generated based on the location information of the two-dimensional bounding frame, the coordinates of the wheel, and the first angle, to locate the 3D outer bounding box of the vehicle. Accuracy of the three parameters: the location information of the two-dimensional bounding frame, the coordinates of the wheel, and the first angle is irrelevant to whether the vehicle in the image is complete. Therefore, regardless of whether the vehicle in the image is complete, the obtained coordinates of the first points are accurate, and accuracy of the located 3D outer bounding box is high, in other words, accuracy of the obtained 3D outer bounding box is improved. Further, a driving intent of a surrounding vehicle can be more accurately determined, thereby improving driving safety of an autonomous vehicle.

In a possible implementation of the first aspect, when only the side face of the first vehicle is exposed in the first image, the at least two first points include two intersection points between the side line of the first vehicle and the 2D bounding frame of the first vehicle. Further, the at least two first points include an intersection point between the side line of the first vehicle and a left boundary of the 2D bounding frame of the first wheel, and an intersection point between the side line of the first vehicle and a right boundary of the 2D bounding frame of the first wheel. In this implementation, when only the side face of the first vehicle is exposed in the first image, the first point is an intersection point between the side line of the first vehicle and the 2D bounding frame. This refines a specific representation form of the first point in a specific scenario, and improves a degree of integration with an application scenario.

In a possible implementation of the first aspect, that the execution device generates location information of a 3D outer bounding box of the first vehicle based on the location information of the 2D bounding frame, the coordinates of the wheel, and the first angle may include: The execution device generates location information of the side line of the first vehicle based on the coordinates of the wheel of the first vehicle and the first angle of the first vehicle, where the location information of the side line of the first vehicle may be a straight line equation of the side line of the first vehicle. The execution device generates coordinates based on the location information of the side line of the first vehicle and the location information of the 2D bounding frame of the first vehicle, to obtain the coordinates of the at least two first points. Specifically, the execution device may determine locations of the left boundary and the right boundary of the 2D bounding frame of the first vehicle based on the location information of the 2D bounding frame of the first vehicle, and generate coordinates of the intersection point between the side line and the left boundary and coordinates of the intersection point between the side line and the right boundary based on the straight line equation of the side line of the first vehicle. In this implementation, a vehicle equipped with an image processing apparatus may generate the location information of the side line of the first vehicle based on the coordinates of the wheel of the first vehicle and the first angle. This operation is simple, easy to implement, and has high accuracy.

In a possible implementation of the first aspect, when the side face and a main face of the first vehicle are exposed in the first image, the first result further includes location information of a boundary of the first vehicle and a second angle of the first vehicle. The boundary is a boundary between the side face and the main face, and the main face of the first vehicle is a front face or rear face of the first vehicle. The second angle of the first vehicle indicates an included angle between a main side line of the first vehicle and the first axis of the first image. The main side line of the first vehicle is an intersection line between the exposed main face of the first vehicle and the ground plane on which the first vehicle is located. A value range of the second angle may be 0 degrees to 360 degrees, or may be negative 180 degrees to positive 180 degrees. The at least two first points include a first intersection point, a second intersection point, and a third intersection point. The first intersection point is an intersection point between the side line of the first vehicle and the boundary of the first vehicle, and the first intersection point is a vertex of the 3D outer bounding box of the first vehicle. The second intersection point is an intersection point between the side line of the first vehicle and the 2D bounding frame of the first vehicle. The third intersection point is an intersection point between the main side line of the first vehicle and the 2D bounding frame of the first vehicle.

In this implementation, a specific representation form of the first point in a case in which only the side face of the first vehicle is exposed in the first image is provided, and a specific representation form of the first point in a case in which the side face and the main face of the first vehicle are exposed in the first image is provided. This enriches application scenarios of this solution, and improves implementation flexibility.

In a possible implementation of the first aspect, the boundary of the first vehicle passes through a contour of a vehicle light of the first vehicle, or the boundary of the first vehicle passes through the center point of a vehicle light of the first vehicle, or the boundary of the first vehicle passes through an intersection point between the side line of the first vehicle and the main side line of the first vehicle. In this implementation, several specific implementations of the location information of the boundary are provided, thereby facilitating selection of this solution.

In a possible implementation of the first aspect, that the execution device generates location information of a three-dimensional (3D) outer bounding box of the first vehicle based on the location information of the 2D bounding frame of the first vehicle, the coordinates of the wheel, and the first angle may include: The execution device generates location information of the side line of the first vehicle based on the coordinates of the wheel of the first vehicle and the first angle of the first vehicle. The execution device generates coordinates of the first intersection point based on the location information of the side line of the first vehicle and the location information of the boundary of the first vehicle. The execution device generates coordinates of the second intersection point based on the location information of the side line of the first vehicle and the location information of the 2D bounding frame of the first vehicle. The execution device generates location information of the main side line of the first vehicle based on the coordinates of the first intersection point and the second angle of the first vehicle. The location information of the main side line of the first vehicle may be specifically a straight line equation of the main side line of the first vehicle. Coordinates of the third intersection point are generated based on the location information of the main side line of the first vehicle and the location information of the 2D bounding frame of the first vehicle. In this implementation, an implementation of generating coordinates of a plurality of first points when the side face and the main face of the first vehicle are exposed in the first image is provided. This operation is simple, easy to implement, and has high accuracy.

In a possible implementation of the first aspect, when only the main face of the first vehicle is exposed in the first image, the first result includes the location information of the 2D bounding frame of the first vehicle. The main face includes the front face or rear face, and the location information of the 2D bounding frame includes the coordinates of the central point of the 2D bounding frame.

In a possible implementation of the first aspect, the first result may further include indication information of an exposed face of the first vehicle in the first image. The exposed face includes one or more of the following: the side face, the front face, and the rear face, and the side face includes a left face and a right face. The indication information of the exposed face may be specifically represented as a number sequence or a character string.

In a possible implementation of the first aspect, the method may further include: The execution device generates three-dimensional feature information of the first vehicle based on the coordinates of the at least two first points. The three-dimensional feature information of the first vehicle includes one or more of the following: an orientation angle of the first vehicle relative to the vehicle equipped with the image processing apparatus, location information of the centroid point of the first vehicle, and dimensions of the first vehicle.

In a possible implementation of the first aspect, the method further includes: The execution device generates the orientation angle of the first vehicle relative to the vehicle equipped with the image processing apparatus based on coordinates of a first point when the side face of the first vehicle is exposed in the first image. A case in which the side face of the first vehicle is exposed in the first image includes a case in which only the side face of the first vehicle is exposed in the first image, and a case in which both the side face and the main face of the first vehicle are exposed in the first image. In this implementation, after the coordinates of the first point are obtained, the orientation angle of the first vehicle relative to the vehicle equipped with the image processing apparatus may be further generated based on the coordinates of the first point, to improve accuracy of the obtained orientation angle.

In a possible implementation of the first aspect, before the execution device generates the orientation angle based on the coordinates of the first point, the method may further include: The execution device generates a distance between the first point and the vehicle equipped with the image processing apparatus based on the coordinates of the first point and a ground plane assumption principle. That the execution device generates the orientation angle based on coordinates of a first point may include: when it is determined, based on the distance between the first point and the vehicle equipped with the image processing apparatus, that a distance between the first vehicle and the vehicle equipped with the image processing apparatus does not exceed a preset threshold, generating the orientation angle based on the coordinates of the first point according to a first calculation rule, where a value of the preset threshold may be 10 meters, 15 meters, 30 meters, or 25 meters; or when it is determined, based on the distance between the first point and the vehicle equipped with the image processing apparatus, that a distance between the first vehicle and the vehicle equipped with the image processing apparatus exceeds a preset threshold, generating the orientation angle based on the coordinates of the first point according to a second calculation rule, where the second calculation rule and the first calculation rule are different. In this implementation, for the two cases in which the distance between the first vehicle and the vehicle equipped with the image processing apparatus exceeds the preset threshold and the distance between the first vehicle and the vehicle equipped with the image processing apparatus does not exceed the preset threshold, different calculation rules are respectively used to generate the orientation angle of the first vehicle, thereby further improving the accuracy of the generated orientation angle.

In a possible implementation of the first aspect, when a distance between any one of the at least two first points and the vehicle equipped with the image processing apparatus does not exceed the preset threshold, it is considered that the distance between the first vehicle and the vehicle equipped with the image processing apparatus does not exceed the preset threshold; or when a distance between any one of the at least two first points and the vehicle equipped with the image processing apparatus exceeds the preset threshold, it is considered that the distance between the first vehicle and the vehicle equipped with the image processing apparatus exceeds the preset threshold. In this implementation, two specific implementations of determining whether the distance between the first vehicle and the vehicle equipped with the image processing apparatus exceeds the preset threshold are provided, thereby improving implementation flexibility of this solution.

In a possible implementation of the first aspect, that the execution device generates the orientation angle based on the coordinates of the first point according to a first calculation rule may include: The execution device generates three-dimensional coordinates of the first point in a vehicle body coordinate system based on the coordinates of the first point and the ground plane assumption principle. A coordinate system origin of the vehicle body coordinate system is located inside the vehicle equipped with the image processing apparatus. The coordinate system origin of the vehicle body coordinate system may be a midpoint of a connection line between two back wheels of the vehicle equipped with the image processing apparatus, or the coordinate system origin of the vehicle body coordinate system may be the centroid point of the vehicle equipped with the image processing apparatus. The execution device generates the orientation angle based on the three-dimensional coordinates of the first point. In this implementation, regardless of whether the first vehicle in the first image is complete, accurate coordinates of the first point can be obtained. Because the orientation angle is generated based on the coordinates of the first point and the ground plane assumption principle, accuracy of the generated orientation angle is ensured.

In a possible implementation of the first aspect, that the execution device generates the orientation angle based on the coordinates of the first point according to a second calculation rule may include: The execution device generates the location information of the side line of the first vehicle based on the coordinates of the first point and the first angle of the first vehicle, and generates coordinates of a vanishing point based on the location information of the side line of the first vehicle and location information of a vanishing line of the first image, where the vanishing point is an intersection point between the side line of the first vehicle and the vanishing line of the first image. The execution device generates the orientation angle based on the coordinates of the vanishing point and a two-point perspective principle. Specifically, after obtaining the coordinates of the vanishing point, the vehicle equipped with the image processing apparatus generates an orientation angle of the first vehicle in a camera coordinate system based on the coordinates of the vanishing point and the two-point perspective principle, and then generates an orientation angle of the first vehicle in a vehicle body coordinate system of the vehicle equipped with the image processing apparatus based on the orientation angle of the first vehicle in the camera coordinate system and a second transformation relationship. The second transformation relationship is a conversion relationship between the camera coordinate system and the vehicle body coordinate system, and the second transformation relationship may also be referred to as an extrinsic parameter of a camera. In this implementation, a specific implementation of generating the orientation angle of the first vehicle when the distance between the first vehicle and the vehicle equipped with the image processing apparatus exceeds the preset threshold and the side face of the first vehicle is exposed in the first image is provided. This operation is simple, and has high efficiency.

In a possible implementation of the first aspect, that the execution device generates the orientation angle based on the coordinates of the first point according to a second calculation rule may include: The execution device generates a mapping relationship between the first angle of the first vehicle and the orientation angle based on the coordinates of the first point, the first angle of the first vehicle, and a pinhole imaging principle, and generates the orientation angle based on the mapping relationship and the first angle of the first vehicle. In this implementation, for the case in which the distance between the first vehicle and the vehicle equipped with the image processing apparatus exceeds the preset threshold, two implementations of obtaining the orientation angle are provided, thereby improving implementation flexibility of this solution.

In a possible implementation of the first aspect, the method may further include: When only the main face of the first vehicle is exposed in the first image, the execution device generates the orientation angle based on the coordinates of the central point of the 2D bounding frame of the first vehicle and the pinhole imaging principle.

In a possible implementation of the first aspect, the method may further include: The execution device obtains coordinates of a vertex of the 3D outer bounding box of the first vehicle from the coordinates of the at least two first points, and generates three-dimensional coordinates of the centroid point of the first vehicle in a vehicle body coordinate system based on the coordinates of the vertex of the 3D outer bounding box of the first vehicle and a ground plane assumption principle. A coordinate system origin of the vehicle body coordinate system is located inside the vehicle equipped with the image processing apparatus. In this implementation, based on the coordinates of the first point, the orientation angle of the first vehicle can be generated, and the three-dimensional coordinates of the centroid point of the first vehicle in the vehicle body coordinate system can be generated, thereby extending an application scenario of this solution. In addition, accuracy of the generated three-dimensional coordinates of the centroid point is improved.

In a possible implementation of the first aspect, the method may further include: presetting, on the execution device, a first value range of a U-axis direction of the first image and a second value range of a V-axis direction of the first image. After obtaining coordinates of one first point, the execution device determines whether a value of a U-axis direction in the coordinates of the first point falls within the first value range, and determines whether a value of a V-axis direction in the coordinates of the first point falls within the second value range. If the value of the U-axis direction in the coordinates of the first point falls within the first value range, and the value of the V-axis direction in the coordinates of the first point falls within the second value range, the execution device determines that the first point is a vertex of the 3D outer bounding box of the first vehicle.

In a possible implementation of the first aspect, the method may further include: The execution device obtains coordinates of a first vertex from the coordinates of the at least two first points, where the first vertex is a vertex of the 3D outer bounding box of the first vehicle. The execution device generates three-dimensional coordinates of the first vertex in a vehicle body coordinate system based on the coordinates of the first vertex and a ground plane assumption principle. If the at least two first points include at least two first vertices, the execution device generates one or more of the following based on three-dimensional coordinates of the first vertices in the vehicle body coordinate system: a length of the first vehicle, a width of the first vehicle, and a height of the first vehicle. A coordinate system origin of the vehicle body coordinate system is located inside the vehicle equipped with the image processing apparatus. In this implementation, dimensions of the first vehicle may be further generated based on the coordinates of the first points, thereby further extending an application scenario of this solution. In addition, accuracy of the generated dimensions of the first vehicle is improved.

In a possible implementation of the first aspect, the method may further include: If the at least two first points include one first vertex, the execution device obtains a second image, where the second image includes the first vehicle. An image capturing angle of the second image is different from an image capturing angle of the first image. The execution device obtains coordinates of at least two second points based on the second image by using the image processing network. The at least two second points are all located on a side of the three-dimensional (3D) outer bounding box of the first vehicle, two second points in the at least two second points are used to locate the side of the 3D outer bounding box of the first vehicle, and the coordinates of the at least two second points are used to locate the 3D outer bounding box of the first vehicle. The execution device generates three-dimensional coordinates of a second vertex in the vehicle body coordinate system based on coordinates of a second point and the ground plane assumption principle. The second vertex is a vertex of the 3D outer bounding box of the first vehicle, and the second vertex and the first vertex are different. The execution device generates one or more of the following based on the three-dimensional coordinates of the first vertex and the three-dimensional coordinates of the second vertex: the length of the first vehicle, the width of the first vehicle, and the height of the first vehicle. In this implementation, when the dimensions of the first vehicle cannot be generated by using one image of the first vehicle, another image of the first vehicle is used to jointly generate the dimensions of the first vehicle. This ensures that the dimensions of the first vehicle can be generated in all cases, thereby improving comprehensiveness of this solution.

A second aspect of embodiments of this application provides an image processing method, and the method may be applied to the image processing field in the artificial intelligence field. The method includes: An execution device obtains a first image, where the first image includes a first vehicle. The execution device obtains location information of a three-dimensional (3D) outer bounding box of the first vehicle based on the first image by using an image processing network. The execution device generates three-dimensional feature information of the first vehicle based on the location information of the three-dimensional (3D) outer bounding box of the first vehicle. The three-dimensional feature information of the first vehicle includes one or more of the following: an orientation angle of the first vehicle relative to a vehicle equipped with an image processing apparatus, location information of the centroid point of the first vehicle, and dimensions of the first vehicle.

In a possible implementation of the second aspect, the location information of the 3D outer bounding box of the first vehicle includes coordinates of at least two first points, the at least two first points are all located on a side of the three-dimensional (3D) outer bounding box of the first vehicle, two first points in the at least two first points are used to locate the side of the 3D outer bounding box of the first vehicle, and the coordinates of the at least two first points are used to locate the 3D outer bounding box of the first vehicle.

In a possible implementation of the second aspect, that the execution device obtains location information of a three-dimensional (3D) outer bounding box of the first vehicle based on the first image by using an image processing network includes: The execution device inputs the first image into the image processing network to obtain a first result output by the image processing network. When a side face of the first vehicle is exposed in the first image, the first result includes location information of a two-dimensional (2D) bounding frame of the first vehicle, coordinates of a wheel of the first vehicle, and a first angle of the first vehicle. The first angle of the first vehicle indicates an included angle between a side line of the first vehicle and a first axis of the first image. The side line of the first vehicle is an intersection line between the exposed side face of the first vehicle and the ground plane on which the first vehicle is located. The first axis of the first image is parallel to one side of the first image. The execution device generates coordinates based on the location information of the 2D bounding frame of the first vehicle, the coordinates of the wheel, and the first angle, to obtain the coordinates of the at least two first points.

In a possible implementation of the second aspect, when only the side face of the first vehicle is exposed in the first image, the at least two first points include two intersection points between the side line of the first vehicle and the 2D bounding frame of the first vehicle.

In a possible implementation of the second aspect, that the execution device generates the location information of the 3D outer bounding box of the first vehicle based on the location information of the 2D bounding frame, the coordinates of the wheel, and the first angle includes: The execution device generates location information of the side line of the first vehicle based on the coordinates of the wheel of the first vehicle and the first angle of the first vehicle. The execution device generates the coordinates based on the location information of the side line of the first vehicle and the location information of the 2D bounding frame of the first vehicle, to obtain the coordinates of the at least two first points.

In a possible implementation of the second aspect, when the side face and a main face of the first vehicle are exposed in the first image, the first result further includes location information of a boundary of the first vehicle and a second angle of the first vehicle. The boundary is a boundary between the side face and the main face, and the main face of the first vehicle is a front face or rear face of the first vehicle. The second angle of the first vehicle indicates an included angle between a main side line of the first vehicle and the first axis of the first image. The main side line of the first vehicle is an intersection line between the exposed main face of the first vehicle and the ground plane on which the first vehicle is located. The at least two first points include a first intersection point, a second intersection point, and a third intersection point. The first intersection point is an intersection point between the side line of the first vehicle and the boundary of the first vehicle, and the first intersection point is a vertex of the 3D outer bounding box of the first vehicle. The second intersection point is an intersection point between the side line of the first vehicle and the 2D bounding frame of the first vehicle. The third intersection point is an intersection point between the main side line of the first vehicle and the 2D bounding frame of the first vehicle.

In a possible implementation of the second aspect, that the execution device generates the location information of the three-dimensional (3D) outer bounding box of the first vehicle based on the location information of the 2D bounding frame of the first vehicle, the coordinates of the wheel, and the first angle includes: The execution device generates location information of the side line of the first vehicle based on the coordinates of the wheel of the first vehicle and the first angle of the first vehicle. The execution device generates coordinates of the first intersection point based on the location information of the side line of the first vehicle and the location information of the boundary of the first vehicle. The execution device generates coordinates of the second intersection point based on the location information of the side line of the first vehicle and the location information of the 2D bounding frame of the first vehicle. The execution device generates location information of the main side line of the first vehicle based on the coordinates of the first intersection point and the second angle of the first vehicle. The execution device generates coordinates of the third intersection point based on the location information of the main side line of the first vehicle and the location information of the 2D bounding frame of the first vehicle.

In a possible implementation of the second aspect, the method further includes: The execution device generates the orientation angle of the first vehicle relative to the vehicle equipped with the image processing apparatus based on coordinates of a first point when the side face of the first vehicle is exposed in the first image.

In a possible implementation of the second aspect, before the execution device generates the orientation angle based on the coordinates of the first point, the method further includes: The execution device generates a distance between the first point and the vehicle equipped with the image processing apparatus based on the coordinates of the first point and a ground plane assumption principle. That the execution device generates the orientation angle based on coordinates of a first point includes: When determining, based on the distance between the first point and the vehicle equipped with the image processing apparatus, that a distance between the first vehicle and the vehicle equipped with the image processing apparatus does not exceed a preset threshold, the execution device generates the orientation angle based on the coordinates of the first point according to a first calculation rule; or when determining, based on the distance between the first point and the vehicle equipped with the image processing apparatus, that a distance between the first vehicle and the vehicle equipped with the image processing apparatus exceeds a preset threshold, the execution device generates the orientation angle based on the coordinates of the first point according to a second calculation rule, where the second calculation rule and the first calculation rule are different.

In a possible implementation of the second aspect, when a distance between any one of the at least two first points and the vehicle equipped with the image processing apparatus does not exceed the preset threshold, it is considered that the distance between the first vehicle and the vehicle equipped with the image processing apparatus does not exceed the preset threshold; or when a distance between any one of the at least two first points and the vehicle equipped with the image processing apparatus exceeds the preset threshold, it is considered that the distance between the first vehicle and the vehicle equipped with the image processing apparatus exceeds the preset threshold.

In a possible implementation of the second aspect, that the execution device generates the orientation angle based on the coordinates of the first point according to a first calculation rule includes: generating three-dimensional coordinates of the first point in a vehicle body coordinate system based on the coordinates of the first point and the ground plane assumption principle, where a coordinate system origin of the vehicle body coordinate system is located inside the vehicle equipped with the image processing apparatus;

and generating the orientation angle based on the three-dimensional coordinates of the first point.

In a possible implementation of the second aspect, that the execution device generates the orientation angle based on the coordinates of the first point according to a second calculation rule includes: generating the location information of the side line of the first vehicle based on the coordinates of the first point and the first angle of the first vehicle; generating coordinates of a vanishing point based on the location information of the side line of the first vehicle and location information of a vanishing line of the first image, where the vanishing point is an intersection point between the side line of the first vehicle and the vanishing line of the first image; and generating the orientation angle based on the coordinates of the vanishing point and a two-point perspective principle.

In a possible implementation of the second aspect, that the execution device generates the orientation angle based on the coordinates of the first point according to a second calculation rule includes: generating a mapping relationship between the first angle of the first vehicle and the orientation angle based on the coordinates of the first point, the first angle of the first vehicle, and a pinhole imaging principle; and generating the orientation angle based on the mapping relationship and the first angle of the first vehicle.

In a possible implementation of the second aspect, the method further includes: The execution device obtains coordinates of a vertex of the 3D outer bounding box of the first vehicle from the coordinates of the at least two first points, and generates three-dimensional coordinates of the centroid point of the first vehicle in a vehicle body coordinate system based on the coordinates of the vertex of the 3D outer bounding box of the first vehicle and a ground plane assumption principle. A coordinate system origin of the vehicle body coordinate system is located inside the vehicle equipped with the image processing apparatus.

In a possible implementation of the second aspect, the method further includes: The execution device obtains coordinates of a first vertex from the coordinates of the at least two first points, where the first vertex is a vertex of the 3D outer bounding box of the first vehicle. The execution device generates three-dimensional coordinates of the first vertex in a vehicle body coordinate system based on the coordinates of the first vertex and a ground plane assumption principle. If the at least two first points include at least two first vertices, the execution device generates one or more of the following based on three-dimensional coordinates of the first vertices in the vehicle body coordinate system: a length of the first vehicle, a width of the first vehicle, and a height of the first vehicle. A coordinate system origin of the vehicle body coordinate system is located inside the vehicle equipped with the image processing apparatus.

In a possible implementation of the second aspect, the method further includes: If the at least two first points include one first vertex, the execution device obtains a second image, where the second image includes the first vehicle. An image capturing angle of the second image is different from an image capturing angle of the first image. The execution device obtains coordinates of at least two second points based on the second image by using the image processing network. The at least two second points are all located on a side of the three-dimensional (3D) outer bounding box of the first vehicle, two second points in the at least two second points are used to locate the side of the 3D outer bounding box of the first vehicle, and the coordinates of the at least two second points are used to locate the 3D outer bounding box of the first vehicle. The execution device generates three-dimensional coordinates of a second vertex in the vehicle body coordinate system based on coordinates of a second point and the ground plane assumption principle. The second vertex is a vertex of the 3D outer bounding box of the first vehicle, and the second vertex and the first vertex are different. The execution device generates one or more of the following based on the three-dimensional coordinates of the first vertex and the three-dimensional coordinates of the second vertex: the length of the first vehicle, the width of the first vehicle, and the height of the first vehicle.

For specific implementation steps of the second aspect and the possible implementations of the second aspect of embodiments of this application and beneficial effects brought by each possible implementation, refer to descriptions in the possible implementations of the first aspect. Details are not described herein again.

According to a third aspect, an embodiment of this application provides an image processing method, and the method may be applied to the image processing field in the artificial intelligence field. The method includes: An execution device obtains a third image, where the third image includes a first rigid body, and the first rigid body is a cube. The execution device inputs the third image into an image processing network to obtain a second result output by the image processing network. When a side face of the first rigid body is exposed in the third image, the second result includes location information of a 2D bounding frame of the first rigid body and a first angle of the first rigid body. The first angle of the first rigid body indicates an included angle between a side line of the first rigid body and a first axis of the third image. The side line of the first rigid body is an intersection line between the exposed side face of the first rigid body and the plane on which the first rigid body is located. The first axis of the third image is parallel to one side of the third image. The execution device generates location information of a three-dimensional (3D) outer bounding box of the first rigid body based on the location information of the 2D bounding frame of the first rigid body and the first angle. The location information of the 3D outer bounding box of the first rigid body includes coordinates of at least two third points, the at least two third points are all located on a side of the 3D outer bounding box of the first rigid body, two third points in the at least two third points are used to locate the side of the 3D outer bounding box of the first rigid body, and the coordinates of the at least two third points are used to locate the 3D outer bounding box of the first rigid body.

In a possible implementation of the third aspect of this application, that the execution device generates location information of a three-dimensional (3D) outer bounding box of the first rigid body based on the location information of the 2D bounding frame of the first rigid body and the first angle may include: When only the side face of the first rigid body is exposed in the third image, a vehicle equipped with an image processing apparatus may generate coordinates of a vertex in a lower left corner and/or coordinates of a vertex in a lower right corner of the 2D bounding frame of the first rigid body based on the location information of the 2D bounding frame of the first rigid body, to replace the coordinates of the wheel in the first result of the first aspect. The vehicle equipped with the image processing apparatus generates the location information of the three-dimensional (3D) outer bounding box of the first rigid body based on the coordinates of the vertex in the lower left corner and/or the coordinates of the vertex in the lower right corner of the 2D bounding frame of the first rigid body, the location information of the 2D bounding frame of the first rigid body, and the first angle.

In a possible implementation of the third aspect of this application, when the side face and a main face of the first rigid body are exposed in the third image, the second result may further include location information of a boundary of the first rigid body. A vehicle equipped with an image processing apparatus may generate one or more pieces of the following coordinate information based on the location information of the 2D bounding frame of the first rigid body and the location information of the boundary of the first rigid body: coordinates of an intersection point between the boundary of the first rigid body and a bottom side of the 2D bounding frame of the first rigid body, coordinates of a vertex in a lower left corner of the 2D bounding frame of the first rigid body, and coordinates of a vertex in a lower right corner of the 2D bounding frame of the first rigid body, to replace the coordinates of the wheel in the first result of the first aspect. The vehicle equipped with the image processing apparatus generates the location information of the three-dimensional (3D) outer bounding box of the first rigid body based on the generated coordinate information, the location information of the 2D bounding frame of the first rigid body, and the first angle.

In a possible implementation of the third aspect of this application, when only the side face of the first rigid body is exposed in the third image, the second result may further include coordinates of a vertex in a lower left corner of the 2D bounding frame of the first rigid body and/or coordinates of a vertex in a lower right corner of the 2D bounding frame of the first rigid body, to replace the coordinates of the wheel in the first result of the first aspect. When the main face and the side face of the first rigid body are exposed in the third image, the second result may further include one or more of the following: coordinates of an intersection point between a boundary of the first rigid body and a bottom side of the 2D bounding frame, the coordinates of the vertex in the lower left corner of the 2D bounding frame of the first rigid body, and the coordinates of the vertex in the lower right corner of the 2D bounding frame of the first rigid body, to replace the coordinates of the wheel in the first result of the first aspect.

In the third aspect of this application, the execution device may further perform steps in the possible implementations of the first aspect. For specific implementation steps of the third aspect and the possible implementations of the third aspect of embodiments of this application and beneficial effects brought by each possible implementation, refer to descriptions in the possible implementations of the first aspect. Details are not described herein again.

According to a fourth aspect, an embodiment of this application provides a network training method, and the method may be applied to the image processing field in the artificial intelligence field. The method may include: A training device obtains a training image and labeled data of the training image, where the training image includes a second vehicle. When a side face of the second vehicle is exposed in the training image, the labeled data includes labeled coordinates of a wheel of the second vehicle and a first labeled angle of the second vehicle. A first angle of the second vehicle indicates an included angle between a side line of the second vehicle and a first axis of the training image. The side line of the second vehicle is an intersection line between the exposed side face of the second vehicle and the ground plane on which the second vehicle is located. The first axis of the training image is parallel to one side of the training image. The training device inputs the training image into an image processing network to obtain a third result output by the image input network, where the third result includes generated coordinates of the wheel of the second vehicle and a first generated angle of the second vehicle. The training device trains the image processing network based on the labeled data and the third result by using a loss function until a convergence condition of the loss function is met. The training device outputs a trained image processing network, where the loss function is used to shorten similarity between the generated coordinates and the labeled coordinates, and shorten similarity between the first generated angle and the first labeled angle. In this implementation, accuracy of three parameters: location information of a two-dimensional bounding frame, coordinates of the wheel, and a first angle is irrelevant to whether the vehicle in the image is complete. Therefore, regardless of whether the vehicle in the image is complete, the trained image processing network can output accurate information. This helps improve stability of the image processing network. In addition, a rule of labeling the location information of the two-dimensional bounding frame, the coordinates of the wheel, and the first angle is simple. Compared with a current manner of labeling the training data by using a laser radar, difficulty in a training data labeling process is greatly reduced.

In a possible implementation of the fourth aspect, when the side face and a main face of the second vehicle are exposed in the training image, the labeled data further includes labeled location information of a boundary of the second vehicle and a second labeled angle of the second vehicle. The third result further includes generated location information of the boundary of the second vehicle and a second generated angle of the second vehicle. The loss function is further used to shorten similarity between the generated location information and the labeled location information, and shorten similarity between the second generated angle and the second labeled angle. The main face of the second vehicle is a front face or rear face of the second vehicle, and the boundary is a boundary between the side face and the main face. A second angle of the second vehicle indicates an included angle between a main side line of the second vehicle and the first axis of the training image, and the main side line of the second vehicle is an intersection line between the exposed main face of the second vehicle and the ground plane on which the second vehicle is located.

In a possible implementation of the fourth aspect, the image processing network includes a two-stage detection network and a three-dimensional feature extraction network, and the two-stage detection network includes a region proposal network. That the training device inputs the training image into an image processing network to obtain a third result output by the image input network includes: The training device inputs the training image into the two-stage detection network, to obtain the location information that is of the 2D bounding frame of the second vehicle and that is output by the region proposal network in the two-stage detection network. The training device inputs a first feature map into the three-dimensional feature extraction network to obtain the third result output by the three-dimensional feature extraction network. The first feature map is a feature map that is in feature maps of the training image and that is located in the 2D bounding frame output by the region proposal network. That the training device outputs a trained image processing network includes: The training device outputs the image processing network including the two-stage detection network and the three-dimensional feature extraction network.

In this implementation, accuracy of the 2D bounding frame directly output by the region proposal network is low, in other words, precision of the first feature map obtained based on the 2D bounding frame directly output by the region proposal network is low. Therefore, this helps increase difficulty in a training phase, and further improves robustness of the trained image processing network.

For specific meanings of nouns in the fourth aspect and the possible implementations of the fourth aspect in embodiments of this application, refer to descriptions in the possible implementations of the first aspect. Details are not described herein again.

According to a fifth aspect, an embodiment of this application provides an image processing apparatus, and the apparatus may be applied to the image processing field in the artificial intelligence field. The apparatus includes an obtaining module, an input module and a generation module. The obtaining module is configured to obtain a first image, where the first image includes a first vehicle. The input module is configured to input the first image into an image processing network to obtain a first result output by the image processing network. When a side face of the first vehicle is exposed in the first image, the first result includes location information of a two-dimensional (2D) bounding frame of the first vehicle, coordinates of a wheel of the first vehicle, and a first angle of the first vehicle. The first angle of the first vehicle indicates an included angle between a side line of the first vehicle and a first axis of the first image. The side line of the first vehicle is an intersection line between the exposed side face of the first vehicle and the ground plane on which the first vehicle is located. The first axis of the first image is parallel to one side of the first image. The generation module is configured to generate location information of a three-dimensional (3D) outer bounding box of the first vehicle based on the location information of the 2D bounding frame of the first vehicle, the coordinates of the wheel, and the first angle. The location information of the 3D outer bounding box of the first vehicle includes coordinates of at least two first points, the at least two first points are all located on a side of the 3D outer bounding box of the first vehicle, two first points in the at least two first points are used to locate the side of the 3D outer bounding box of the first vehicle, and the coordinates of the at least two first points are used to locate the 3D outer bounding box of the first vehicle.

In the fifth aspect of embodiments of this application, the modules included in the image processing apparatus may be further configured to implement the steps in the possible implementations of the first aspect. For specific implementations of some steps in the fifth aspect and the possible implementations of the fifth aspect of embodiments of this application and beneficial effects brought by each possible implementation, refer to descriptions in the possible implementations of the first aspect. Details are not described herein again.

According to a sixth aspect, an embodiment of this application provides an image processing apparatus, and the apparatus may be applied to the image processing field in the artificial intelligence field. The apparatus includes an obtaining module and a generation module. The obtaining module is configured to obtain a first image, where the first image includes a first vehicle. The generation module is configured to generate location information of a three-dimensional (3D) outer bounding box of the first vehicle based on the first image by using an image processing network. The generation module is further configured to generate three-dimensional feature information of the first vehicle based on the location information of the three-dimensional (3D) outer bounding box of the first vehicle. The three-dimensional feature information of the first vehicle includes one or more of the following: an orientation angle of the first vehicle relative to a vehicle equipped with the image processing apparatus, location information of the centroid point of the first vehicle, and dimensions of the first vehicle.

In the sixth aspect of embodiments of this application, the modules included in the image processing apparatus may be further configured to implement the steps in the possible implementations of the second aspect. For specific implementations of some steps in the sixth aspect and the possible implementations of the sixth aspect of embodiments of this application and beneficial effects brought by each possible implementation, refer to descriptions in the possible implementations of the second aspect. Details are not described herein again.

According to a seventh aspect, an embodiment of this application provides an image processing apparatus, and the apparatus may be applied to the image processing field in the artificial intelligence field. The apparatus includes an obtaining module, an input module and a generation module. The obtaining module is configured to obtain a third image, where the third image includes a first rigid body, and the first rigid body is a cube. The input module is configured to input the third image into an image processing network to obtain a second result output by the image processing network. When a side face of the first rigid body is exposed in the third image, the second result includes location information of a 2D bounding frame of the first rigid body and a first angle of the first rigid body. The first angle of the first rigid body indicates an included angle between a side line of the first rigid body and a first axis of the third image. The side line of the first rigid body is an intersection line between the exposed side face of the first rigid body and the plane on which the first rigid body is located. The first axis of the third image is parallel to one side of the third image. The generation module is configured to generate location information of a three-dimensional (3D) outer bounding box of the first rigid body based on the location information of the 2D bounding frame of the first rigid body and the first angle. The location information of the 3D outer bounding box of the first rigid body includes coordinates of at least two third points, the at least two third points are all located on a side of the 3D outer bounding box of the first rigid body, two third points in the at least two third points are used to locate the side of the 3D outer bounding box of the first rigid body, and the coordinates of the at least two third points are used to locate the 3D outer bounding box of the first rigid body.

In the seventh aspect of embodiments of this application, the modules included in the image processing apparatus may be further configured to implement the steps in the possible implementations of the third aspect. For specific implementations of some steps in the seventh aspect and the possible implementations of the seventh aspect of embodiments of this application and beneficial effects brought by each possible implementation, refer to descriptions in the possible implementations of the third aspect. Details are not described herein again.

According to an eighth aspect, an embodiment of this application provides an image processing apparatus, and the apparatus may be applied to the image processing field in the artificial intelligence field. The apparatus includes an obtaining module, an input module and a training module. The obtaining module is configured to obtain a training image and labeled data of the training image, where the training image includes a second vehicle. When a side face of the second vehicle is exposed in the training image, the labeled data includes labeled coordinates of a wheel of the second vehicle and a first labeled angle of the second vehicle. A first angle of the second vehicle indicates an included angle between a side line of the second vehicle and a first axis of the training image. The side line of the second vehicle is an intersection line between the exposed side face of the second vehicle and the ground plane on which the second vehicle is located. The first axis of the training image is parallel to one side of the training image. The input module is configured to input the training image into an image processing network to obtain a third result output by the image input network, where the third result includes generated coordinates of the wheel of the second vehicle and a first generated angle of the second vehicle. The training module is configured to: train the image processing network based on the labeled data and the third result by using a loss function until a convergence condition of the loss function is met; and output a trained image processing network, where the loss function is used to shorten similarity between the generated coordinates and the labeled coordinates, and shorten similarity between the first generated angle and the first labeled angle.

In the eighth aspect of embodiments of this application, the modules included in the image processing apparatus may be further configured to implement the steps in the possible implementations of the fourth aspect. For specific implementations of some steps in the eighth aspect and the possible implementations of the eighth aspect of embodiments of this application and beneficial effects brought by each possible implementation, refer to descriptions in the possible implementations of the fourth aspect. Details are not described herein again.

According to a ninth aspect, an embodiment of this application provides an execution device. The execution device may include a processor, the processor is coupled to a memory, and the memory stores program instructions. When the program instructions stored in the memory are executed by the processor, the image processing method according to the first aspect is implemented; or when the program instructions stored in the memory are executed by the processor, the image processing method according to the second aspect is implemented; or when the program instructions stored in the memory are executed by the processor, the image processing method according to the third aspect is implemented. For details in which the processor performs the steps performed by the execution device in the possible implementations of the first aspect, the second aspect, or the third aspect, refer to the first aspect, the second aspect, or the third aspect. Details are not described herein again.

According to a tenth aspect, an embodiment of this application provides an autonomous vehicle. The autonomous vehicle may include a processor, the processor is coupled to a memory, and the memory stores program instructions. When the program instructions stored in the memory are executed by the processor, the image processing method according to the first aspect is implemented; or when the program instructions stored in the memory are executed by the processor, the image processing method according to the second aspect is implemented; or when the program instructions stored in the memory are executed by the processor, the image processing method according to the third aspect is implemented. For details in which the processor performs the steps performed by the execution device in the possible implementations of the first aspect, the second aspect, or the third aspect, refer to the first aspect, the second aspect, or the third aspect. Details are not described herein again.

According to an eleventh aspect, an embodiment of this application provides a training device. The training device may include a processor, the processor is coupled to a memory, and the memory stores program instructions. When the program instructions stored in the memory are executed by the processor, the network training method according to the fourth aspect is implemented. For details in which the processor performs the steps performed by the training device in the possible implementations of the fourth aspect, refer to the fourth aspect. Details are not described herein again.

According to a twelfth aspect, an embodiment of this application provides a computer-readable storage medium. The computer-readable storage medium stores a computer program. When the computer program is run on a computer, the computer is enabled to perform the image processing method according to the first aspect, the second aspect, or the third aspect, or the computer is enabled to perform the network training method according to the fourth aspect.

According to a thirteenth aspect, an embodiment of this application provides a circuit system. The circuit system includes a processing circuit, and the processing circuit is configured to perform the image processing method according to the first aspect, the second aspect, or the third aspect, or the processing circuit is configured to perform the network training method according to the fourth aspect.

According to a fourteenth aspect, an embodiment of this application provides a computer program. When the computer program is run on a computer, the computer is enabled to perform the image processing method according to the first aspect, the second aspect, or the third aspect, or the computer is enabled to perform the network training method according to the fourth aspect.

According to a fifteenth aspect, an embodiment of this application provides a chip system. The chip system includes a processor, configured to support a server or an image processing apparatus to implement functions in the foregoing aspects, for example, send or process data and/or information in the foregoing methods. In a possible design, the chip system further includes a memory. The memory is configured to store program instructions and data that are necessary for the server or a communication device. The chip system may include a chip, or may include a chip and another discrete component.

BRIEF DESCRIPTION OF DRAWINGS

FIG. 11A to FIG. 11C are another schematic flowchart of an image processing method according to an embodiment of this application;

DESCRIPTION OF EMBODIMENTS

Embodiments of this application provide an image processing method, a network training method, and a related device. Location information of a three-dimensional (3D) outer bounding box of a first vehicle is generated based on three parameters: location information of a two-dimensional bounding frame of a second vehicle, coordinates of a wheel, and a first angle, thereby improving accuracy of the obtained 3D outer bounding box.

The following describes embodiments of this application with reference to accompanying drawings. A person of ordinary skill in the art may learn that, with development of technologies and emergence of a new scenario, the technical solutions provided in embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, product, or device.

Figure 1:
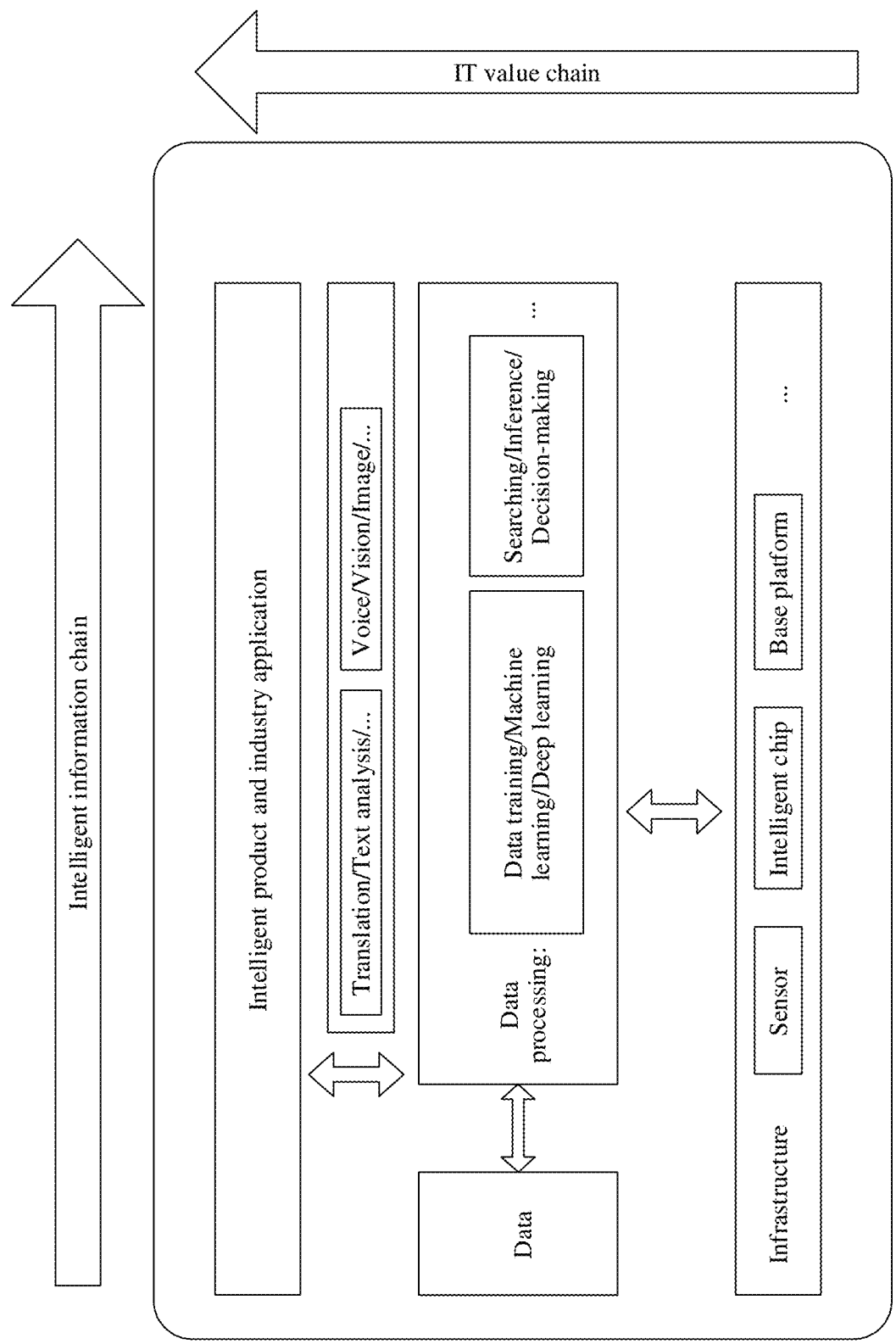
FIG. 1 is a schematic diagram of a structure of an artificial intelligence main framework according to an embodiment of this application.

An overall working procedure of an artificial intelligence system is first described. FIG. 1 is a schematic diagram of a structure of an artificial intelligence main framework. The following describes the artificial intelligence main framework from two dimensions: "intelligent information chain" (horizontal axis) and "IT value chain" (vertical axis). The "intelligent information chain" reflects a general process from data obtaining to data processing. For example, the process may be a general process of intelligent information perception, intelligent information representation and formation, intelligent inference, intelligent decision-making, and intelligent execution and output. In this process, data undergoes a condensation process of "data-information-knowledge-wisdom". The "IT value chain" reflects a value brought by artificial intelligence to the information technology industry in a process from an underlying infrastructure and information (providing and processing technology implementation) of human intelligence to a systemic industrial ecology.

(1) Infrastructure

The infrastructure provides computing capability support for the artificial intelligence system, implements communication with the external world, and implements support by using a base platform. The infrastructure communicates with the external world by using a sensor. A computing capability is provided by intelligent chips. The intelligent chips include but are not limited to hardware acceleration chips such as a central processing unit (CPU), an embedded neural-network processing unit (NPU), a graphics processing unit (GPU), an application-specific integrated circuit (ASIC), and a field-programmable gate array (FPGA). The base platform includes related platform assurance and support such as a distributed computing framework and a network, and may include cloud storage and computing, an interconnection and interworking network, and the like. For example, the sensor communicates with the outside to obtain data, and the data is provided to an intelligent chip in a distributed computing system for computation, where the distributed computing system is provided by the base platform.

(2) Data

Data at an upper layer of the infrastructure indicates a data source in the artificial intelligence field. The data relates to a graph, an image, a voice, and text, further relates to internet of things data of a conventional device, and includes service data of an existing system and perception data such as force, displacement, a liquid level, a temperature, and humidity.

(3) Data Processing

Data processing usually includes manners such as data training, machine learning, deep learning, searching, inference, and decision-making.

Machine learning and deep learning may mean performing symbolized and formalized intelligent information modeling, extraction, preprocessing, training, and the like on data.

Inference is a process in which a pattern of human intelligent inference is simulated in a computer or an intelligent system, and machine thinking and problem resolving are performed by using formalized information according to an inferring control policy. A typical function is searching and matching.

Decision-making is a process in which a decision is made after intelligent information is inferred, and usually provides functions such as classification, ranking, and prediction.

(4) General Capabilities

After data processing mentioned above is performed on data, some general capabilities may be further formed based on a data processing result, for example, an algorithm or a general system, such as translation, text analysis, computer vision processing, and speech recognition.

(5) Intelligent Product and Industry Application

Intelligent products and industry applications are products and applications of the artificial intelligence system in various fields, and are encapsulation for an overall solution of artificial intelligence, to productize intelligent information decision-making and implement applications. Application fields thereof mainly include an intelligent terminal, intelligent manufacturing, intelligent transportation, intelligent home, intelligent healthcare, intelligent security protection, autonomous driving, a safe city, and the like.

This application may be applied to various fields in the artificial intelligence field, and may be specifically applied to various scenarios in which a 3D outer bounding box of a rigid body in an ambient environment needs to be located. The rigid body is an object whose shape and size remain unchanged and whose relative locations of internal points remain unchanged during motion and after force action. The rigid body may be specifically represented as a vehicle, a roadblock, another type of rigid body, or the like on a road. For example, embodiments of this application may be applied to a scenario in which an orientation angle of a vehicle around a vehicle equipped with an image processing apparatus (namely, an autonomous vehicle in which a user is located) is estimated. A 3D outer bounding box of the vehicle around the vehicle equipped with the image processing apparatus may be first located, and a point on a side of the 3D outer bounding box is used to generate the orientation angle of the vehicle around the vehicle equipped with the image processing apparatus. For another example, embodiments of this application may be applied to a scenario in which a location of a roadblock around a vehicle equipped with an image processing apparatus is estimated. A 3D bounding box of the roadblock around the vehicle equipped with the image processing apparatus may be first located, and then location information of the roadblock around the vehicle equipped with the image processing apparatus is generated based on a point on a side of the 3D outer bounding box. It should be understood that the description herein is merely intended to facilitate understanding of application scenarios of embodiments of this application, and the application scenarios of embodiments of this application are not exhaustive. The following uses an example in which embodiments of this application are applied to the autonomous driving field for description.

Figure 2:
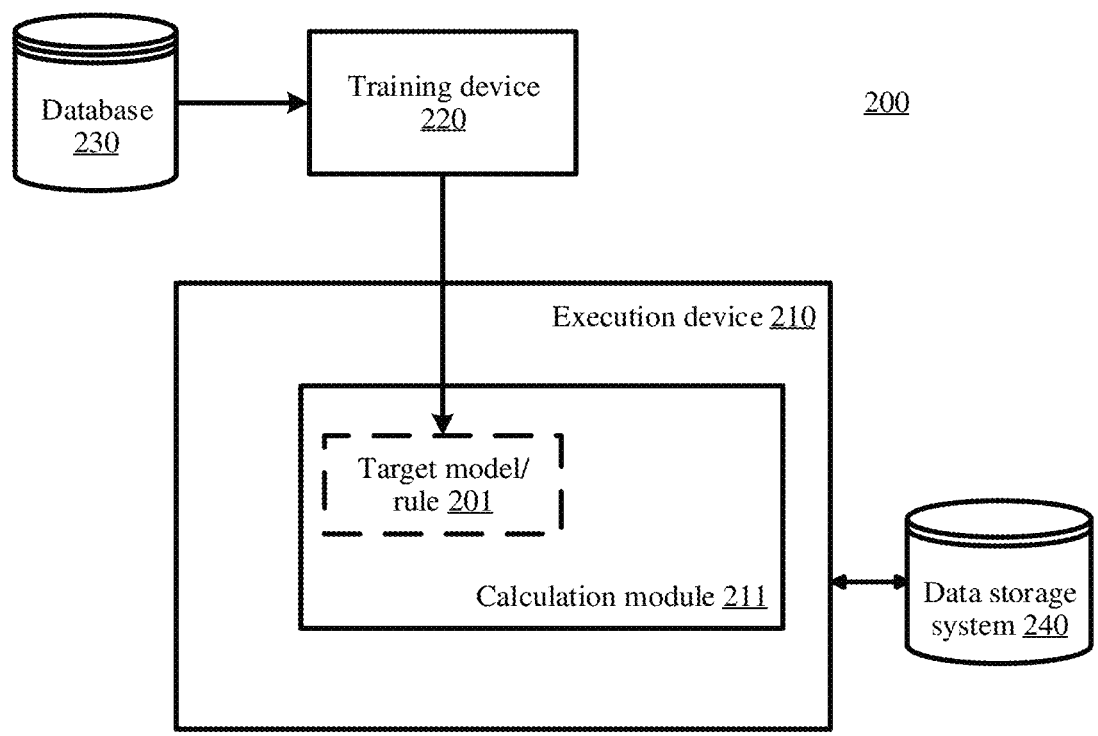
FIG. 2 is a diagram of a system architecture of an image processing system according to an embodiment of this application.

To facilitate understanding of this solution, an image processing system provided in an embodiment of this application is first described. FIG. 2 is a diagram of a system architecture of an image processing system according to an embodiment of this application. In FIG. 2, an image processing system 200 includes an execution device 210, a training device 220, a database 230, and a data storage system 240. The execution device 210 includes a calculation module 211.

The database 230 stores a training data set, and the training data set includes a plurality of training images and labeled data of each training image. The training device 220 generates a target model/rule 201 used for an image, and performs iterative training on the target model/rule 201 by using the training data set in the database, to obtain a mature target model/rule 201.

An image processing network obtained by the training device 220 may be applied to different systems or devices, for example, an autonomous vehicle, a mobile phone, a tablet, a smart home appliance, and a monitoring system. The execution device 210 may invoke data, code, and the like in the data storage system 240, or may store data, instructions, and the like in the data storage system 240. The data storage system 240 may be disposed in the execution device 210, or the data storage system 240 may be an external memory relative to the execution device 210.

The calculation module 211 may process, by using the image processing network, an image collected by the execution device 210, to obtain location information of a 2D bounding frame of a first rigid body in the image and a first angle. The first angle indicates an included angle between a side line and a first axis. The side line of the first rigid body is an intersection line between an exposed side face of the first rigid body and the ground plane on which the first rigid body is located. The first axis of the first image is parallel to one side of the first image, so that the execution device 210 may generate coordinates of a point on a side of a 3D bounding box of the first rigid body based on the location information of the two-dimensional (2D) bounding frame of the first rigid body and the first angle, to locate the 3D bounding box of the first rigid body. Accuracy of the two parameters: the location information of the 2D bounding frame and the first angle is irrelevant to whether the rigid body in the image is complete. Therefore, regardless of whether the rigid body in the image is complete, the obtained coordinates of the first point are accurate, and the located 3D outer bounding box is accurate.

In some embodiments of this application, for example, in FIG. 2, a "user" may directly interact with the execution device 210, to be specific, the execution device 210 and a client device are integrated into a same device. However, FIG. 2 is merely a schematic diagram of architectures of two image processing systems according to an embodiment of the present invention, and a location relationship between devices, components, modules, and the like shown in the figure does not constitute any limitation. In some other embodiments of this application, the execution device 210 and the client device may be independent devices. The execution device 210 is configured with an input/output interface to exchange data with the client device. The "user" may input a captured image to the input/output interface by using the client device, and the execution device 210 returns the coordinates of the first point to the client device through the input/output interface.

With reference to the foregoing descriptions, an embodiment of this application provides an image processing method, and the method may be applied to the execution device 210 shown in FIG. 2. A trained image processing network may be pre-configured on a vehicle equipped with an image processing apparatus. After a first image including a first vehicle is obtained, the first image is input into the image processing network to obtain a first result output by the image processing network. The first result includes a 2D bounding frame of the first vehicle, coordinates of a first wheel, and a first angle indicating an included angle between a side line of the first vehicle and an axis of the first image. Coordinates of first points are generated based on the first result output by the image processing network. The first point is a point on a side of a 3D outer bounding box of the first vehicle, and the 3D outer bounding box of the first vehicle is located by using the coordinates of the first points. Accuracy of the three parameters: the location information, the coordinates of the wheel, and the first angle is irrelevant to whether the vehicle in the image is complete. Therefore, regardless of whether the vehicle in the image is complete, the obtained coordinates of the first points are accurate, and the located 3D outer bounding box is accurate, in other words, accuracy of the obtained 3D outer bounding box is improved. It can be learned from the description in FIG. 2 that embodiments of this application include an inference phase and a training phase, and procedures of the inference phase and the training phase are different. The following separately describes the inference phase and the training phase.

1. Inference Phase

Figure 3A:
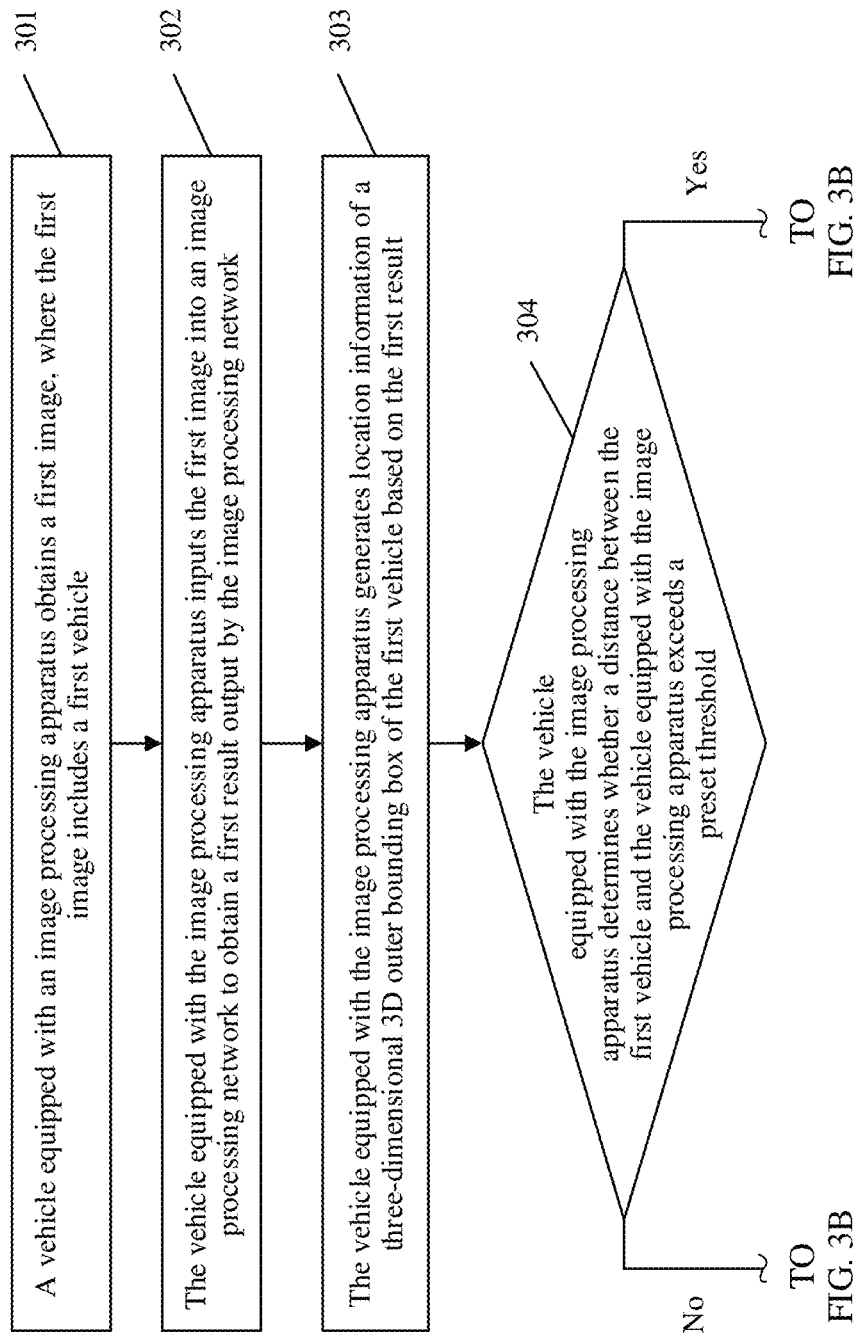
FIG. 3A to FIG. 3C are a schematic flowchart of an image processing method according to an embodiment of this application.
Figures 3B, 3C:
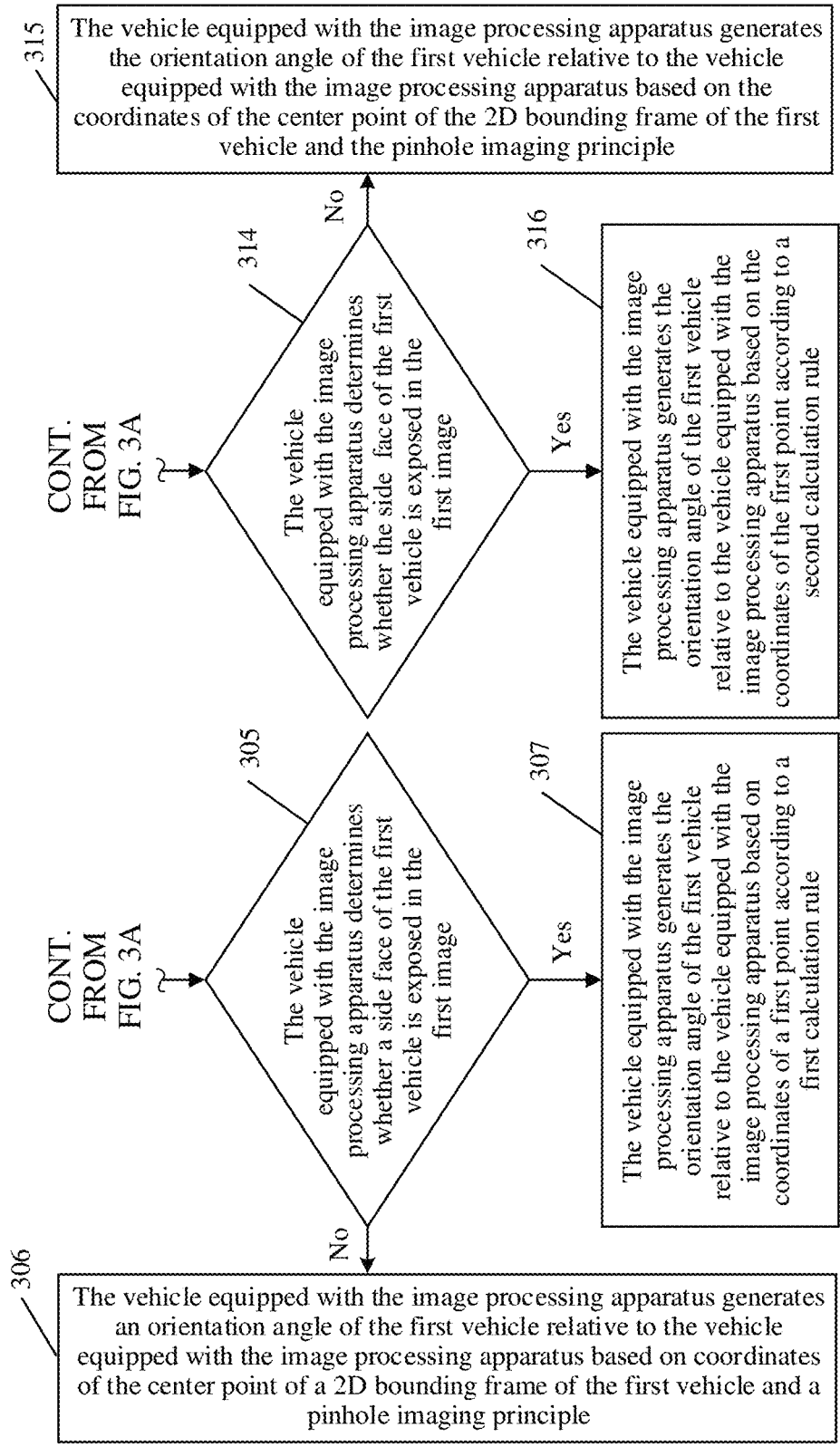

In embodiments of this application, the inference phase describes a process of how the execution device 210 locates the 3D outer bounding box of the first vehicle in the first image by using a mature image processing network. After locating the 3D outer bounding box of the first vehicle, the vehicle equipped with the image processing apparatus may estimate 3D feature information such as an orientation angle, a centroid point location, and/or dimensions of the first vehicle. In embodiments of this application, refer to FIG. 3A to FIG. 3C. FIG. 3A to FIG. 3C are a schematic flowchart of an image processing method according to an embodiment of this application. The image processing method provided in this embodiment of this application may include the following steps.

301: A vehicle equipped with an image processing apparatus obtains a first image, where the first image includes a first vehicle.

In this embodiment, a camera device for image capturing may be configured on the vehicle equipped with the image processing apparatus, so that the vehicle equipped with the image processing apparatus may perform image capturing by using the camera device, to obtain the first image. The camera device includes but is not limited to a camera, a capture card, a radar, a camera device of another type, or the like. One first image may include one or more first vehicles and an environment in which the first vehicles are located. The first image may be an independent image, or may be a video frame in a video.

Further, if a monocular camera system is configured on the vehicle equipped with the image processing apparatus, the first image may be captured by using the monocular camera system. If a binocular camera system is configured on the vehicle equipped with the image processing apparatus, the first image may be any one of two images captured by using the binocular camera system. If a multi-cular camera system is configured on the vehicle equipped with the image processing apparatus, the first image may be any one of a plurality of images captured by using the multi-cular camera system.

302: The vehicle equipped with the image processing apparatus inputs the first image into an image processing network to obtain a first result output by the image processing network.

In this embodiment, the mature image processing network is pre-configured on the vehicle equipped with the image processing apparatus. After the first image is obtained, the first image is input into the image processing network to obtain one or more groups of first results output by the image processing network. A quantity of first results is consistent with a quantity of first vehicles in the first image, and one group of first results indicates feature information of one first vehicle. When a side face of the first vehicle is exposed in the first image, each group of first results may include location information of a 2D bounding frame of the first vehicle, coordinates of a wheel of the first vehicle, and a first angle. When only a main face of the first vehicle is exposed and the side face is not exposed in the first image, each group of first results may include the location information of the 2D bounding frame of the first vehicle. The main face is a front face or rear face.

Further, the location information of the 2D bounding frame of the first vehicle may include coordinates of the central point of the 2D bounding frame and side lengths of the 2D bounding frame. Because the wheel of the vehicle has a specific thickness, the coordinates of the wheel of the first vehicle may be coordinates of a location found on an outer side of the wheel, coordinates of a location found on an inner side of the wheel, coordinates of a location found in the middle of the wheel thickness, or the like. The coordinates of the wheel of the first vehicle may include coordinates of one wheel or two wheels, and a specific case may be determined by an actually photographed image. Further, the coordinates of the wheel and the coordinates of the central point may correspond to a same coordinate system. An origin of the coordinate system may be any vertex of the first image, the central point of the first image, another location point in the first image, or the like. This is not limited herein. Two coordinate axes of the coordinate system are respectively a U axis and a V axis of the first image. The first angle of the first vehicle indicates an included angle between a side line of the first vehicle and a first axis of the first image. The side line of the first vehicle is an intersection line between the exposed side face of the first vehicle and the ground plane on which the first vehicle is located. The first axis of the first image is parallel to one side of the first image. The first axis may be parallel to the U axis of the first image, or may be parallel to the V axis of the first image. Further, a value range of the first angle may be 0 degrees to 360 degrees, or may be negative 180 degrees to positive 180 degrees. This is not limited herein.

Figure 4:
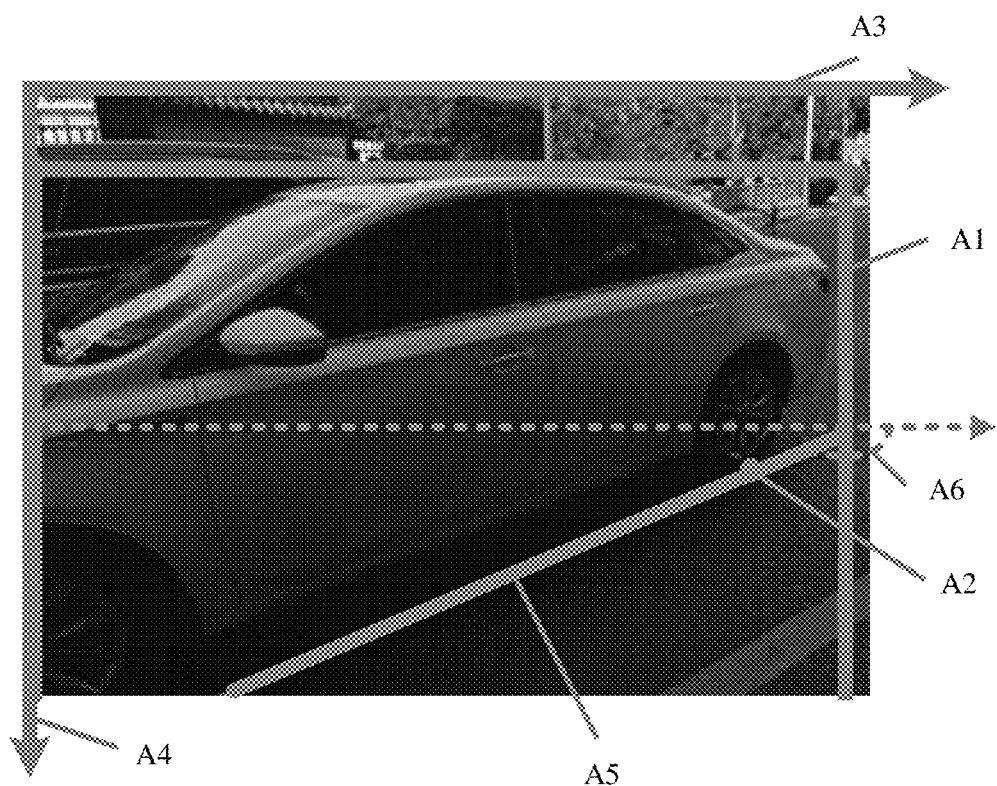
FIG. 4 is a schematic diagram of a first result in an image processing method according to an embodiment of this application.
Figure 5:
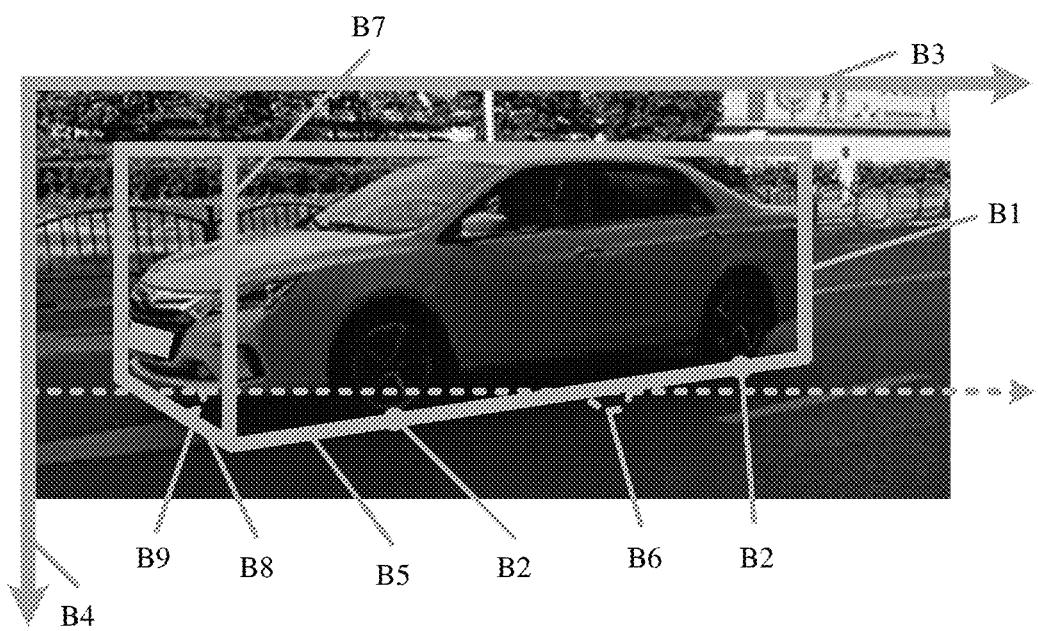
FIG. 5 is another schematic diagram of a first result in an image processing method according to an embodiment of this application.

To understand this solution more intuitively, refer to FIG. 4. FIG. 4 is a schematic diagram of the first result in the image processing method according to an embodiment of this application. FIG. 4 shows an example in which only the side face of the first vehicle is exposed in the first image, the coordinates of the wheel are the coordinates of the location found on the outer side of the wheel, and the first axis is the U axis of the first image. A1 represents the 2D bounding frame of the first vehicle, A2 represents the coordinates of the wheel of the first vehicle, A3 represents the U axis of the first image, A4 represents the V axis of the first image, A5 represents the side line of the first vehicle, and A6 represents the first angle of the first vehicle. It should be understood that the example in FIG. 5 is merely for ease of understanding of this solution, and is not intended to limit this solution.

Optionally, when the main face and the side face of the first vehicle are exposed in the first image, the first result may further include location information of a boundary of the first vehicle and a second angle of the first vehicle.

Further, the boundary is a boundary between the side face and the main face. If the front face and the side face of the first vehicle are exposed in the first image, the boundary of the first vehicle is a boundary between the exposed front face and the exposed side face. If the rear face and the side face of the first vehicle are exposed in the first image, the boundary of the first vehicle is a boundary between the exposed rear face and the exposed side face. The front face of the first vehicle is a face on which the front of the first vehicle is located, and the rear face of the first vehicle is a face on which the back of the first vehicle is located. The boundary of the first vehicle may pass through a contour of a vehicle light of the first vehicle, or the boundary of the first vehicle may pass through the center point of a vehicle light of the first vehicle, or the boundary of the first vehicle may pass through an intersection point between the side line of the first vehicle and a main side line of the first vehicle. The boundary between the main face and the side face of the first vehicle may alternatively be determined based on other information. This is not limited herein. The location information of the boundary may be specifically represented as a value. The value may be a distance value between the boundary of the first vehicle and one side of the 2D bounding frame of the first vehicle, a U-axis coordinate value of an intersection point between the boundary and the U axis in the coordinate system, or the like. This is not limited herein. In this embodiment, a specific implementation form of the location information of the 2D bounding frame and several specific implementations of the location information of the boundary are provided, thereby facilitating selection of this solution.

The second angle of the first vehicle indicates an included angle between the main side line of the first vehicle and the first axis of the first image. The main side line of the first vehicle is an intersection line between the exposed main face of the first vehicle and the ground plane on which the first vehicle is located. If the front face and the ground plane of the first vehicle are exposed in the first image, the main side line of the first vehicle is an intersection line between the exposed front face and the exposed ground plane. If the rear face and the ground plane of the first vehicle are exposed in the first image, the main side line of the first vehicle is an intersection line between the exposed rear face and the exposed ground plane. A value range of the second angle is consistent with the value range of the first angle, and details are not described herein again.

To understand this solution more intuitively, refer to FIG. 5. FIG. 5 is a schematic diagram of the first result in the image processing method according to an embodiment of this application. FIG. 5 shows an example in which the side face and the front face of the first vehicle are exposed in the first image, the coordinates of the wheel are the coordinates of the location found on the outer side of the wheel, the first axis is the U axis of the first image, and the boundary passes through the outer contour of the vehicle light. B1 represents the 2D bounding frame of the first vehicle, B2 represents the coordinates of the wheel of the first vehicle, B3 represents the U axis of the first image, B4 represents the V axis of the first image, B5 represents the side line of the first vehicle, B6 represents the first angle of the first vehicle, B7 represents the boundary between the side face and the front face of the first vehicle, B8 represents the main side line (namely, a front side line in FIG. 5) of the first vehicle, and B9 represents the second angle of the first vehicle. It should be understood that the example in FIG. 5 is merely for ease of understanding this solution, and is not intended to limit this solution.

Further, optionally, the first result may further include indication information of an exposed face of the first vehicle in the first image. The exposed face includes one or more of: the side face, the front face, and the rear face, and the side face includes a left face and a right face. Specifically, the indication information of the exposed face may be specifically represented as a number sequence. For example, the number sequence includes four groups of numbers that respectively correspond to the front, back, left, and right sides of the first vehicle. One group of numbers indicates whether a face corresponding to the group of numbers is exposed in the first image, and one group of numbers includes one or more values. For example, the indication information of the exposed face is specifically represented as 1010 that respectively correspond to the front, back, left, and right faces of the first vehicle. 1 indicates that there is a corresponding face in the first image, and 0 indicates that there is no corresponding face in the first image. In this case, "1010" indicates that the front face and the left face of the first vehicle are exposed in the first image. The indication information of the exposed face may alternatively be specifically represented as a string of characters. For example, the indication information of the exposed face is specifically represented as "front face and right face", indicating that the front face and the right face of the first vehicle are exposed in the first image. A specific representation form of the indication information may be determined with reference to an actual product form, and is not limited herein. In this embodiment, the first result further includes the indication information of the exposed face of the first vehicle in the first image. Therefore, in a subsequent process of generating three-dimensional feature information of the first vehicle by using coordinates of a first point, whether only the main face of the first vehicle is exposed, only the side face of the first vehicle is exposed, or both the side face and the main face are exposed in the first image may be determined based on the indication information of the exposed face in the first image. This helps improve precision of the subsequent process of generating the three-dimensional feature information, to improve accuracy of the generated three-dimensional feature information.

303: The vehicle equipped with the image processing apparatus generates location information of a three-dimensional (3D) outer bounding box of the first vehicle based on the first result.

In some embodiments of this application, after obtaining the first result, the vehicle equipped with the image processing apparatus first generates the location information of the three-dimensional (3D) outer bounding box of the first vehicle based on the first result, and then generates the 3D feature information of the first vehicle based on the location information of the three-dimensional (3D) outer bounding box of the first vehicle. The location information of the 3D outer bounding box of the first vehicle includes coordinates of at least two first points, the at least two first points are all located on a side of the 3D outer bounding box of the first vehicle, two first points in the at least two first points are used to locate the side of the 3D outer bounding box of the first vehicle, and the coordinates of the at least two first points are used to locate the 3D outer bounding box of the first vehicle. Further, the 3D outer bounding box of the first vehicle includes 12 sides and eight vertices. A locating concept in this embodiment means that locations of some sides and/or vertices in the 12 sides and eight vertices can be determined. Optionally, because bottom face information of the 3D outer bounding box is mainly used in the process of generating the 3D feature information of the first vehicle, a location of a side and/or a vertex on a bottom face of the 3D outer bounding box of the first vehicle is mainly located based on the coordinates of the first point and the first angle.

Specifically, in two cases in which both the side face and the main face of the first vehicle are exposed in the first image, and only the side face of the first vehicle is exposed in the first image, specific generated locations of first points are different. After obtaining the first result, the vehicle equipped with the image processing apparatus may determine, based on the indication information of the exposed face of the first vehicle, whether only the side face of the first vehicle is exposed or both the side face and the main face of the first vehicle are exposed in the first image, and then separately process the foregoing two cases. The following separately describes the two cases.

A. Only the side face of the first vehicle is exposed in the first image.

In this embodiment, when the vehicle equipped with the image processing apparatus determines, based on the indication information of the exposed face of the first vehicle, that only the side face of the first vehicle is exposed in the first image, step 303 may include: The vehicle equipped with the image processing apparatus generates the coordinates of the at least two first points based on the location information of the 2D bounding frame of the first vehicle, the coordinates of the wheel of the first vehicle, and the first angle of the first vehicle. The at least two first points include two intersection points between the side line of the first vehicle and the 2D bounding frame. The first point is a general concept, and the first point refers to coordinates of a point generated on the side of the 3D outer bounding box of the first vehicle in a specific scenario in which only the side face of the first vehicle is exposed in the first image. In this embodiment, when only the side face of the first vehicle is exposed in the first image, the first point is an intersection point between the side line of the first vehicle and the 2D bounding frame. This refines a specific representation form of the first point in a specific scenario, and improves a degree of integration with an application scenario.

Specifically, the vehicle equipped with the image processing apparatus generates location information of the side line of the first vehicle based on the coordinates of the wheel of the first vehicle and the first angle, and generates coordinates based on the location information of the side line of the first vehicle and the location information of the 2D bounding frame, to obtain the coordinates of the at least two first points. In this embodiment, the vehicle equipped with the image processing apparatus may generate the location information of the side line of the first vehicle based on the coordinates of the wheel of the first vehicle and the first angle. This operation is simple, easy to implement, and has high accuracy.

More specifically, the vehicle equipped with the image processing apparatus may generate a straight line equation of the side line of the first vehicle based on the coordinates of the wheel of the first vehicle and the first angle, in other words, obtain the location information of the side line of the first vehicle. The vehicle equipped with the image processing apparatus may determine locations of a left boundary and a right boundary of the 2D bounding frame of the first vehicle based on the location information of the 2D bounding frame of the first vehicle. Based on the straight line equation of the side line of the first vehicle, the vehicle equipped with the image processing apparatus may generate coordinates of an intersection point M (namely, one first point) between the side line and the left boundary, and generate coordinates of an intersection point N (namely, another first point) between the side line and the right boundary. A connection line between the intersection point M and the intersection point N is the side line of the first vehicle, and the side line of the first vehicle is one side of the bottom face of the 3D outer bounding box of the first vehicle. There are front and back boundaries on the side face of the first vehicle. If any boundary on the side face of the first vehicle is exposed in the first image, a vertex of the 3D outer bounding box of the first vehicle may exist in the two first points. If any boundary on the side face of the first vehicle is not exposed in the first image, no vertex of the 3D outer bounding box of the first vehicle exists in the two first points. The left boundary and the right boundary of the 2D bounding frame are respectively parallel to two sides of a side face of the 3D bounding box of the first vehicle. Therefore, the 3D bounding box of the first vehicle can be located by using the coordinates of the first point.

Optionally, step 303 may further include: The vehicle equipped with the image processing apparatus determines coordinates of a vertex in an upper left corner and coordinates of a vertex in an upper right corner of the 2D bounding frame of the first vehicle based on the location information of the 2D bounding frame of the first vehicle, determines the vertex O in the upper left corner and the vertex P in the upper right corner as two first points respectively, and determines the coordinates of the vertex O and the coordinates of the vertex P as coordinates of the two first points respectively. Both the vertex O and the vertex P are located on a side of a top face of the 3D bounding box of the first vehicle.

Figure 6:
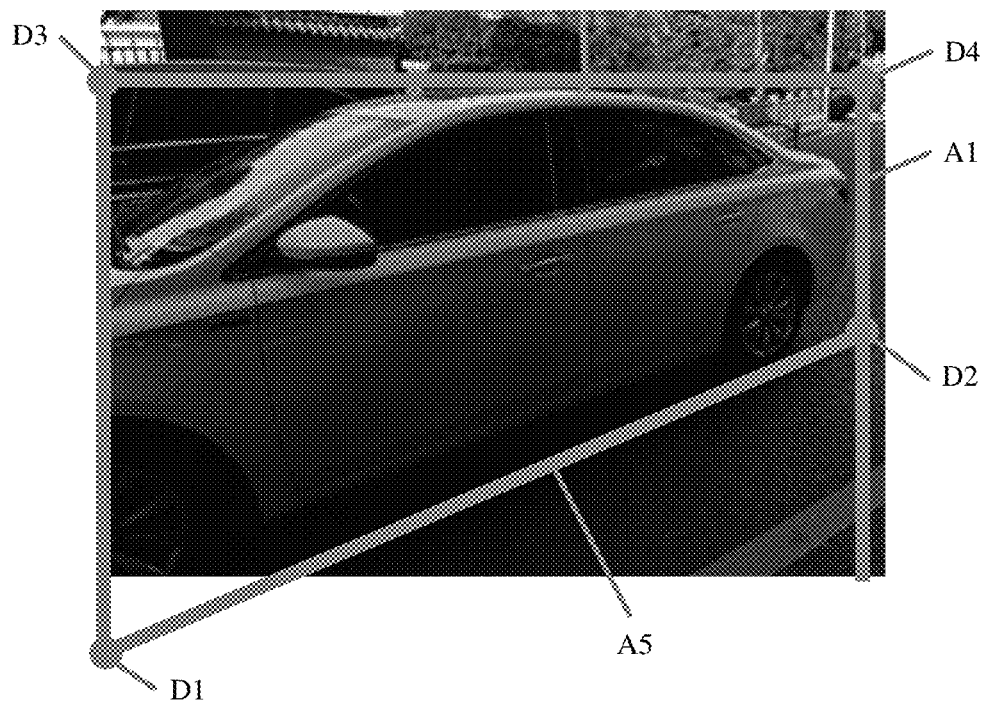
FIG. 6 is a schematic diagram of a first point in an image processing method according to an embodiment of this application.

To further understand this solution, an example is provided with reference to FIG. 4. FIG. 6 is a schematic diagram of the first point in the image processing method according to an embodiment of this application. FIG. 6 shows an example in which only the side face of the first vehicle is exposed in the first image. A1 represents the 2D bounding frame of the first vehicle, and A1 is generated based on the location information of the 2D bounding frame of the first vehicle. A5 represents the side line of the first vehicle, and A5 is generated based on the coordinates of wheel of the first vehicle and the first angle. D1 represents an intersection point (namely, the intersection point M) between the side line of the first vehicle and the left boundary of the 2D bounding frame of the first vehicle. D2 represents an intersection point (namely, the intersection point N) between the side line of the first vehicle and the right boundary of the 2D bounding frame of the first vehicle. D3 represents the vertex in an upper left corner (namely, the vertex O) of the 2D bounding frame of the first vehicle. D4 represents the vertex in an upper right corner (namely, the vertex P) of the 2D bounding frame of the first vehicle. D1, D2, D3, and D4 are respectively four first points located on sides of the 3D outer bounding box of the first vehicle. D1 and D2 are located on a side of the bottom face of the 3D outer bounding box of the first vehicle. D3 and D4 are located on a side of the top face of the 3D outer bounding box of the first vehicle. Coordinates of D1, D2, D3, and D4 are coordinates of the four generated first points. It should be understood that, in another embodiment, the coordinates of D3 and D4 may not be generated. The example in FIG. 6 is merely for ease of understanding this solution, and is not intended to limit this solution.

B. The side face and the main face of the first vehicle are exposed in the first image.

In this embodiment, when the side face and the main face of the first vehicle are exposed in the first image, the first result further includes the location information of the boundary of the first vehicle and the second angle of the first vehicle. Specific meanings of the location information of the boundary and the second angle are both described in step 302, and details are not described herein again. The at least two first points include a first intersection point, a second intersection point, and a third intersection point. Coordinates of the first intersection point, coordinates of the second intersection point, and coordinates of the third intersection point are coordinates of points generated on sides of the 3D outer bounding box of the first vehicle in a specific scenario in which the side face and the main face of the first vehicle are exposed in the first image. The first intersection point is an intersection point between the side line of the first vehicle and the boundary, and is also a vertex of the 3D outer bounding box of the first vehicle. The second intersection point is an intersection point between the side line of the first vehicle and the 2D bounding frame. A connection line between the first intersection point and the second intersection point is the side line of the first vehicle, and the side line of the first vehicle is a side of the bottom face of the 3D bounding box of the first vehicle. Further, if the first image includes the complete side face of the first vehicle, the second intersection point is a vertex of the bottom face of the 3D bounding box of the first vehicle. The third intersection point is an intersection point between the main side line of the first vehicle and the 2D bounding frame. A connection line between the first intersection point and the third intersection point is the main side line of the first vehicle, and the main side line of the first vehicle is another side of the bottom face of the 3D bounding box of the first vehicle. Further, if the first image includes the complete main face of the first vehicle, the third intersection point is a vertex of the bottom face of the 3D bounding box of the first vehicle. A left boundary and a right boundary of the 2D bounding frame of the first vehicle are respectively parallel to two sides of the side face of the 3D bounding box of the first vehicle. Therefore, the 3D outer bounding box of the first vehicle can be located by using the coordinates of the first intersection point, the coordinates of the second intersection point, and the coordinates of the third intersection point. In this embodiment, a specific representation form of the first point in a case in which only the side face of the first vehicle is exposed in the first image is provided, and a specific representation form of the first point in a case in which the side face and the main face of the first vehicle are exposed in the first image is provided. This enriches application scenarios of this solution, and improves implementation flexibility.

Specifically, when the vehicle equipped with the image processing apparatus determines, based on the indication information of the exposed face of the first vehicle, that the side face and the main face of the first vehicle are exposed in the first image, step 303 may include: The vehicle equipped with the image processing apparatus generates the coordinates of the first intersection point based on the location information of the boundary, the coordinates of the wheel, and the first angle. The vehicle equipped with the image processing apparatus generates the coordinates of the second intersection point based on the location information of the 2D bounding frame, the coordinates of the wheel, and the first angle. The vehicle equipped with the image processing apparatus generates the coordinates of the third intersection point based on the location information of the 2D bounding frame, the coordinates of the first intersection point, and the second angle. The coordinates of the first intersection point, the coordinates of the second intersection point, the coordinates of the third intersection point, the first angle, and the second angle are used to locate the 3D outer bounding box of the first vehicle. In this embodiment, an implementation of generating coordinates of a plurality of first points when the side face and the main face of the first vehicle are exposed in the first image is provided. This operation is simple, easy to implement, and has high accuracy.

More specifically, in a case, if the vehicle equipped with the image processing apparatus determines, based on the indication information of the exposed face of the first vehicle, that the side face and the front face of the first vehicle are exposed in the first image, the main face is specifically the front face, and the main side line is specifically the front side line. The vehicle equipped with the image processing apparatus generates a straight line equation of the side line based on the coordinates of the wheel and the first angle, in other words, generates location information of the side line of the first vehicle. Further, the vehicle equipped with the image processing apparatus generates coordinates of an intersection point between the side line and the boundary based on the location information of the boundary and the straight line equation of the side line, in other words, generates the coordinates of the first intersection point. The vehicle equipped with the image processing apparatus may determine the locations of the left boundary and the right boundary of the 2D bounding frame of the first vehicle based on the location information of the 2D bounding frame of the first vehicle, and generate coordinates of an intersection point between the side line and the right boundary of the 2D bounding frame based on the straight line equation of the side line and the location of the right boundary of the 2D bounding frame, in other words, generate the coordinates of the second intersection point. The vehicle equipped with the image processing apparatus generates a straight line equation of the front side line based on the coordinates of the first intersection point and the second angle, in other words, generates location information of the front side line of the first vehicle, and generates coordinates of an intersection point between the front side line and the left boundary of the 2D bounding frame based on the straight line equation of the front side line and the location of the left boundary of the 2D bounding frame, in other words, generates the coordinates of the third intersection point. It should be noted that, in another embodiment, the coordinates of the second intersection point may be generated first, and then the coordinates of the first intersection point are generated; or the coordinates of the third intersection point may be generated first, and then the coordinates of the second intersection point are generated. A sequence of generating the coordinates of the first intersection point, the coordinates of the second intersection point, and the coordinates of the third intersection point is not limited herein.

Further, when the first image includes the side face and the front face of the first vehicle, a boundary between the side face and the front face of the first vehicle is a side of the side face of the 3D bounding box of the first vehicle. If the first image includes the complete side face of the first vehicle, the right boundary of the 2D bounding frame of the first vehicle is a side of the side face of the 3D bounding box of the first vehicle. If the first image includes the complete front face of the first vehicle, the left boundary of the 2D bounding frame of the first vehicle is a side of the side face of the 3D bounding box of the first vehicle. This locates the side face of the 3D bounding box of the first vehicle.

In another case, if the vehicle equipped with the image processing apparatus determines, based on the indication information of the exposed face of the first vehicle, that the side face and the rear face of the first vehicle are exposed in the first image, the main face is specifically the rear face, and the main side line is specifically a rear side line. The vehicle equipped with the image processing apparatus generates a straight line equation of the side line based on the coordinates of the wheel and the first angle, in other words, generates location information of the side line of the first vehicle. Further, the vehicle equipped with the image processing apparatus generates coordinates of an intersection point between the side line and the boundary based on the location information of the boundary and the straight line equation of the side line, in other words, generates the coordinates of the first intersection point. The vehicle equipped with the image processing apparatus may determine the locations of the left boundary and the right boundary of the 2D bounding frame of the first vehicle based on the location information of the 2D bounding frame of the first vehicle, and generate coordinates of an intersection point between the side line and the left boundary of the 2D bounding frame based on the straight line equation of the side line and the location of the left boundary of the 2D bounding frame, in other words, generate the coordinates of the second intersection point. The vehicle equipped with the image processing apparatus generates a straight line equation of the rear side line based on the coordinates of the first intersection point and the second angle, in other words, generates location information of the rear side line of the first vehicle, and generates coordinates of an intersection point between the rear side line and the right boundary of the 2D bounding frame based on the straight line equation of the rear side line and the location of the right boundary of the 2D bounding frame, in other words, generates the coordinates of the third intersection point.

Further, when the first image includes the side face and the rear face of the first vehicle, a boundary between the side face and the rear face of the first vehicle is a side of a side face of the 3D bounding box of the first vehicle. If the first image includes the complete side face of the first vehicle, the left boundary of the 2D bounding frame of the first vehicle is a side of the side face of the 3D bounding box of the first vehicle. If the first image includes the complete rear face of the first vehicle, the right boundary of the 2D bounding frame of the first vehicle is a side of the side face of the 3D bounding box of the first vehicle. This locates the side face of the 3D bounding box of the first vehicle.

Optionally, step 303 may further include: The vehicle equipped with the image processing apparatus determines coordinates of a vertex in an upper left corner and coordinates of a vertex in an upper right corner of the 2D bounding frame of the first vehicle based on the location information of the 2D bounding frame of the first vehicle, and determines coordinates of the two vertices as coordinates of two first points. The vehicle equipped with the image processing apparatus generates coordinates of an intersection point between the boundary and the 2D bounding frame based on the location information of the 2D bounding frame of the first vehicle and the location information of the boundary of the first vehicle, in other words, generates coordinates of one first point. The intersection point is a vertex of a top face of the 3D bounding box of the first vehicle.

Figure 7:
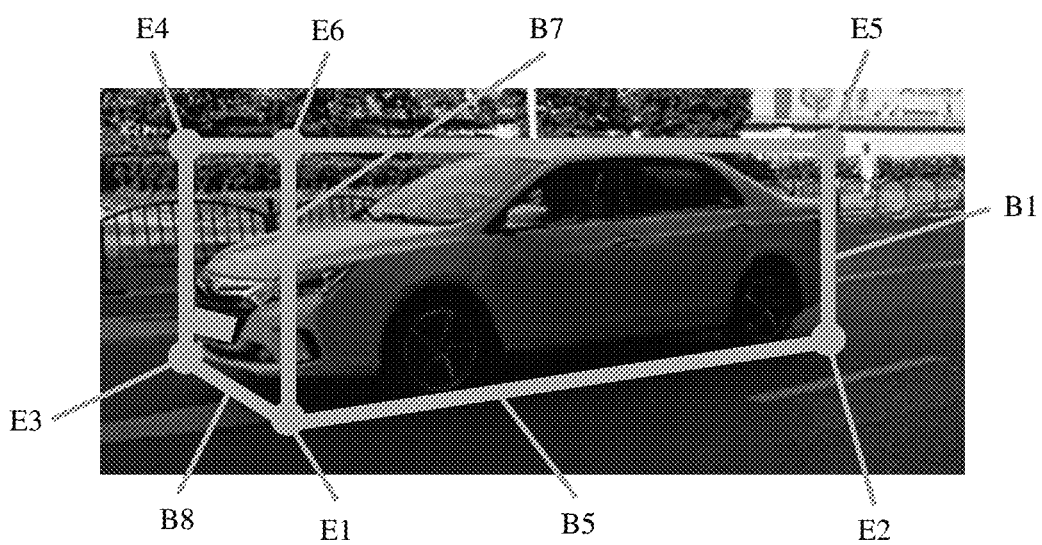
FIG. 7 is another schematic diagram of a first point in an image processing method according to an embodiment of this application.

To further understand this solution, an example is provided with reference to FIG. 5. FIG. 7 is a schematic diagram of the first point in the image processing method according to an embodiment of this application. In FIG. 7, an example in which the side face and the front face of the first vehicle are exposed in the first image is used for description. B1 represents the 2D bounding frame of the first vehicle, and the 2D bounding frame of the first vehicle is determined based on location information of the 2D bounding frame of the first vehicle. B5 represents the side line of the first vehicle, and the side line of the first vehicle is generated based on the coordinates of the wheel of the first vehicle and the first angle. B7 represents the boundary between the side face and the front face of the first vehicle, and the boundary is determined based on the location information of the boundary of the first vehicle. B8 represents the main side line of the first vehicle, and the main side line of the first vehicle is generated based on the coordinates of the first intersection point and the second angle. E1 represents an intersection point (namely, the first intersection point) between the side line and the boundary, and coordinates of E1 are the coordinates of the first intersection point. E2 represents an intersection point (namely, the second intersection point) between the side line and the right boundary of the 2D bounding frame, and coordinates of E2 are the coordinates of the second intersection point. E3 represents an intersection point (namely, the third intersection point) between the main side line and the left boundary of the 2D bounding frame, and coordinates of E3 are the coordinates of the third intersection point. E4 represents the vertex in the upper left corner (namely, one first point) of the 2D bounding frame, and coordinates of E4 are coordinates of the first point. E5 represents the vertex in the upper right corner (namely, one first point) of the 2D bounding frame, and coordinates of E5 are coordinates of the first point. E6 represents an intersection point (namely, one first point) between the boundary and the 2D bounding frame, and coordinates of E6 are coordinates of the first point. E1 to E6 are all specific first points, E1, E2, and E3 are all located on the bottom face of the 3D bounding frame of the first vehicle, E1 is a vertex of the bottom face of the 3D bounding frame of the first vehicle, E4, E5, and E6 are all located on the top face of the 3D bounding frame of the first vehicle, and E6 is a vertex of the top face of the 3D bounding frame of the first vehicle. It should be understood that: in another embodiment, the coordinates of E4, E5, and E6 may not be generated. The example in FIG. 7 is merely for ease of understanding this solution, and is not intended to limit this solution.

304: The vehicle equipped with the image processing apparatus determines whether a distance between the first vehicle and the vehicle equipped with the image processing apparatus exceeds a preset threshold. If the distance does not exceed the preset threshold, step 305 is performed. If the distance exceeds the preset threshold, step 314 is performed.

In some embodiments of this application, the vehicle equipped with the image processing apparatus generates the distance between the first vehicle and the vehicle equipped with the image processing apparatus, and further determines whether the distance between the first vehicle and the vehicle equipped with the image processing apparatus exceeds the preset threshold. If the distance does not exceed the preset threshold, step 305 is performed. If the distance exceeds the preset threshold, step 314 is performed. A value of the preset threshold may be 10 meters, 15 meters, 30 meters, 25 meters, another value, or the like, and may be specifically determined with reference to an actual product form.

Specifically, in an implementation, the vehicle equipped with the image processing apparatus generates a distance between each of at least one first point and the vehicle equipped with the image processing apparatus based on coordinates of the first point and a ground plane assumption principle, and further generates the distance between the first vehicle and the vehicle equipped with the image processing apparatus based on the distance between each first point and the vehicle equipped with the image processing apparatus.

More specifically, for any one of the at least two first points, the vehicle equipped with the image processing apparatus may generate three-dimensional coordinates of the first point in a vehicle body coordinate system based on coordinates of the first point and the ground plane assumption principle, and generate a first distance between the first point and the vehicle equipped with the image processing apparatus based on the three-dimensional coordinates of the first point in the vehicle body coordinate system. The vehicle equipped with the image processing apparatus repeats the foregoing operations to generate a first distance between each first point and the vehicle equipped with the image processing apparatus. The vehicle equipped with the image processing apparatus may select a smallest first distance from at least two first distances corresponding to the at least two first points as the distance between the first vehicle and the vehicle equipped with the image processing apparatus, and further determine whether the selected smallest first distance exceeds the preset threshold. If the selected first distance does not exceed the threshold, it is considered that the distance between the first vehicle and the vehicle equipped with the image processing apparatus does not exceed the preset threshold. In other words, when a distance between any one of the at least two first points and the vehicle equipped with the image processing apparatus does not exceed the preset threshold, it is considered that the distance between the first vehicle and the vehicle equipped with the image processing apparatus does not exceed the preset threshold. Alternatively, the vehicle equipped with the image processing apparatus may select a largest first distance from the at least two first distances as the distance between the first vehicle and the vehicle equipped with the image processing apparatus, and further determine whether the selected largest first distance exceeds the preset threshold. If the selected first distance exceeds the preset threshold, it is considered that the distance between the first vehicle and the vehicle equipped with the image processing apparatus exceeds the preset threshold. In other words, when a distance between any one of the at least two first points and the vehicle equipped with the image processing apparatus exceeds the preset threshold, it is considered that the distance between the first vehicle and the vehicle equipped with the image processing apparatus exceeds the preset threshold. Alternatively, the vehicle equipped with the image processing apparatus may use an average value of the at least two first distances as the distance between the first vehicle and the vehicle equipped with the image processing apparatus, to perform an operation of determining whether the distance between the first vehicle and the vehicle equipped with the image processing apparatus exceeds the preset threshold. In this embodiment, two specific implementations of determining whether the distance between the first vehicle and the vehicle equipped with the image processing apparatus exceeds the preset threshold are provided, thereby improving implementation flexibility of this solution.

In another implementation, the vehicle equipped with the image processing apparatus may alternatively generate three-dimensional coordinates of the wheel point of the first vehicle in the vehicle body coordinate system based on the coordinates of the wheel point of the first vehicle and a ground plane assumption principle, further generate a distance between the wheel point of the first vehicle and the vehicle equipped with the image processing apparatus based on the three-dimensional coordinates of the wheel point of the first vehicle, and determine the distance as the distance between the first vehicle and the vehicle equipped with the image processing apparatus, to perform an operation of determining whether the distance between the first vehicle and the vehicle equipped with the image processing apparatus exceeds the preset threshold.

It should be understood that, in another embodiment, the vehicle equipped with the image processing apparatus may alternatively determine the distance between the first vehicle and the vehicle equipped with the image processing apparatus by using coordinates of another point on the 3D bounding box of the first vehicle. This is not limited herein.

305: The vehicle equipped with the image processing apparatus determines, based on the indication information of the exposed face of the first vehicle in the first image, whether the side face of the first vehicle is exposed in the first image. If the side face of the first vehicle is not exposed in the first image, step 306 is performed. If the side face of the first vehicle is exposed in the first image, step 307 is performed.

In this embodiment, because the side face of the first vehicle may be exposed in the first image, or the side face may be not exposed and only the main face is exposed in the first image, processing manners in the foregoing two cases are different. After obtaining the first result, the vehicle equipped with the image processing apparatus may determine, based on the indication information of the exposed face of the first vehicle in the first image, whether the side face of the first vehicle is exposed in the first image. Specifically, when the vehicle equipped with the image processing apparatus determines, based on the indication information of the exposed face of the first vehicle in the first image, that the exposed face of the first vehicle is the left face or the right face in the first image, it is considered that the side face of the first vehicle is exposed in the first image. For how the indication information of the exposed face in the first image indicates which face is exposed, refer to the description in step 302. Details are not described herein again.

306: The vehicle equipped with the image processing apparatus generates an orientation angle of the first vehicle relative to the vehicle equipped with the image processing apparatus based on the coordinates of the center point of the 2D bounding frame and a pinhole imaging principle.

In some embodiments of this application, when the vehicle equipped with the image processing apparatus determines that the side face of the first vehicle is not exposed and only the main face is exposed in the first image, the vehicle equipped with the image processing apparatus may consider that a projection point of the 3D centroid point of the first vehicle on the image is the center point of the 2D bounding frame of the first vehicle, and further generate the orientation angle of the first vehicle relative to the vehicle equipped with the image processing apparatus based on the coordinates of the center point of the 2D bounding frame of the first vehicle and the pinhole imaging principle. Further, the vehicle equipped with the image processing apparatus may determine a driving intent of the first vehicle based on the orientation angle of the first vehicle relative to the vehicle equipped with the image processing apparatus, for example, whether the first vehicle merges.

Specifically, in an implementation, the location information of the 2D bounding frame of the first vehicle includes the coordinates of the central point of the 2D bounding frame of the first vehicle. The vehicle equipped with the image processing apparatus generates, based on the coordinates of the central point of the 2D bounding frame of the first vehicle and a first transformation relationship, an included angle $\gamma$ between projection of a first ray on the ground plane in the first image and an x axis of a camera coordinate system. The angle γ is an orientation angle of the first vehicle in the camera coordinate system. The first transformation relationship is a transformation relationship between the camera coordinate system and a coordinate system. The first transformation relationship may also be referred to as an intrinsic parameter of a camera, and is pre-generated and configured on the vehicle equipped with the image processing apparatus based on the pinhole imaging principle. The first ray is a ray whose optical center of the camera that captures the first image passes through the 3D centroid point of the first vehicle. An origin of the camera coordinate system is the camera configured on the vehicle equipped with the image processing apparatus and configured to capture the first image. Then, the vehicle equipped with the image processing apparatus generates an orientation angle θ of the first vehicle in the vehicle body coordinate system of the vehicle equipped with the image processing apparatus based on the angle γ and a second transformation relationship. The second transformation relationship is a transformation relationship between the camera coordinate system and the vehicle body coordinate system. The second transformation relationship may also be referred to as an extrinsic parameter of the camera.

Further, both the camera coordinate system and the vehicle body coordinate system are 3D coordinate systems. The x axis of the camera coordinate system may be rightward, a y axis of the camera coordinate system may be downward, and a z axis of the camera coordinate system may be forward. The x axis and the z axis of the camera coordinate system may form a plane parallel to the ground plane. A coordinate system origin of the vehicle body coordinate system may be a midpoint of a connection line between two back wheels of the vehicle equipped with the image processing apparatus, or the coordinate system origin of the vehicle body coordinate system may be the centroid point of the vehicle equipped with the image processing apparatus. The x axis of the vehicle body coordinate system may be leftward, the y axis of the vehicle body coordinate system may be forward, and the z-axis of the vehicle body coordinate system may be downward. The x axis and the y axis of the vehicle body coordinate system may form a plane parallel to the ground plane. It should be understood that the foregoing descriptions of the camera coordinate system and the vehicle body coordinate system are merely for ease of understanding this solution. In another embodiment, the coordinate system origin of the camera coordinate system and/or the vehicle body coordinate system may be adjusted, or orientations of the x axis, the y axis, and/or the z axis of the camera coordinate system may be adjusted. This is not limited herein.

307: The vehicle equipped with the image processing apparatus generates the orientation angle of the first vehicle relative to the vehicle equipped with the image processing apparatus based on the coordinates of the first point according to a first calculation rule.

In some embodiments of this application, when the vehicle equipped with the image processing apparatus determines that the distance between the first vehicle and the vehicle equipped with the image processing apparatus does not exceed the preset threshold, and a side face of the vehicle equipped with the image processing apparatus is exposed in the first vehicle, the orientation angle of the first vehicle relative to the vehicle equipped with the image processing apparatus may be generated based on the coordinates of the first point according to the first calculation rule.

Specifically, in an implementation, the vehicle equipped with the image processing apparatus generates the three-dimensional coordinates of the first point in the vehicle body coordinate system based on the coordinates of the first point and the ground plane assumption principle, where the coordinate system origin of the vehicle body coordinate system is located inside the vehicle equipped with the image processing apparatus. Concepts of the vehicle body coordinate system and the ground plane assumption principle have been described in step 306, and details are not described herein again. The vehicle equipped with the image processing apparatus generates the orientation angle based on the three-dimensional coordinates of the first point. In this embodiment, regardless of whether the first vehicle in the first image is complete, accurate coordinates of the first point can be obtained. Because the orientation angle is generated based on the coordinates of the first point and the ground plane assumption principle, accuracy of the generated orientation angle is ensured.

More specifically, for a process of obtaining the coordinates of the first point, in a case, if the indication information of the exposed face of the first vehicle indicates that only the side face of the first vehicle is exposed in the first image, coordinates of two first points may be generated, or coordinates of four first points may be generated. For a specific process of generating the coordinates of the first points, refer to the description in step 303. The vehicle equipped with the image processing apparatus may obtain, from the two first points or the four first points, two first points located on the side line of the first vehicle, in other words, obtain two first points located on a side line of the bottom face of the 3D bounding box of the first vehicle. In another case, if the side face and the main face of the first vehicle are exposed in the first image, coordinates of three first points may be generated, or coordinates of six first points may be generated. For a specific process of generating the coordinates of the first points, refer to the description in step 303. The vehicle equipped with the image processing apparatus may obtain, from the coordinates of the three first points or the coordinates of the six first points, coordinates of two first points located on the side line of the first vehicle.

For a process of generating the orientation angle, the vehicle equipped with the image processing apparatus separately generates three-dimensional coordinates of two first points in the vehicle body coordinate system based on coordinates of the two first points located at the bottom face of the outer bounding box of the first vehicle and the ground plane assumption principle, and further generates the orientation angle of the first vehicle relative to the vehicle equipped with the image processing apparatus based on the three-dimensional coordinates of the two first points in the vehicle body coordinate system. Further, after the vehicle equipped with the image processing apparatus obtains three-dimensional coordinates of one first point in the vehicle body coordinate system and three-dimensional coordinates of the other first point in the vehicle body coordinate system, if the x axis and the y axis of the vehicle body coordinate system form the plane parallel to the ground plane, the vehicle equipped with the image processing apparatus may generate the orientation angle θ of the first vehicle relative to the vehicle equipped with the image processing apparatus based on values in a x-axis direction and a y-axis direction in three-dimensional coordinates of the wheel of the first vehicle and values in the x-axis direction and the y-axis direction in three-dimensional coordinates of a target point. For example, if the three-dimensional coordinates of the one first point are $(x_1, y_1, z_1)$, and the three-dimensional coordinates of the other first point are $(x_2, y_2, z_2)$, the orientation angle of the first vehicle relative to the vehicle equipped with the image processing apparatus is $$\theta = a c \tan\left(\frac{y_2 - y_1}{x_2 - x_1}\right).$$

In another implementation, the vehicle equipped with the image processing apparatus may generate the three-dimensional coordinates of the first point in the vehicle body coordinate system and three-dimensional coordinates of the wheel of the first vehicle in the vehicle body coordinate system based on the coordinates of the first point, the coordinates of the wheel of the first vehicle, and the ground plane assumption principle, and generate the orientation angle of the first vehicle relative to the vehicle equipped with the image processing apparatus based on the three-dimensional coordinates of the first point in the vehicle body coordinate system and the three-dimensional coordinates of the wheel of the first vehicle in the vehicle body coordinate system.

More specifically, for a process of obtaining the coordinates of the first point, after the coordinates of the plurality of first points are obtained in step 303, coordinates of two first points located on the side line of the first vehicle may be obtained from the coordinates of the plurality of first points. Further, the vehicle equipped with the image processing apparatus may select coordinates of any target point from the coordinates of the two first points, generate three-dimensional coordinates of the target point in the vehicle body coordinate system and the three-dimensional coordinates of the wheel in the vehicle body coordinate system based on the coordinates of the target point, the coordinates of the wheel, and the ground plane assumption principle, and further perform an operation of generating the orientation angle. Alternatively, the vehicle equipped with the image processing apparatus may separately generate three-dimensional coordinates of the two first points in the vehicle body coordinate system and the three-dimensional coordinates of the wheel in the vehicle body coordinate system based on the coordinates of the two first points, the coordinates of the wheel, and the ground plane assumption principle, and further perform an operation of generating the orientation angle.

It should be noted that step 307 is an optional step. If step 307 is not performed, step 308 may be directly performed after step 305 is performed.

308: The vehicle equipped with the image processing apparatus obtains coordinates of a vertex of the 3D outer bounding box of the first vehicle from the coordinates of the at least two first points.

In some embodiments of this application, when it is determined that the distance between the first vehicle and the vehicle equipped with the image processing apparatus does not exceed the preset threshold, and the side face of the vehicle equipped with the image processing apparatus is exposed in the first vehicle, after obtaining the coordinates of the plurality of first points in step 303, the vehicle equipped with the image processing apparatus selects the coordinates of the vertex of the 3D outer bounding box of the first vehicle from the coordinates of the plurality of first points, to generate three-dimensional coordinates of the centroid point of the first vehicle by using the coordinates of the vertex of the 3D outer bounding box of the first vehicle. If the vertex located in the 3D outer bounding box of the first vehicle does not exist in the plurality of first points, step 309 may be no longer performed, in other words, the three-dimensional coordinates of the centroid point of the first vehicle are no longer generated.

Specifically, for a process of determining whether a first point is a vertex of the 3D outer bounding box, a first value range of a U-axis direction of the first image and a second value range of a V-axis direction of the first image may be preset on the vehicle equipped with the image processing apparatus. After coordinates of one first point are obtained, it is determined whether a value of a U-axis direction in the coordinates of the first point falls within the first value range, and whether a value of a V-axis direction in the coordinates of the first point falls within the second value range. If the value of the U-axis direction in the coordinates of the first point falls within the first value range and the value of the V-axis direction in the coordinates of the first point falls within the second value range, it is determined that the first point is a vertex of the 3D outer bounding box. If the value of the U-axis direction in the coordinates of the first point falls outside the first value range, or the value of the V-axis direction in the coordinates of the first point falls within the second value range, it is determined that the first point is not a vertex of the 3D outer bounding box.

309: The vehicle equipped with the image processing apparatus generates the three-dimensional coordinates of the centroid point of the first vehicle in the vehicle body coordinate system based on the coordinates of the vertex of the 3D outer bounding box of the first vehicle and the ground plane assumption principle, where the coordinate system origin of the vehicle body coordinate system is located inside the vehicle equipped with the image processing apparatus.

In some embodiments of this application, after obtaining the coordinates of the vertex of the 3D outer bounding box of the first vehicle from the coordinates of the plurality of first points, the vehicle equipped with the image processing apparatus generates, based on the ground plane assumption principle, three-dimensional coordinates of the vertex of the 3D outer bounding box of the first vehicle in the vehicle body coordinate system. Further, the three-dimensional coordinates of the centroid point of the first vehicle in the vehicle body coordinate system are generated based on the three-dimensional coordinates of the vertex of the 3D outer bounding box of the first vehicle and preset dimensions of the first vehicle. In this embodiment, based on the coordinates of the first point, the orientation angle of the first vehicle can be generated, and the three-dimensional coordinates of the centroid point of the first vehicle in the vehicle body coordinate system can be generated, thereby extending an application scenario of this solution. In addition, accuracy of the generated three-dimensional coordinates of the centroid point is improved.

Specifically, in an implementation, after obtaining coordinates of one first vertex from the coordinates of the plurality of first points, the vehicle equipped with the image processing apparatus may generate three-dimensional coordinates of the first vertex in the vehicle body coordinate system based on the coordinates of the first vertex and the ground plane assumption principle. At least one of the plurality of first points may be a vertex of the 3D outer bounding box of the first vehicle, and the first vertex is any vertex of the at least one first point. The vehicle equipped with the image processing apparatus may determine a location of the 3D outer bounding box of the first vehicle in the vehicle body coordinate system based on the three-dimensional coordinates of the first vertex, and further generate the three-dimensional coordinates of the centroid point of the first vehicle in the vehicle body coordinate system.

Further, the vehicle equipped with the image processing apparatus may first generate three-dimensional coordinates of a vertex of an initial 3D outer bounding box of the first vehicle based on the first image, and correct the three-dimensional coordinates of the vertex of the initial 3D outer bounding box by using the three-dimensional coordinates of the first vertex after obtaining the three-dimensional coordinates of the first vertex, to obtain three-dimensional coordinates of a vertex of a final 3D outer bounding box of the first vehicle. Further, the three-dimensional coordinates of the centroid point of the first vehicle in the vehicle body coordinate system are generated based on the three-dimensional coordinates of the vertex of the final 3D outer bounding box of the first vehicle.

In another implementation, if the side face and the main face of the first vehicle are exposed in the first image, and the plurality of first points include three first vertices located on the bottom face of the 3D outer bounding box of the first vehicle, the vehicle equipped with the image processing apparatus may alternatively directly generate three-dimensional coordinates of the three first vertices in the vehicle body coordinate system based on coordinates of the three first vertices and the ground plane assumption principle, to obtain a location of the bottom face of the 3D outer bounding box of the first vehicle in the vehicle body coordinate system, and generate the three-dimensional coordinates of the centroid point of the first vehicle in the vehicle body coordinate system. In this implementation, a height in the three-dimensional coordinates of the centroid point may not be considered.

In another implementation, the plurality of first points may include a plurality of first vertices. Therefore, if the side face and the main face of the first vehicle are exposed in the first image, and the plurality of first points include six first vertices, the vehicle equipped with the image processing apparatus may alternatively directly generate three-dimensional coordinates of the six first vertices in the vehicle body coordinate system based on coordinates of the six first vertices and the ground plane assumption principle, to obtain a location of the 3D outer bounding box of the first vehicle in the vehicle body coordinate system, and generate the three-dimensional coordinates of the centroid point of the first vehicle in the vehicle body coordinate system.

It should be noted that steps 308 and 309 are optional steps. If steps 308 and 309 are not performed, step 310 may be directly performed after step 307 is performed. If steps 308 and 309 are performed, an execution sequence between steps 308 and 309 and step 307 is not limited in this embodiment. Step 307 may be performed before steps 308 and 309, or steps 308 and 309 may be performed before step 307.

310: The vehicle equipped with the image processing apparatus generates dimensions of the first vehicle based on the coordinates of the first points and the ground plane assumption principle.

In some embodiments of this application, in an implementation, the vehicle equipped with the image processing apparatus generates only a length and/or a width of the first vehicle based on the coordinates of the first point and the ground plane assumption principle.

Specifically, when a target quantity of third vertices is greater than or equal to two, the vehicle equipped with the image processing apparatus generates the length and/or the width of the first vehicle based on coordinates of a bottom face vertex of the 3D bounding box of the first vehicle and the ground plane assumption principle. The third vertex is a bottom face vertex of the 3D outer bounding box of the first vehicle.

More specifically, after obtaining the coordinates of the plurality of first points, the vehicle equipped with the image processing apparatus may obtain coordinates of at least one first point located on a side of the bottom face of the 3D bounding box of the first vehicle from the coordinates of the plurality of first points, and separately determine, based on the coordinates of the at least one first point, whether each of the at least one first point is a bottom face vertex of the 3D outer bounding box, to calculate the target quantity corresponding to the first vehicle in the first image. To further understand this solution, an example is provided with reference to FIG. 6. FIG. 6 shows four first points: D1, D2, D3, and D4. D1 and D2 are first points located on a side of the bottom face of the 3D bounding box of the first vehicle, and only D2 is a bottom face vertex of the 3D outer bounding box of the first vehicle. It should be understood that the example provided herein with reference to FIG. 6 is merely used to facilitate understanding of a concept of the vertex of the 3D outer bounding box, and is not intended to limit this solution.

The vehicle equipped with the image processing apparatus determines, based on the indication information of the exposed face of the first vehicle, whether the main face of the first vehicle is exposed in the first image. If the main face is exposed and the target quantity is equal to three, three-dimensional coordinates of three bottom face vertices in the vehicle equipped with the image processing apparatus coordinate system are separately generated based on coordinates of the three bottom face vertices of the 3D outer bounding box of the vehicle equipped with the image processing apparatus and the ground plane assumption principle. Further, the length and the width of the first vehicle are generated based on the three-dimensional coordinates of the three bottom face vertices.

If the main face is exposed and the target quantity is equal to two, three-dimensional coordinates of two bottom face vertices in the vehicle equipped with the image processing apparatus coordinate system are separately generated based on coordinates of the two bottom face vertices of the 3D outer bounding box of the vehicle equipped with the image processing apparatus and the ground plane assumption principle. Further, the length or the width of the first vehicle is generated based on the three-dimensional coordinates of the two bottom face vertices.

If the main face is not exposed and only the side face is exposed, and the target quantity is equal to two, three-dimensional coordinates of two bottom face vertices in the vehicle equipped with the image processing apparatus coordinate system are separately generated based on coordinates of the two bottom face vertices of the 3D outer bounding box of the vehicle equipped with the image processing apparatus and the ground plane assumption principle. Further, the length of the first vehicle is generated based on the three-dimensional coordinates of the two bottom face vertices.

If the target quantity is equal to 1, regardless of whether the main face of the first vehicle is exposed in the first image, step 311 is performed, in other words, the vehicle equipped with the image processing apparatus generates the length and/or the width of the first vehicle by using another image including the first vehicle.

If the target quantity is equal to zero, the vehicle equipped with the image processing apparatus stops performing the step of generating the length and/or the width of the first vehicle.

It should be noted that, in this embodiment, an execution sequence between a step of generating the target quantity and a step of determining whether the main face of the first vehicle is exposed is not limited. The generation step may be performed before the determining step, or the determining step may be performed before the generation step.

In another implementation, the vehicle equipped with the image processing apparatus generates one or more of the following based on the coordinates of the first point and the ground plane assumption principle: a length of the first vehicle, a width of the first vehicle, and a height of the first vehicle.

Specifically, after obtaining the coordinates of the plurality of first points, the vehicle equipped with the image processing apparatus determines whether a quantity of first vertices that are in the plurality of first points and that are in vertices of the 3D bounding box of the first vehicle is greater than one. If the quantity is greater than one, the vehicle equipped with the image processing apparatus generates three-dimensional coordinates of the first vertex in the vehicle body coordinate system based on coordinates of the first vertex and the ground plane assumption principle, and generates one or more of the following based on the three-dimensional coordinates of the first vertex in the vehicle body coordinate system: the length of the first vehicle, the width of the first vehicle, and the height of the first vehicle. If the quantity is equal to one, step 311 is performed, to generate the length, the width, and/or the height of the first vehicle by using another image including the first vehicle. If the quantity is equal to zero, the vehicle equipped with the image processing apparatus stops performing a step of generating the dimensions of the first vehicle.

In this embodiment, the dimensions of the first vehicle may be further generated based on the coordinates of the first points, thereby further extending an application scenario of this solution. In addition, accuracy of the generated dimensions of the first vehicle is improved.

311: The vehicle equipped with the image processing apparatus obtains a second image, where the second image includes the first vehicle, and an image capturing angle of the second image is different from an image capturing angle of the first image.

In some embodiments of this application, the vehicle equipped with the image processing apparatus obtains the second image when the target quantity is equal to one or when the quantity of first vertices in the plurality of first points is equal to one. A manner of obtaining the second image by the vehicle equipped with the image processing apparatus is similar to a manner of obtaining the first image by the vehicle equipped with the image processing apparatus in step 301. Refer to the description in step 301. A difference between the second image and the first image lies in that the image capturing angle of the second image is different from the image capturing angle of the first image for the first vehicle.

312: The vehicle equipped with the image processing apparatus obtains coordinates of at least two second points based on the second image by using the image processing network, where the at least two second points are all located on a side of a 3D outer bounding box of the first vehicle in the second image.

In some embodiments of this application, after obtaining the second image, the vehicle equipped with the image processing apparatus inputs the second image into the image processing network to obtain a fourth result output by the image processing network. A type of information included in the fourth result is the same as that included in the first result. A difference lies in that the first result is obtained by inputting the first image into the image processing network, and the fourth result is obtained by inputting the second image into the image processing network. The vehicle equipped with the image processing apparatus generates location information of the 3D outer bounding box of the first vehicle in the second image based on the fourth result. The location information of the 3D outer bounding box of the first vehicle in the second image includes the coordinates of the at least two second points. A property of the second point is the same as that of the first point, and a difference lies in that the first point is located on the side of the 3D outer bounding box of the first vehicle in the first image, and the second point is located on the side of the 3D bounding box of the first vehicle in the second image. Two second points in the at least two second points are used to locate the side of the 3D outer bounding box of the first vehicle in the second image, and the coordinates of the at least two second points are used to locate the 3D outer bounding box of the first vehicle in the second image. For a specific implementation of step 312, refer to descriptions in steps 302 and 303. Details are not described herein again.

313: The vehicle equipped with the image processing apparatus generates the dimensions of the first vehicle based on the coordinates of the first points and the coordinates of the second points.

In some embodiments of this application, in an implementation, the vehicle equipped with the image processing apparatus generates the length and/or the width of the first vehicle based on the coordinates of the first points and the coordinates of the second points. Specifically, after obtaining the coordinates of the second points, the vehicle equipped with the image processing apparatus selects a fourth vertex from the second points, where the fourth vertex is another vertex of the bottom face of the 3D outer bounding frame of the first vehicle. The vehicle equipped with the image processing apparatus generates three-dimensional coordinates of the fourth vertex in the vehicle body coordinate system based on coordinates of the fourth vertex and the ground plane assumption principle, and further generates the length and/or the width of the first vehicle based on three-dimensional coordinates of the third vertex and the three-dimensional coordinates of the fourth vertex.

In another implementation, the vehicle equipped with the image processing apparatus generates one or more of the following based on the coordinates of the first points and the coordinates of the second points: the length of the first vehicle, the width of the first vehicle, and the height of the first vehicle. Specifically, after obtaining the coordinates of the second points, the vehicle equipped with the image processing apparatus selects a second vertex from the second points, where the second vertex is another vertex of the 3D outer bounding frame of the first vehicle. The vehicle equipped with the image processing apparatus generates three-dimensional coordinates of the second vertex in the vehicle body coordinate system based on the coordinates of the second vertex and the ground plane assumption principle, and further generates one or more of the following based on the three-dimensional coordinates of the first vertex and the three-dimensional coordinates of the second vertex: the length of the first vehicle, the width of the first vehicle, and the height of the first vehicle. In this embodiment, when the dimensions of the first vehicle cannot be generated by using one image of the first vehicle, the another image of the first vehicle is used to jointly generate the dimensions of the first vehicle. This ensures that the dimensions of the first vehicle can be generated in all cases, thereby improving comprehensiveness of this solution.

It should be noted that steps 310 to 313 are optional steps. If steps 310 to 313 are not performed, after step 309 is performed, execution may end. If steps 310 to 313 are performed, an execution sequence between steps 310 to 313 and steps 308 and 309 is not limited in this embodiment. Steps 308 and 309 may be performed before steps 310 to 313; or steps 310 to 313 may be performed before steps 308 and 309.

314: The vehicle equipped with the image processing apparatus determines, based on the indication information of the exposed face of the first vehicle in the first image, whether the side face of the first vehicle is exposed in the first image. If the side face of the first vehicle is not exposed in the first image, step 315 is performed. If the side face of the first vehicle is exposed in the first image, step 316 is performed.

315: The vehicle equipped with the image processing apparatus generates the orientation angle of the first vehicle relative to the vehicle equipped with the image processing apparatus based on the coordinates of the center point of the 2D bounding frame and the pinhole imaging principle.

In this embodiment, for a specific manner of performing steps 314 and 315 by the vehicle equipped with the image processing apparatus, refer to descriptions in steps 305 and 306. Details are not described herein again. In this embodiment, when only the main face of the first vehicle is exposed, the orientation angle of the first vehicle can be generated regardless of whether the distance between the first vehicle and the vehicle equipped with the image processing apparatus exceeds the preset threshold, thereby enriching application scenarios of this solution.

316: The vehicle equipped with the image processing apparatus generates the orientation angle of the first vehicle relative to the vehicle equipped with the image processing apparatus based on the coordinates of the first point according to a second calculation rule.

In some embodiments of this application, when determining that the distance between the first vehicle and the vehicle equipped with the image processing apparatus exceeds the preset threshold, and the side face of the first vehicle is exposed in the first image, the vehicle equipped with the image processing apparatus may generate the orientation angle of the first vehicle relative to the vehicle equipped with the image processing apparatus based on the coordinates of the first point according to the second calculation rule. In this embodiment, after the coordinates of the first point are obtained, the orientation angle of the first vehicle relative to the vehicle equipped with the image processing apparatus may be further generated based on the coordinates of the first point, to improve accuracy of the obtained orientation angle. For the two cases in which the distance between the first vehicle and the vehicle equipped with the image processing apparatus exceeds the preset threshold and the distance between the first vehicle and the vehicle equipped with the image processing apparatus does not exceed the preset threshold, different calculation rules are respectively used to generate the orientation angle of the first vehicle, thereby further improving accuracy of the generated orientation angle.

Specifically, in an implementation, step 316 may include: The vehicle equipped with the image processing apparatus generates the location information of the side line of the first vehicle based on the coordinates of the first point, and generates coordinates of a vanishing point based on the location information of the side line of the first vehicle and location information of a vanishing line of the first image, where the vanishing point is an intersection point between the side line of the first vehicle and the vanishing line of the first image. The vehicle equipped with the image processing apparatus generates the orientation angle based on the coordinates of the vanishing point and a two-point perspective principle. The two-point perspective principle may also be referred to as an angular perspective principle or a complementary angle perspective principle. The two-point perspective principle means that both the side face of the first vehicle and the main face of the first vehicle in the first image obliquely intersect with the first image, there are two vanishing points in the first image, and the two vanishing points are on a same horizon. The location information of the vanishing line of the first image may be specifically represented as a straight line equation of the vanishing line of the first image, and a location of the vanishing line of the first image is related only to an image capturing apparatus for capturing the first image.

In this embodiment, a specific implementation of generating the orientation angle of the first vehicle when the distance between the first vehicle and the vehicle equipped with the image processing apparatus exceeds the preset threshold and the side face of the first vehicle is exposed in the first image is provided. This operation is simple, and has high efficiency.

More specifically, for a process of generating the coordinates of the vanishing point, the vehicle equipped with the image processing apparatus may obtain coordinates of two, four, three, or six first points by performing step 303. For a specific implementation, refer to the description in step 303. After obtaining the coordinates of the plurality of first points, the vehicle equipped with the image processing apparatus may select the coordinates of the two first points located on the side line of the first vehicle from the coordinates of the plurality of first points, in other words, obtain the coordinates of the two first points located on the side line of the bottom face of the 3D bounding box of the first vehicle. The vehicle equipped with the image processing apparatus generates the straight line equation of the side line of the first vehicle based on the coordinates of the two first points. The straight line equation of the vanishing line of the first image may be pre-configured in the vehicle equipped with the image processing apparatus. Coordinates of the intersection point between the side line of the first vehicle and the vanishing line of the first image (namely, the coordinates of the vanishing point) are obtained based on the straight line equation of the side line of the first vehicle and the straight line equation of the vanishing line.

For a process of generating the orientation angle, after obtaining the coordinates of the vanishing point, the vehicle equipped with the image processing apparatus generates, based on the coordinates of the vanishing point and the two-point perspective principle, an included angle $\delta$ between projection of a second ray on the ground plane in the first image and the x axis of the camera coordinate system, where the angle $\delta$ is an orientation angle of the first vehicle in the camera coordinate system. The second ray is a ray whose optical center of the camera that captures the first image passes through the vanishing point. Then, the vehicle equipped with the image processing apparatus generates the orientation angle $\theta$ of the first vehicle in the vehicle body coordinate system of the vehicle equipped with the image processing apparatus based on the angle $\delta$ and the second transformation relationship. The second transformation relationship is a transformation relationship between the camera coordinate system and the vehicle body coordinate system. The second transformation relationship may also be referred to as the extrinsic parameter of the camera. For concepts of the camera coordinate system and the vehicle body coordinate system, refer to the descriptions in the foregoing steps.

In another implementation, step 316 may include: The vehicle equipped with the image processing apparatus generates a mapping relationship between the first angle and the orientation angle based on the coordinates of the first point, the first angle, and a pinhole imaging principle, and generates the orientation angle based on the mapping relationship and the first angle. For a meaning of the pinhole imaging principle, refer to the descriptions in the foregoing steps. In this embodiment, for the case in which the distance between the first vehicle and the vehicle equipped with the image processing apparatus exceeds the preset threshold, two implementations of obtaining the orientation angle are provided, thereby improving implementation flexibility of this solution.

Specifically, after obtaining the coordinates of the plurality of first points, the vehicle equipped with the image processing apparatus selects one vertex of the 3D bounding box of the first vehicle from the coordinates of the plurality of first points. If the plurality of first points include a plurality of vertices of the 3D bounding box, any vertex may be selected from the plurality of vertices. For a specific implementation of selecting the vertex of the 3D bounding box of the first vehicle from the first points, refer to the descriptions in step 308. Details are not described herein again. The vehicle equipped with the image processing apparatus may generate the mapping relationship between the first angle and the orientation angle based on coordinates of one vertex of the 3D bounding box of the first vehicle, the preset dimensions of the first vehicle, and the pinhole imaging principle, and further solve the orientation angle based on the first angle.

It should be noted that in the embodiment shown in FIG. 3A to FIG. 3C, step 304 is first used to determine whether the distance between the first vehicle and the vehicle equipped with the image processing apparatus exceeds the preset threshold, and then step 305 and step 314 are separately used to determine whether the side face of the first vehicle is exposed in the first image. In another embodiment, a step of determining whether the distance between the first vehicle and the vehicle equipped with the image processing apparatus exceeds the preset threshold and a step of determining whether the side face of the first vehicle is exposed in the first image may be exchanged. To be specific, whether the side face of the first vehicle is exposed in the first image is determined by using step 304. If the side face of the first vehicle is not exposed in the first image, the vehicle equipped with the image processing apparatus generates the orientation angle of the first vehicle relative to the vehicle equipped with the image processing apparatus based on the coordinates of the central point of the 2D bounding frame and the pinhole imaging principle. If the side face of the first vehicle is exposed in the first image, it is determined whether the distance between the first vehicle and the vehicle equipped with the image processing apparatus exceeds the preset threshold. If the distance between the first vehicle and the vehicle equipped with the image processing apparatus does not exceed the preset threshold, content described in steps 307 to 313 is performed. If the distance between the first vehicle and the vehicle equipped with the image processing apparatus exceeds the preset threshold, content described in step 316 is performed.

In this embodiment, the obtained image is input into the image processing network, and the image processing network outputs the location information of the two-dimensional bounding frame of the vehicle, the coordinates of the wheel, and the first angle. The location information of the three-dimensional (3D) outer bounding box of the first vehicle is generated based on the location information of the two-dimensional bounding frame, the coordinates of the wheel, and the first angle, to locate the 3D outer bounding box of the vehicle. Accuracy of the three parameters: the location information of the two-dimensional bounding frame, the coordinates of the wheel, and the first angle is irrelevant to whether the vehicle in the image is complete. Therefore, regardless of whether the vehicle in the image is complete, the obtained coordinates of the first points are accurate, and accuracy of the located 3D outer bounding box is high, in other words, accuracy of the obtained 3D outer bounding box is improved. Further, a driving intent of a surrounding vehicle can be more accurately determined, thereby improving driving safety of an autonomous vehicle.

2. Training Phase

Figure 8:
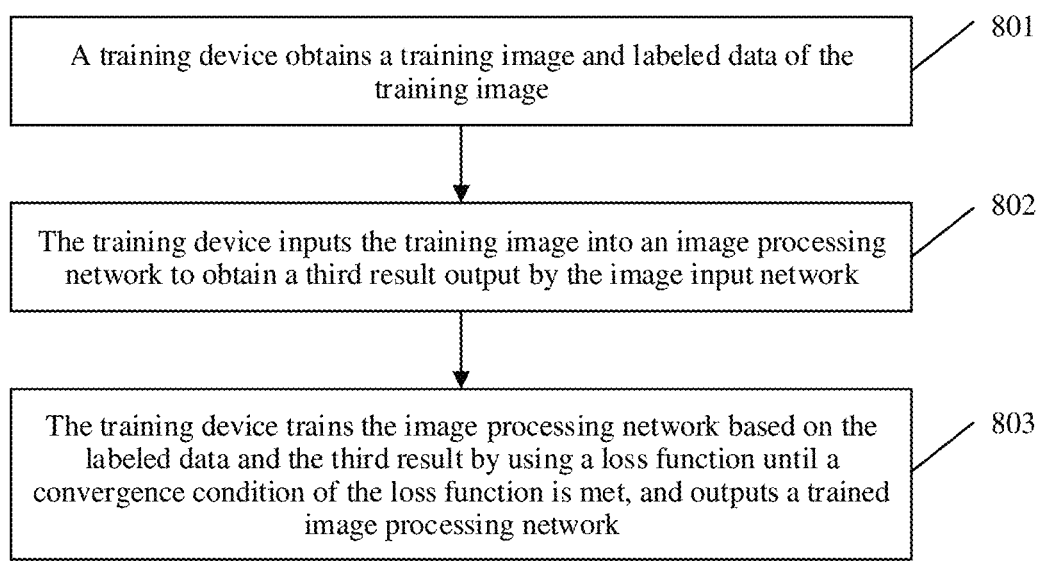
FIG. 8 is a schematic flowchart of a network training method according to an embodiment of this application.

In this embodiment, the training phase describes a process of how the training device 220 trains to obtain a mature image processing system. FIG. 8 is a schematic flowchart of a network training method according to an embodiment of this application. The image processing method provided in this embodiment may include the following steps.

801: A training device obtains a training image and labeled data of the training image.

In this embodiment, a training data set is pre-configured on the training device, and the training data set includes a plurality of training images and one or more groups of labeled data corresponding to each training image. One training image includes one or more second vehicles, and each of the plurality of groups of labeled data corresponds to one second vehicle in the training image.

When only a side face of the second vehicle is exposed in the training image, one group of labeled data includes labeled indication information of an exposed face of the second vehicle, labeled coordinates of a wheel, and a first labeled angle of the second vehicle. A first angle of the second vehicle indicates an included angle between a side line and a first axis of the training image. The side line of the second vehicle is a connection line between a vanishing point of the exposed side face in the training image and the wheel of the second vehicle. The first axis of the training image is parallel to one side of the training image. Optionally, the labeled data may further include labeled location information of a 2D bounding frame of the second vehicle.

When the side face and a main face of the second vehicle are exposed in the training image, one group of labeled data includes labeled indication information of the exposed face of the second vehicle, the labeled coordinates of the wheel of the second vehicle, the first labeled angle of the second vehicle, labeled location information of a boundary of the second vehicle, and a second labeled angle of the second vehicle. The main face of the second vehicle is a front face or rear face of the second vehicle, and the boundary is a boundary between the side face and the main face. The second angle of the second vehicle indicates an included angle between a main side line of the second vehicle and the first axis of the training image. The main side line of the second vehicle is a connection line between a vanishing point of the exposed main face of the second vehicle in the training image and a target point of the second vehicle. The target point of the second vehicle is an intersection point between the side line of the second vehicle and the boundary of the second vehicle. Optionally, the labeled data may further include the labeled location information of the 2D bounding frame of the second vehicle.

When only the main face of the second vehicle is exposed in the training image, the labeled data includes the labeled indication information of the exposed face of the second vehicle and the labeled location information of the 2D bounding frame.

Meanings and specific representation forms of the foregoing concepts are described in the embodiment corresponding to FIG. 3A to FIG. 3C, and details are not described herein again.

802: The training device inputs the training image into an image processing network to obtain a third result output by the image input network.

In this embodiment, after obtaining the training image, the training device inputs the training image into the image processing network to obtain one or more groups of third results output by the image input network. A quantity of third results is consistent with a quantity of second vehicles in the training image, and one group of third results indicates feature information of one second vehicle.

When only the side face of the second vehicle is exposed in the training image, the third result includes generated indication information of the exposed face of the second vehicle, generated coordinates of the wheel of the second vehicle, and a first generated angle of the second vehicle. Optionally, the third result may further include the generated location information of the 2D bounding frame of the second vehicle. When the side face and the main face of the second vehicle are exposed in the training image, one group of third results include the generated indication information of the exposed face of the second vehicle, the generated coordinates of the wheel of the second vehicle, the first generated angle of the second vehicle, generated location information of the boundary of the second vehicle, and a second generated angle of the second vehicle. Optionally, the third result may further include generated location information of the 2D bounding frame of the second vehicle. When only the main face of the second vehicle is exposed in the training image, the third result includes the generated indication information of the exposed face of the second vehicle and the generated location information of the 2D bounding frame of the second vehicle.

Specifically, the image processing network may include a detection network and a three-dimensional feature extraction network. The detection network may be a one-stage detection network, a two-stage detection network, another type of detection network, or the like. The two-stage detection network includes a first feature extraction network, a region proposal network (RPN), and a second feature extraction network. The first feature extraction network is configured to: perform a convolution operation on the training image to obtain feature maps of the training image, and input the feature maps of the training image into the RPN. The RPN outputs location information of one or more 2D bounding frames based on the feature maps of the training image. The first feature extraction network is further configured to extract a first feature map from the feature maps of the training image based on the location information of the 2D bounding frame output by the RPN, where the first feature map is a feature map that is in the feature maps of the training image and that is located in the 2D bounding frame output by the RPN. The first feature extraction network is further configured to generate a category corresponding to each first feature map, in other words, generate a category corresponding to each 2D bounding frame. The foregoing categories include but are not limited to a vehicle, a street lamp, a roadblock, a road sign, a guardrail, a pedestrian, and the like. The second feature extraction network is configured to perform convolution based on the first feature map, to obtain location information of a more accurate 2D bounding frame. The second feature extraction network is further configured to extract a second feature map from the feature maps of the training image, where the second feature map is a feature map that is in the feature maps of the training image and that is located in the 2D bounding frame output by the second feature extraction network. The second feature extraction network is further configured to generate a category corresponding to each second feature map, in other words, generate a category corresponding to each more accurate 2D bounding frame.

In an implementation, the image processing network includes the two-stage detection network and the three-dimensional feature extraction network. Step 802 may include: The training device inputs the training image into the two-stage detection network, to obtain location information that is of a 2D bounding frame of the second vehicle and that is output by the RPN in the two-stage detection network. The training device extracts the first feature map from the feature maps of the training image by using the first feature extraction network, where the first feature map is a feature map that is in the feature maps of the training image and that is located in the 2D bounding frame output by the RPN. The training device inputs the first feature map into the three-dimensional feature extraction network to obtain the third result output by the three-dimensional feature extraction network. In this embodiment, accuracy of the 2D bounding frame directly output by the RPN is low, in other words, precision of the first feature map obtained based on the 2D bounding frame directly output by the RPN is low. Therefore, this helps increase difficulty in a training phase, and further improves robustness of a trained image processing network.

Figure 9:
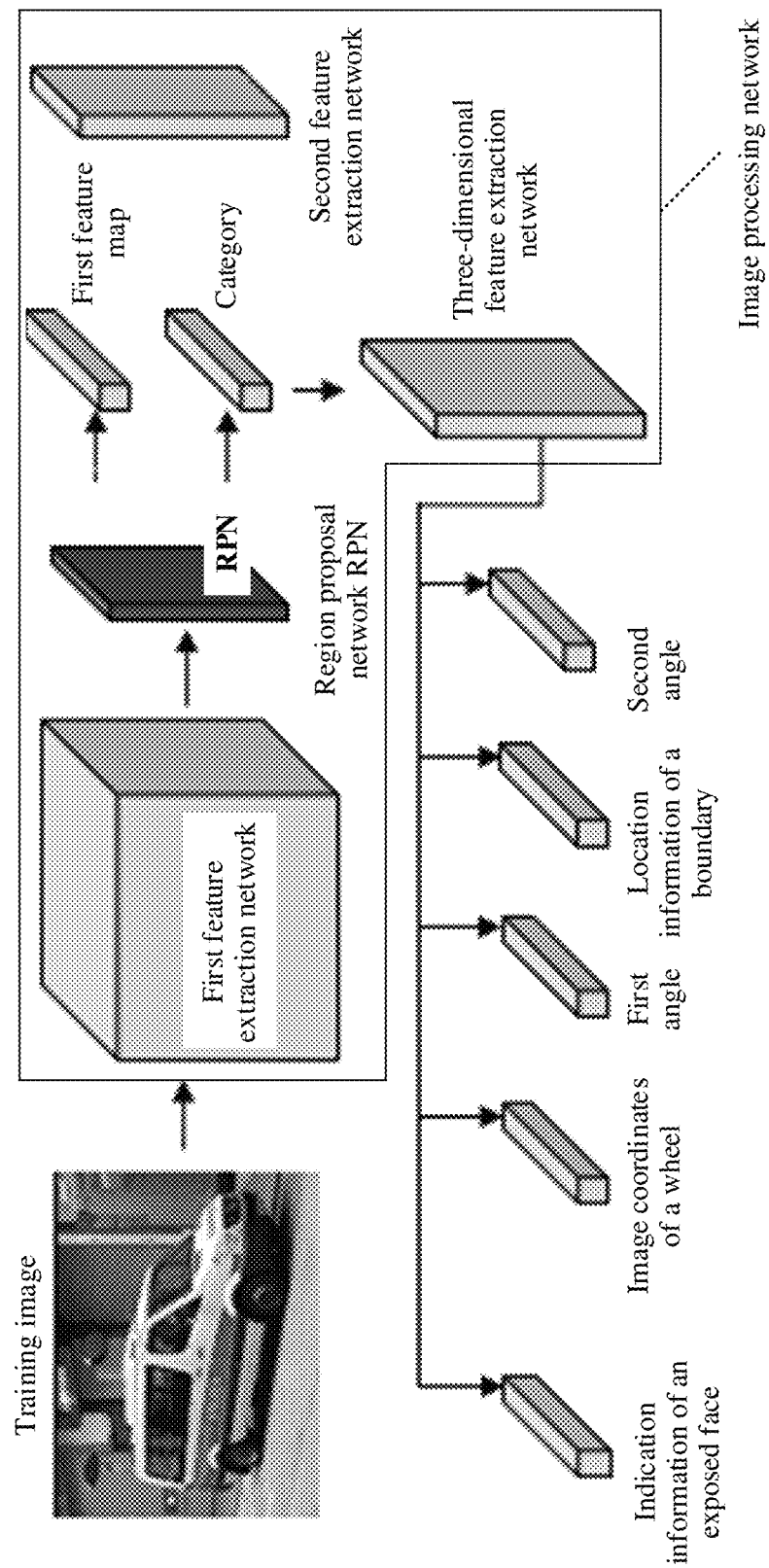
FIG. 9 is another schematic flowchart of a network training method according to an embodiment of this application.

To further understand this solution, refer to FIG. 9. FIG. 9 is a schematic flowchart of a network training method according to an embodiment of this application. As shown in FIG. 9, the image processing network includes the first feature extraction network, the RPN, the second feature extraction network, and the three-dimensional feature extraction network. In a training process, the first feature map is extracted from the feature maps of the training image based on the location information of the 2D bounding frame output by the RPN, and a category corresponding to the first feature map is generated. In other words, a category corresponding to the location information of the 2D bounding frame output by the RPN is generated based on the first feature map. The first feature map and the category corresponding to the 2D bounding frame output by the RPN are input into the three-dimensional feature extraction network. The three-dimensional feature extraction network generates three-dimensional feature information based on the first feature map and the category. The second feature extraction network is no longer used to perform secondary correction on the location information of the 2D bounding frame output by the RPN, thereby increasing difficulty of the training process. It should be understood that the example in FIG. 9 is merely for ease of understanding this solution. In an actual product, the three-dimensional feature extraction network may further output fewer or more types of three-dimensional feature information. This is not limited herein.

In another implementation, step 802 may include: The training device inputs the training image into the detection network, to obtain the second feature map output by the entire detection network, and outputs the second feature map to the three-dimensional feature extraction network to obtain the third result output by the three-dimensional feature extraction network.

Figure 10:
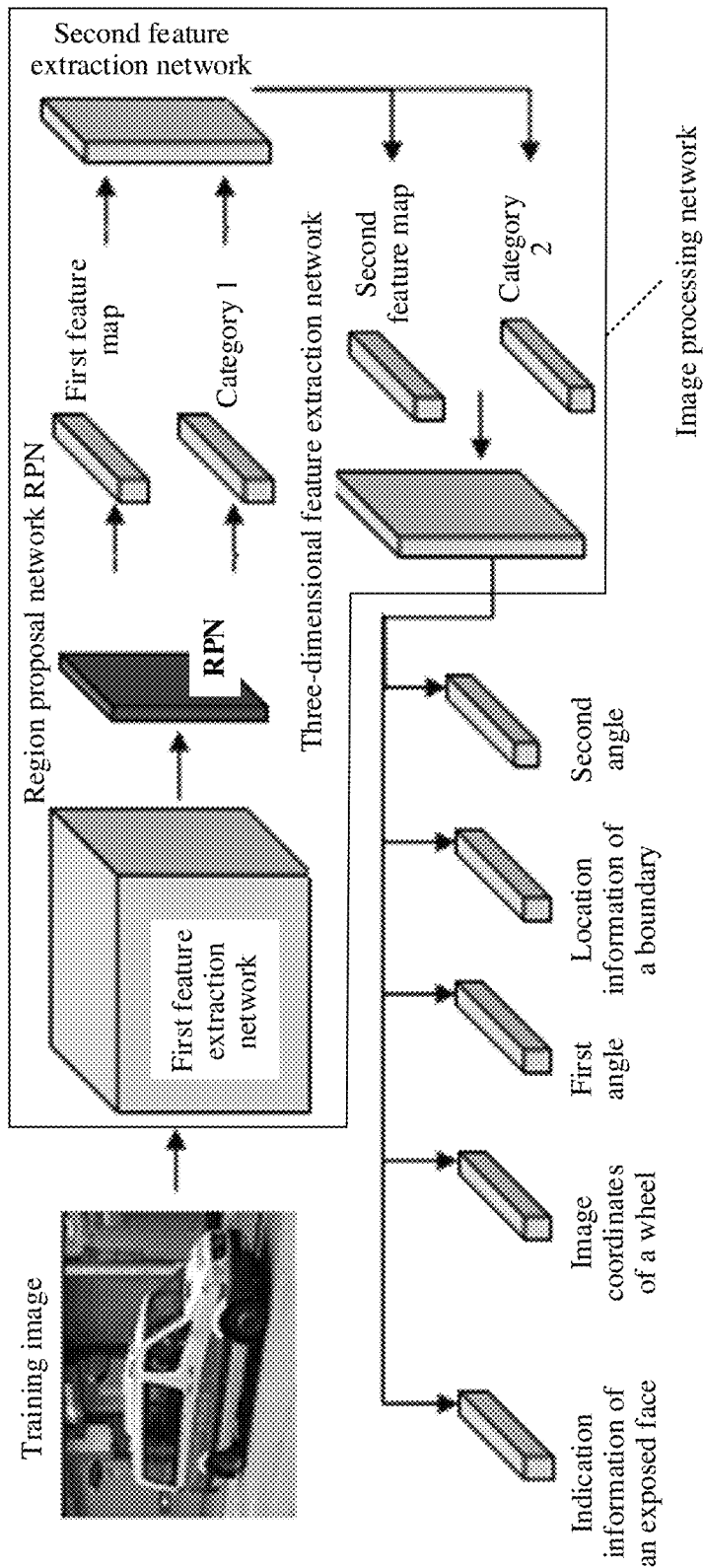
FIG. 10 is still another schematic flowchart of a network training method according to an embodiment of this application.

To further understand this solution, refer to FIG. 10. FIG. 10 is a schematic flowchart of a network training method according to an embodiment of this application. The image processing network includes the first feature extraction network, the RPN, the second feature extraction network, and the three-dimensional feature extraction network. In the training process, the second feature extraction network performs reconvolution based on the first feature map, to obtain more accurate location information of the 2D bounding frame, and extracts the second feature map from the feature maps of the training image based on the more accurate location information of the 2D bounding frame, to generate a category corresponding to the second feature map. In other words, a category 2 corresponding to the location information that is of the 2D bounding frame and that is output by the second feature extraction network is generated based on the second feature map. The three-dimensional feature extraction network generates the three-dimensional feature information based on the second feature map and the category 2 that is output by the second feature extraction network. It should be understood that the example in FIG. 10 is merely for ease of understanding this solution, and is not intended to limit this solution.

803: The training device trains the image processing network based on the labeled data and the third result by using a loss function until a convergence condition of the loss function is met, and outputs the trained image processing network.

In this embodiment, after obtaining the labeled data and the third result, the training device may train the image processing network once by using the loss function. The training device performs iterative training on the image processing network by using the plurality of training images in the training data set and the labeled data of each training image until the convergence condition of the loss function is met. The loss function may be specifically an L1 loss function, a cross entropy loss function, another type of loss function, and/or the like.

When only the side face of the second vehicle is exposed in the training image, the loss function is used to shorten similarity between the generated indication information of the exposed face and the labeled indication information of the exposed face, shorten similarity between the generated coordinates of the wheel and the labeled coordinates of the wheel, and shorten similarity between the first generated angle and the first labeled angle. Optionally, the loss function is further used to shorten similarity between the generated location information of the 2D bounding frame and the labeled location information of the 2D bounding frame.

When the side face and the main face of the second vehicle are exposed in the training image, in addition to the foregoing functions, the loss function is further used to shorten similarity between the generated location information of the boundary and the labeled location information of the boundary, and shorten similarity between the second generated angle and the second labeled angle.

When only the main face of the second vehicle is exposed in the training image, the loss function is used to shorten similarity between the generated indication information of the exposed face and the labeled indication information of the exposed face, and shorten similarity between the generated location information of the 2D bounding frame and the labeled location information of the 2D bounding frame.

Specifically, because the labeled data and the third result may include a plurality of types of information, loss functions of a same type or different types may be used for different types of information. In one training process, the training device may obtain loss function values of all types of information one by one, and then perform summation to obtain a final loss function value. After obtaining the loss function values of all types of information one by one, the training device may alternatively perform weighted summation to obtain a final loss function value. A gradient value is generated based on the final loss function value, and a parameter of the image processing network is updated by using the gradient value in a gradient, to complete one training of the image processing network.

To further understand this solution, the following presents specific formulas of loss functions corresponding to various types of information. For example, a loss function corresponding to the indication information of the exposed face uses the L1 loss function, and the formulas may be as follows:

$$L_{side\_visi} = \Sigma_{i \in rpn} \Sigma_{m \in \{front,back,left,right\}} x_{ij}^{k} \text{smooth}_{L1}(\text{sigmoid}[p_{side,i}^{m}] - \hat{g}_{side,j}^{m}), x_{ij}^{k}=0,1 \; \hat{g}_{side\_j}^{m}=0,1; \quad (1)$$

$L_{side\_visi}$ represents the loss function corresponding to the indication information of the exposed face. $x_{ij}^{k}$ represents whether an $i^{th}$ 2D bounding frame output by the RPN matches a $j^{th}$ labeled 2D bounding frame of a $k^{th}$ category. If a value of $x_{ij}^{k}$ is 1, it indicates that matching succeeds. If the value of $x_{ij}^{k}$ is 0, it indicates that the matching fails. Because the training image may include not only the vehicle, but also the street lamp, the roadblock, the road sign, the guardrail, the pedestrian, or another type, the $k^{th}$ category refers to the vehicle. $m \in \{\text{front, back, left, right}\}$ represents the front face, the rear face, the left face, and the right face of the second vehicle respectively. $\hat{g}_{side,j}^{m}$, represents labeled indication information about whether an m face of the second vehicle in the $j^{th}$ labeled 2D bounding frame is exposed. If a value of $\hat{g}_{side,j}^{m}$ is 1, it indicates that the m face of the second vehicle is exposed in the training image. If the value of $\hat{g}_{side,j}^{m}$ is 0, it indicates that the m face of the second vehicle is not exposed in the training image. $p_{side,i}^{m}$ represents indication information that is about whether the m face of the second vehicle in the $i^{th}$ 2D bounding frame output by the RPN is exposed and that is generated by the image processing network. If a value of $p_{side,i}^{m}$ is 1, it indicates that the image processing network predicts that the m face of the second vehicle is exposed in the training image. If the value of $p_{side,i}^{m}$ is 0, it indicates that the image processing network predicts that the m face of the second vehicle is not exposed in the training image.

For the $i^{th}$ 2D bounding frame output by the RPN, the training device calculates an intersection over union (IOU) between the $i^{th}$ 2D bounding frame and each labeled 2D bounding frame in the $k^{th}$ category. A threshold of the intersection over union is preset on the training device. If the generated intersection over union is greater than the threshold, a value of x_ij^k is 1. If the generated intersection over union is less than or equal to the threshold, the value of x_ij^k is 0. For example, the threshold of the intersection over union may be 0.5.

For example, a loss function corresponding to the coordinates of the wheel uses the L1 loss function, and the formulas may be as follows:

$$L_{wheel} = \Sigma_{i \in rpn} \Sigma_{m \in \{x,y\}} x_{ij}^{k} \text{smooth}_{L1}(p_{wheel,i}^{m} - \hat{g}_{wheel,j}^{m}), \hat{g}_{wheel,j}^{x} = (g_{wheel,j}^{x} - d_{i}^{cx}), \hat{g}_{wheel,j}^{y} = (g_{wheel,j}^{y} - d_{i}^{cy}); \quad (2)$$

$L_{wheel}$ represents the loss function corresponding to the coordinates of the wheel, $p_{wheel,i}^m$ represents $p_{wheel,i}^x$ and $p_{wheel,i}^y$, $\hat{g}_{wheel,j}^m$, represents $\hat{g}_{wheel,j}^x$ and $\hat{g}_{wheel,j}^y$, $p_i^x$ represents x coordinates (which may also be referred to as u coordinates) generated by the image processing network for the wheel point of the second vehicle in the $i^{th}$ 2D bounding frame output by the RPN, $p_{wheel,i}^y$ represents y coordinates (which may also be referred to as v coordinates) generated by the image processing network for the wheel point of the second vehicle in the $i^{th}$ 2D bounding frame output by the RPN, $g_{wheel,j}^x$ represents x labeled coordinates of the wheel point of the second vehicle for the $j^{th}$ labeled 2D bounding frame, $d_i^{cx}$ represents x coordinates of the center point generated by the image processing network for the $i^{th}$ 2D bounding frame output by the RPN, $g_{wheel,j}^y$ represents y coordinates of the wheel point of the second vehicle for the $j^{th}$ labeled 2D bounding frame, and $d_i^{cy}$ represents y coordinates of the center point generated by the image processing network for the $i^{th}$ 2D bounding frame output by the RPN.

For example, a loss function corresponding to the location information of the boundary uses the L1 loss function, and the formulas may be as follows:

$$L_{boundary} = \Sigma_{i \in rpn} x_{ij}^k \text{smooth}_{L1}(p_{boundary,i}^x - \hat{g}_{boundary,j}^x),$$
$$\hat{g}_{boundary,j}^x = (g_{boundary,j}^x - d_i^{cx}); \quad (3)$$

$L_{boundary}$ represents the loss function corresponding to location information of the boundary, $p_{boundary,i}^x$ represents the location information generated by the image processing network for the boundary of the second vehicle in the $i^{th}$ 2D bounding frame output by the RPN, $g_{boundary,j}^x$ represents labeled x coordinates for the boundary of the second vehicle for the $j^{th}$ labeled 2D bounding frame, and $d_i^{cx}$ represents x coordinates of the center point generated by the image processing network for the $i^{th}$ 2D bounding frame output by the RPN.

For a loss function corresponding to the location information of the 2D bounding frame, a commonly used loss function is the L1 loss function. The training device may calculate a deviation between generated coordinates of the center point of the $i^{th}$ 2D bounding frame and labeled coordinates of the center point of the $j^{th}$ labeled 2D bounding frame, and calculate log values of ratios of a length and a width that are generated by the $i^{th}$ 2D bounding frame to a length and a width that are labeled by the $j^{th}$ labeled 2D bounding frame. Optionally, if the image processing network further outputs a category of each 2D bounding frame, a loss function corresponding to the category of the 2D bounding frame may be the cross entropy loss function.

For example, a loss function corresponding to the first angle and the second angle uses the L1 loss function, and the formulas may be as follows:

$$L_{degree} = \Sigma_{i \in rpn} \Sigma_{m1 \in \{alpha, beta\}} \Sigma_{w \in bin} x_{ij}^k p1_{iw}^{m1}$$
$$\log \widehat{g1}_{iw}^{m1} + \Sigma_{i \in rpn} \Sigma_{m1 \in \{alpha, beta\}}$$
$$\Sigma_{w \in [target_{bin}-1, target_{bin}+1]} x_{ij}^k \text{smooth}_{L1}$$
$$(p2_{iw}^{m1} - \widehat{g2}_{iw}^{m1}), \widehat{g1}_{iw}^{m1} = 0, 1 \widehat{g2}_{iw}^{m1} =$$
$$(g_{iw}^{m1} - w^* \text{delta})/\text{delta}; \quad (4)$$

$L_{degree}$ represents the loss function corresponding to the first angle and the second angle, alpha represents the first angle, and beta represents the second angle. The training device divides the 360-degree angle into bin intervals, and a quantity of angles occupied in each interval is delta. $p1_{iw}^{m1}$ represents whether m1 generated by the image processing network for the second vehicle in the $i^{th}$ 2D bounding frame output by the RPN falls within an interval w. If a value of $p1_{iw}^{m1}$ is 1, it indicates that the generated m1 falls within the interval w. If the value of $p1_{iw}^{m1}$ is 0, it indicates that the generated m1 does not fall within the interval w. $\widehat{g1}_{iw}^{m1}$ represents whether labeled m1 of the second vehicle in the $j^{th}$ labeled 2D bounding frame falls within the interval w. If a value of $\widehat{g1}_{iw}^{m1}$ is 1, it indicates that the labeled m1 falls within the interval w. If the value of $\widehat{g1}_{iw}^{m1}$ is 0, it indicates that the labeled m1 does not fall within the interval w. $p2_{iw}^{m1}$ represents an angle offset of the generated m1 relative to a segment in the interval w. $\widehat{g2}_{iw}^{m1}$ represents an angle offset of the labeled m1 relative to the segment of the interval w. $g_{iw}^{m1}$ represents the labeled m1.

It should be noted that the examples in formula (1) to formula (4) are merely for ease of understanding this solution, and are not intended to limit this solution.

The training device performs iterative training on the image processing network by using the plurality of training images in the training data set until the convergence condition of the loss function is met, and the training device outputs the trained image processing network. The convergence condition may be a convergence condition that meets the loss function, or may be a convergence condition that a quantity of iteration times reaches a preset quantity of times, another type of convergence condition, or the like. The output image processing network includes the detection network and the three-dimensional feature extraction network. When the detection network is the two-stage detection network, regardless of whether the training device uses an implementation corresponding to FIG. 9 or an implementation corresponding to FIG. 10 in step 802, the output image processing network includes the first feature extraction network, the RPN, the second feature extraction network, and the three-dimensional feature extraction network.

In this embodiment, the obtained image is input into the image processing network, and the image processing network outputs the location information of the two-dimensional bounding frame of the vehicle, the coordinates of the wheel, and the first angle. The first angle is an included angle between the side line of the vehicle and the first axis. Accuracy of the three parameters: the location information of the two-dimensional bounding frame, the coordinates of the wheel, and the first angle is irrelevant to whether the vehicle in the image is complete. Therefore, regardless of whether the vehicle in the image is complete, the trained image processing network can output accurate information. This helps improve stability of the image processing network. In addition, a rule of labeling the location information of the two-dimensional bounding frame, the coordinates of the wheel, and the first angle is simple. Compared with a current manner of labeling the training data by using a laser radar, difficulty in a training data labeling process is greatly reduced.

Figure 11A:
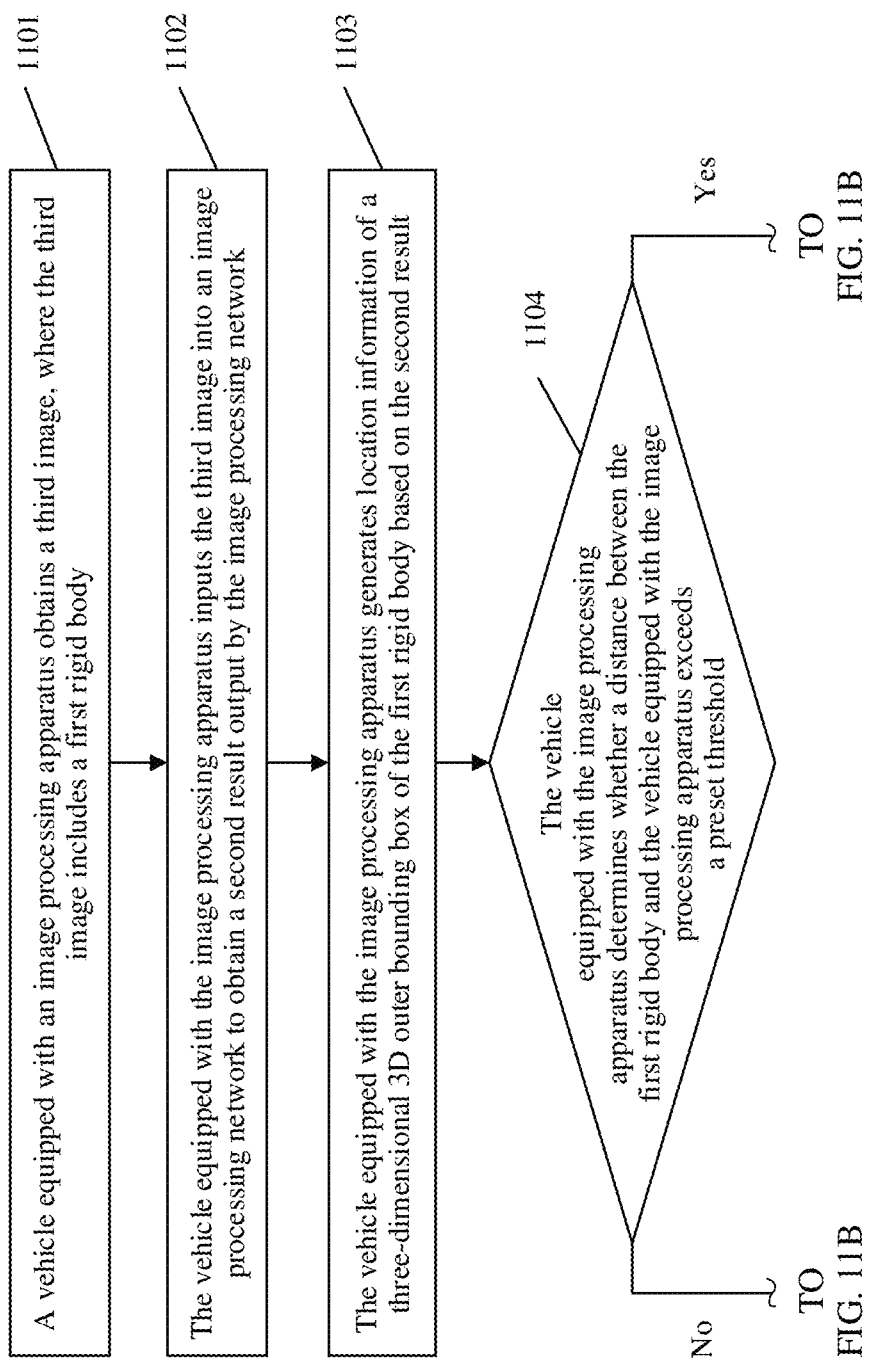
Figure 11C:
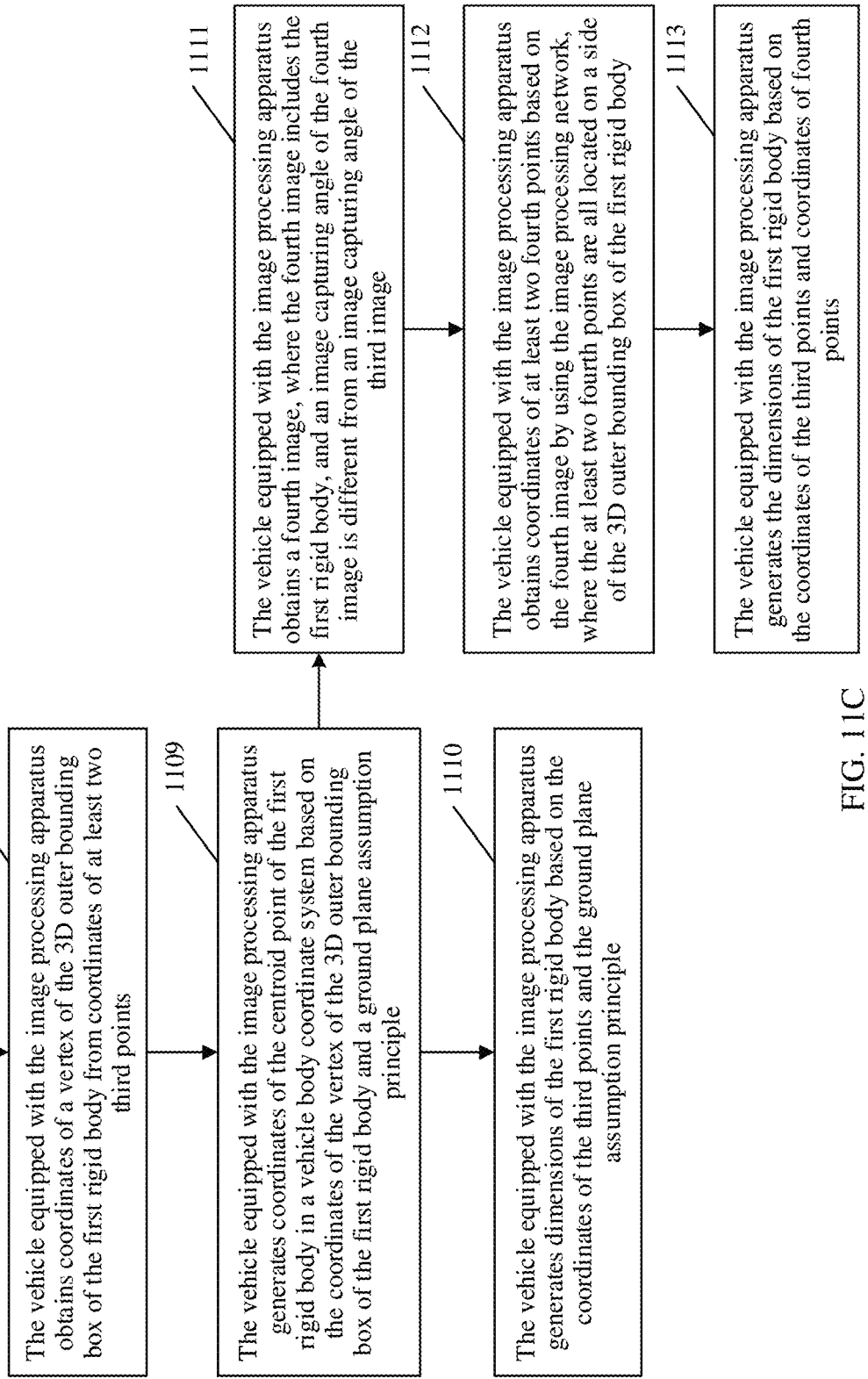

An embodiment of this application further provides an image processing method, and the method is applied to the inference phase. FIG. 11A to FIG. 11C are a schematic flowchart of an image processing method according to an embodiment of this application. The image processing method provided in this embodiment may include the following steps.

1101: A vehicle equipped with an image processing apparatus obtains a third image, where the third image includes a first rigid body, and the first rigid body is a cube.

In this embodiment, a specific implementation of performing step 1101 by the vehicle equipped with the image processing apparatus is similar to a specific implementation of step 301 in the embodiment corresponding to FIG. 3A to FIG. 3C. Details are not described herein again. A difference lies in that an object definitely included in the first image is the first vehicle, an object definitely included in the third image is the first rigid body, and a shape of the first rigid body is the cube. The first rigid body may be specifically represented as an entire object, or may be represented as a part of an object. For example, if the entire object is a guardrail in the middle of a road, the first rigid body may be a square part at the bottom of the guardrail.

1102: The vehicle equipped with the image processing apparatus inputs the third image into an image processing network to obtain a second result output by the image processing network.

In this embodiment, when a side face of the first rigid body is exposed in the third image, each group of second results may include location information of a two-dimensional (2D) bounding frame of the first rigid body and a first angle. When only a main face of the first rigid body is exposed and the side face is not exposed in the first image, each group of second results may include the location information of the 2D bounding frame of the first rigid body. The main face is a front face or rear face. Optionally, when the main face and the side face of the first rigid body are exposed in the first image, the second result may further include location information of a boundary of the first rigid body and a second angle of the first rigid body. Further, optionally, the second result may further include indication information of an exposed face of the first rigid body in the first image.

A specific implementation of performing step 1102 by the vehicle equipped with the image processing apparatus is similar to a specific implementation of step 302 in the embodiment corresponding to FIG. 3A to FIG. 3C, and a meaning of the second result in the embodiment corresponding to FIG. 11A to FIG. 11C is similar to a meaning of the second result in the embodiment corresponding to FIG. 3A to FIG. 3C. A difference lies in that, first, various types of information included in the first result are all used to describe a feature of the first vehicle, and various types of information included in the second result are all used to describe a feature of the first rigid body. Second, because the first rigid body is a cube, unlike the first vehicle, there is no wheel protrusion, and the second result does not include information such as coordinates of a wheel. Correspondingly, when only the main face or only the side face of the first rigid body is exposed in the third image, in other words, the second result does not include the location information of the boundary, the second result may further include coordinates of a vertex in a lower left corner of the 2D bounding frame and/or coordinates of a vertex in a lower right corner of the 2D bounding frame, to replace the coordinates of the wheel in the first result in the embodiment corresponding to FIG. 3A to FIG. 3C. When the main face and the side face of the first rigid body are exposed in the third image, in other words, the second result includes the location information of the boundary of the first rigid body, the second result may further include one or more of the following: coordinates of an intersection point between the boundary of the first rigid body and a bottom side of the 2D bounding frame of the first rigid body, the coordinates of the vertex in the lower left corner of the 2D bounding frame of the first rigid body, and the coordinates of the vertex in the lower right corner of the 2D bounding frame of the first rigid body, to replace the coordinates of the wheel in the first result in the embodiment corresponding to FIG. 3A to FIG. 3C. For a specific meaning of each type of information included in the second result, refer to the description in the embodiment corresponding to FIG. 3A to FIG. 3C. Details are not described herein again.

1103: The vehicle equipped with the image processing apparatus generates location information of a three-dimensional (3D) outer bounding box of the first rigid body based on the second result.

In this embodiment, when only the main face or only the side face of the first rigid body is exposed in the third image, if the second result does not include the coordinates of the vertex in the lower left corner of the 2D bounding frame of the first rigid body and/or the coordinates of the vertex in the lower right corner of the 2D bounding frame of the first rigid body, the vehicle equipped with the image processing apparatus may alternatively generate the coordinates of the vertex in the lower left corner of the 2D bounding frame of the first rigid body and/or the coordinates of the vertex in the lower right corner of the 2D bounding frame of the first rigid body based on the location information of the 2D bounding frame of the first rigid body, to replace the coordinates of the wheel in the first result in the embodiment corresponding to FIG. 3A to FIG. 3C. When the main face and the side face of the first rigid body are exposed in the third image, in other words, the second result includes the location information of the boundary of the first rigid body, the vehicle equipped with the image processing apparatus may generate one or more of the following based on the location information of the 2D bounding frame of the first rigid body and the location information of the boundary of the first rigid body: the coordinates of the intersection point between the boundary of the first rigid body and the bottom side of the 2D bounding frame of the first rigid body, the coordinates of the vertex in the lower left corner of the 2D bounding frame of the first rigid body, and the coordinates of the vertex in the lower right corner of the 2D bounding frame of the first rigid body, to replace the coordinates of the wheel in the first result in the embodiment corresponding to FIG. 3A to FIG. 3C.

1104: The vehicle equipped with the image processing apparatus determines whether a distance between the first rigid body and the vehicle equipped with the image processing apparatus exceeds a preset threshold. If the distance does not exceed the preset threshold, step 1105 is performed. If the distance exceeds the preset threshold, step 1114 is performed.

1105: The vehicle equipped with the image processing apparatus determines, based on the indication information of the exposed face of the first rigid body in the third image, whether the side face of the first rigid body is exposed in the third image. If the side face of the first rigid body is not exposed in the third image, step 1106 is performed. If the side face of the first rigid body is exposed in the third image, step 1107 is performed.

1106: The vehicle equipped with the image processing apparatus generates an orientation angle of the first rigid body relative to the vehicle equipped with the image processing apparatus based on coordinates of the center point of the 2D bounding frame of the first rigid body and a pinhole imaging principle.

1107: The vehicle equipped with the image processing apparatus generates the orientation angle of the first rigid body relative to the vehicle equipped with the image processing apparatus based on coordinates of a third point according to a first calculation rule.

1108: The vehicle equipped with the image processing apparatus obtains coordinates of a vertex of the 3D outer bounding box of the first rigid body from coordinates of at least two third points.

1109: The vehicle equipped with the image processing apparatus generates three-dimensional coordinates of the centroid point of the first rigid body in a vehicle body coordinate system based on the coordinates of the vertex of the 3D outer bounding box of the first rigid body and a ground plane assumption principle, where a coordinate system origin of the vehicle body coordinate system is located inside the vehicle equipped with the image processing apparatus.

1110: The vehicle equipped with the image processing apparatus generates dimensions of the first rigid body based on the coordinates of the third points and the ground plane assumption principle.

1111: The vehicle equipped with the image processing apparatus obtains a fourth image, where the fourth image includes the first rigid body, and an image capturing angle of the fourth image is different from an image capturing angle of the third image.

1112: The vehicle equipped with the image processing apparatus obtains coordinates of at least two fourth points based on the fourth image by using the image processing network, where the at least two fourth points are all located on a side of the 3D outer bounding box of the first rigid body.

1113: The vehicle equipped with the image processing apparatus generates the dimensions of the first rigid body based on the coordinates of the third points and the coordinates of the fourth points.

1114: The vehicle equipped with the image processing apparatus determines, based on the indication information of the exposed face of the first rigid body in the third image, whether the side face of the first rigid body is exposed in the third image. If the side face of the first rigid body is not exposed in the third image, step 1116 is performed. If the side face of the first rigid body is exposed in the third image, step 1117 is performed.

1115: The vehicle equipped with the image processing apparatus generates the orientation angle of the first rigid body relative to the vehicle equipped with the image processing apparatus based on the coordinates of the center point of the 2D bounding frame of the first rigid body and the pinhole imaging principle.

1116: The vehicle equipped with the image processing apparatus generates the orientation angle of the first rigid body relative to the vehicle equipped with the image processing apparatus based on the coordinates of the third point according to a second calculation rule.

In this embodiment, a specific manner of performing steps 1103 to 1116 by the vehicle equipped with the image processing apparatus is similar to a specific implementation of steps 303 to 316 in the embodiment corresponding to FIG. 3A to FIG. 3C. For details, refer to descriptions in steps 303 and 316 in the embodiment corresponding to FIG. 3A to FIG. 3C. Details are not described herein again.

In this embodiment, a 3D bounding box of a vehicle can be located, and a 3D bounding box of a general rigid body can be located, thereby greatly expanding an application scenario of this solution.

Figure 12:
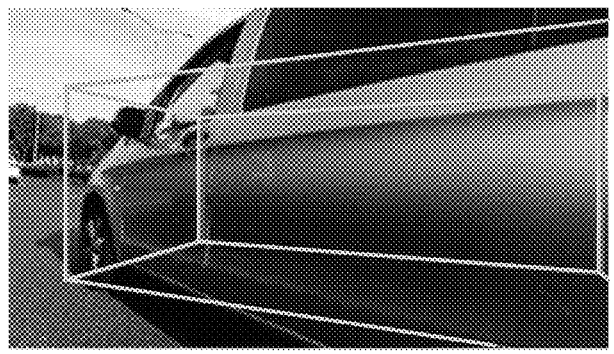
FIG. 12 is a schematic diagram of a 3D bounding box in an image processing method according to an embodiment of this application.
Figure 12:
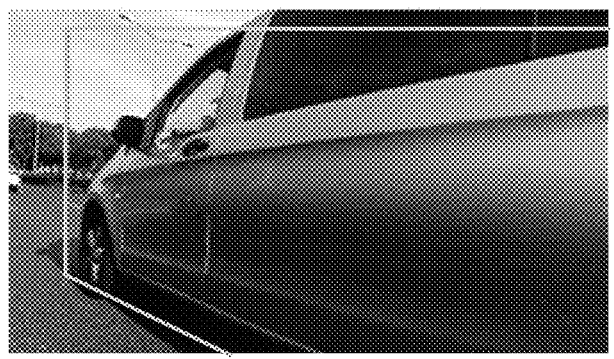

To more intuitively reflect beneficial effects brought by embodiments of this application, refer to FIG. 12. FIG. 12 is a schematic diagram of the 3D bounding box in the image processing method according to an embodiment of this application. FIG. 12 includes two sub-schematic diagrams: (a) and (b). The sub-schematic diagram (a) in FIG. 12 shows a 3D bounding box of a vehicle located by using a current solution in the industry. The sub-schematic diagram (b) in FIG. 12 shows a side face of a 3D bounding box located by using the solution provided in embodiments of this application. It is clearly that the 3D bounding box located by using the solution in embodiments of this application is more accurate.

In addition, more accurate 3D feature information can be obtained by using the solution provided in embodiments of this application. The following further describes beneficial effects brought by embodiments of this application with reference to data. For a case in which an image does not include a complete vehicle, an error of an orientation angle generated by using the current solution in the industry is 22.5 degrees, an error of an orientation angle generated by using the solution provided in embodiments of this application is 6.7 degrees, and performance is improved by about 70%. An error rate of a centroid point location generated by using the current solution in the industry is 18.4%, an error rate of a centroid point location generated by using the solution provided in embodiments of this application is 6.2%, and performance is improved by about 66%.

Figure 13:
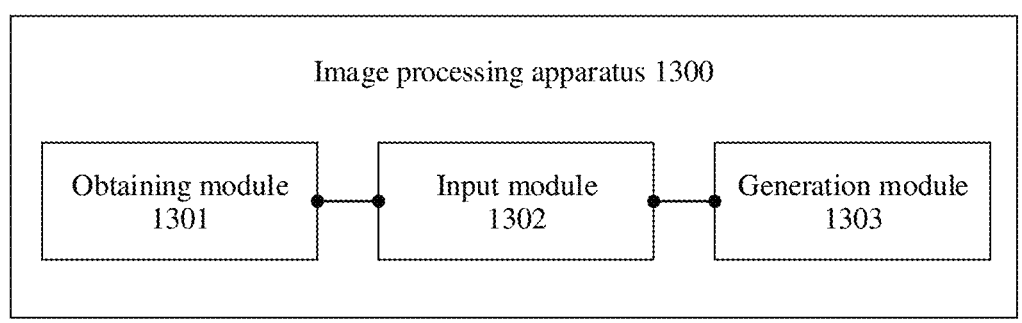
FIG. 13 is a schematic diagram of a structure of an image processing apparatus according to an embodiment of this application.

Based on the embodiments corresponding to FIG. 1 to FIG. 12, to better implement the foregoing solutions in embodiments of this application, the following further provides a related device configured to implement the foregoing solutions. Specifically, refer to FIG. 13. FIG. 13 is a schematic diagram of a structure of an image processing apparatus according to an embodiment of this application. An image processing apparatus 1300 may include an obtaining module 1301, an input module 1302, and a generation module 1303. The obtaining module 1301 is configured to obtain a first image, where the first image includes a first vehicle. The input module 1302 is configured to input the first image into an image processing network to obtain a first result output by the image processing network. When a side face of the first vehicle is exposed in the first image, the first result includes location information of a two-dimensional (2D) bounding frame of the first vehicle, coordinates of a wheel of the first vehicle, and a first angle of the first vehicle. The first angle of the first vehicle indicates an included angle between a side line of the first vehicle and a first axis of the first image. The side line of the first vehicle is an intersection line between the exposed side face of the first vehicle and the ground plane on which the first vehicle is located. The first axis of the first image is parallel to one side of the first image. The generation module 1303 is configured to generate location information of a three-dimensional (3D) outer bounding box of the first vehicle based on the location information of the 2D bounding frame of the first vehicle, the coordinates of the wheel, and the first angle. The location information of the 3D outer bounding box of the first vehicle includes coordinates of at least two first points, the at least two first points are all located on a side of the 3D outer bounding box of the first vehicle, two first points in the at least two first points are used to locate the side of the 3D outer bounding box of the first vehicle, and the coordinates of the at least two first points are used to locate the 3D outer bounding box of the first vehicle.

In a possible design, when only the side face of the first vehicle is exposed in the first image, the at least two first points include two intersection points between the side line of the first vehicle and the 2D bounding frame of the first vehicle.

In a possible design, the generation module 1303 is specifically configured to: generate location information of the side line of the first vehicle based on the coordinates of the wheel of the first vehicle and the first angle of the first vehicle; and generate coordinates based on the location information of the side line of the first vehicle and the location information of the 2D bounding frame of the first vehicle, to obtain the coordinates of the at least two first points.

In a possible design, when the side face and a main face of the first vehicle are exposed in the first image, the first result further includes location information of a boundary of the first vehicle and a second angle of the first vehicle. The boundary is a boundary between the side face and the main face, and the main face of the first vehicle is a front face or rear face of the first vehicle. The second angle of the first vehicle indicates an included angle between a main side line of the first vehicle and the first axis of the first image. The main side line of the first vehicle is an intersection line between the exposed main face of the first vehicle and the ground plane on which the first vehicle is located. The at least two first points include a first intersection point, a second intersection point, and a third intersection point. The first intersection point is an intersection point between the side line of the first vehicle and the boundary of the first vehicle, and the first intersection point is a vertex of the 3D outer bounding box of the first vehicle. The second intersection point is an intersection point between the side line of the first vehicle and the 2D bounding frame of the first vehicle. The third intersection point is an intersection point between the main side line of the first vehicle and the 2D bounding frame of the first vehicle.

In a possible design, the generation module 1303 is specifically configured to: generate location information of the side line of the first vehicle based on the coordinates of the wheel of the first vehicle and the first angle of the first vehicle; generate coordinates of the first intersection point based on the location information of the side line of the first vehicle and the location information of the boundary of the first vehicle; generate coordinates of the second intersection point based on the location information of the side line of the first vehicle and the location information of the 2D bounding frame of the first vehicle; generate location information of the main side line of the first vehicle based on the coordinates of the first intersection point and the second angle of the first vehicle; and generate coordinates of the third intersection point based on the location information of the main side line of the first vehicle and the location information of the 2D bounding frame of the first vehicle.

In a possible design, the generation module 1303 is further configured to: when the side face of the first vehicle is exposed in the first image, generate an orientation angle of the first vehicle relative to a vehicle equipped with the image processing apparatus based on coordinates of a first point.

In a possible design, the generation module 1303 is further configured to generate a distance between the first point and the vehicle equipped with the image processing apparatus based on the coordinates of the first point and a ground plane assumption principle. The generation module 1303 is specifically configured to: when it is determined, based on the distance between the first point and the vehicle equipped with the image processing apparatus, that a distance between the first vehicle and the vehicle equipped with the image processing apparatus does not exceed a preset threshold, generate the orientation angle based on the coordinates of the first point according to a first calculation rule; or when it is determined, based on the distance between the first point and the vehicle equipped with the image processing apparatus, that a distance between the first vehicle and the vehicle equipped with the image processing apparatus exceeds a preset threshold, generate the orientation angle based on the coordinates of the first point according to a second calculation rule, where the second calculation rule and the first calculation rule are different.

In a possible design, when a distance between any one of the at least two first points and the vehicle equipped with the image processing apparatus does not exceed the preset threshold, it is considered that the distance between the first vehicle and the vehicle equipped with the image processing apparatus does not exceed the preset threshold; or when a distance between any one of the at least two first points and the vehicle equipped with the image processing apparatus exceeds the preset threshold, it is considered that the distance between the first vehicle and the vehicle equipped with the image processing apparatus exceeds the preset threshold.

In a possible design, the generation module 1303 is specifically configured to: generate three-dimensional coordinates of the first point in a vehicle body coordinate system based on the coordinates of the first point and the ground plane assumption principle, where a coordinate system origin of the vehicle body coordinate system is located inside the vehicle equipped with the image processing apparatus; and generate the orientation angle based on the three-dimensional coordinates of the first point.

In a possible design, the generation module 1303 is specifically configured to: generate the location information of the side line of the first vehicle based on the coordinates of the first point and the first angle of the first vehicle, and generate coordinates of a vanishing point based on the location information of the side line of the first vehicle and location information of a vanishing line of the first image, where the vanishing point is an intersection point between the side line of the first vehicle and the vanishing line of the first image; and generate the orientation angle based on the coordinates of the vanishing point and a two-point perspective principle.

In a possible design, the generation module 1303 is specifically configured to: generate a mapping relationship between the first angle of the first vehicle and the orientation angle based on the coordinates of the first point, the first angle of the first vehicle, and a pinhole imaging principle; and generate the orientation angle based on the mapping relationship and the first angle of the first vehicle.

In a possible design, the obtaining module 1301 is further configured to obtain coordinates of a vertex of the 3D outer bounding box of the first vehicle from the coordinates of the at least two first points. The generation module 1303 is further configured to generate three-dimensional coordinates of the centroid point of the first vehicle in a vehicle body coordinate system based on the coordinates of the vertex of the 3D outer bounding box of the first vehicle and a ground plane assumption principle, where a coordinate system origin of the vehicle body coordinate system is located inside a vehicle equipped with an image processing apparatus.

In a possible design, the obtaining module 1301 is further configured to obtain coordinates of a first vertex from the coordinates of the at least two first points, where the first vertex is a vertex of the 3D outer bounding box of the first vehicle. The generation module 1303 is further configured to generate three-dimensional coordinates of the first vertex in a vehicle body coordinate system based on the coordinates of the first vertex and a ground plane assumption principle. The generation module 1303 is further configured to: if the at least two first points include at least two first vertices, generate one or more of the following based on three-dimensional coordinates of the first vertices in the vehicle body coordinate system: a length of the first vehicle, a width of the first vehicle, and a height of the first vehicle, where a coordinate system origin of the vehicle body coordinate system is located inside a vehicle equipped with an image processing apparatus.

In a possible design, the obtaining module 1301 is further configured to: if the at least two first points include one first vertex, obtain a second image, where the second image includes the first vehicle, and an image capturing angle of the second image is different from an image capturing angle of the first image. The generation module 1303 is further configured to obtain coordinates of at least two second points based on the second image by using the image processing network. The at least two second points are all located on a side of the three-dimensional (3D) outer bounding box of the first vehicle, two second points in the at least two second points are used to locate the side of the 3D outer bounding box of the first vehicle, and the coordinates of the at least two second points are used to locate the 3D outer bounding box of the first vehicle. The generation module 1303 is further configured to generate three-dimensional coordinates of a second vertex in the vehicle body coordinate system based on coordinates of a second point and the ground plane assumption principle, where the second vertex is a vertex of the 3D outer bounding box of the first vehicle, and the second vertex and the first vertex are different. The generation module 1303 is further configured to generate one or more of the following based on the three-dimensional coordinates of the first vertex and the three-dimensional coordinates of the second vertex: the length of the first vehicle, the width of the first vehicle, and the height of the first vehicle.

It should be noted that content such as information exchange between and an execution process and technical effects of the modules/units in the image processing apparatus 1300 is based on a same concept as the method embodiments corresponding to FIG. 3A to FIG. 7 in this application. For specific content, refer to the descriptions in the foregoing method embodiments in this application. Details are not described herein again.

Figure 14:
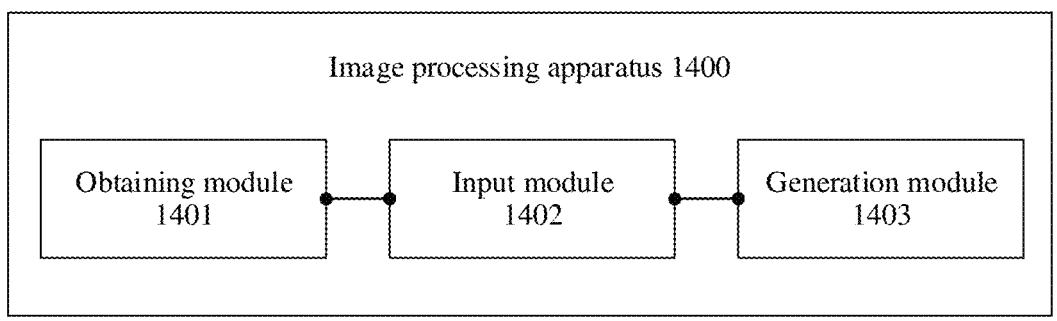
FIG. 14 is another schematic diagram of a structure of an image processing apparatus according to an embodiment of this application.

An embodiment of this application further provides an image processing apparatus. For details, refer to FIG. 14. FIG. 14 is a schematic diagram of a structure of an image processing apparatus according to an embodiment of this application. An image processing apparatus 1400 may include an obtaining module 1401, an input module 1402, and a generation module 1403. The obtaining module 1401 is configured to obtain a third image, where the third image includes a first rigid body, and the first rigid body is a cube. The input module 1402 is configured to input the third image into an image processing network to obtain a second result output by the image processing network. When a side face of the first rigid body is exposed in the third image, the second result includes location information of a 2D bounding frame of the first rigid body and a first angle of the first rigid body. The first angle of the first rigid body indicates an included angle between a side line of the first rigid body and a first axis of the third image. The side line of the first rigid body is an intersection line between the exposed side face of the first rigid body and the plane on which the first rigid body is located. The first axis of the third image is parallel to one side of the third image. The generation module 1403 is configured to generate location information of a three-dimensional (3D) outer bounding box of the first rigid body based on the location information of the 2D bounding frame of the first rigid body and the first angle. The location information of the 3D outer bounding box of the first rigid body includes coordinates of at least two third points, the at least two third points are all located on a side of the 3D outer bounding box of the first rigid body, two third points in the at least two third points are used to locate the side of the 3D outer bounding box of the first rigid body, and the coordinates of the at least two third points are used to locate the 3D outer bounding box of the first rigid body.

In a possible design, when only the side face of the first rigid body is exposed in the third image, the at least two third points include two intersection points between the side line of the first rigid body and the 2D bounding frame of the first rigid body.

In a possible design, when the side face and a main face of the first rigid body are exposed in the third image, the first result further includes location information of a boundary of the first rigid body and a second angle of the first rigid body. The boundary is a boundary between the side face and the main face. The main face of the first rigid body is a front face or rear face of the first rigid body. The second angle of the first rigid body indicates an included angle between a main side line of the first rigid body and the first axis of the third image. The main side line of the first rigid body is an intersection line between the exposed main face of the first rigid body and the ground plane on which the first rigid body is located. The at least two third points include a first intersection point, a second intersection point, and a third intersection point. The first intersection point is an intersection point between the side line of the first rigid body and the boundary of the first rigid body, and the first intersection point is a vertex of the 3D outer bounding box of the first rigid body. The second intersection point is an intersection point between the side line of the first rigid body and the 2D bounding frame of the first rigid body. The third intersection point is an intersection point between the main side line of the first rigid body and the 2D bounding frame of the first rigid body.

In a possible design, the generation module 1403 is further configured to generate three-dimensional feature information of the first rigid body based on the coordinates of the at least two third points, where the three-dimensional feature information of the first rigid body includes one or more of the following: an orientation angle of the first rigid body relative to a vehicle equipped with an image processing apparatus, location information of the centroid point of the first rigid body, and dimensions of the first rigid body.

It should be noted that content such as information exchange between and an execution process and technical effects of the modules/units in the image processing apparatus 1400 is based on a same concept as the method embodiments corresponding to FIG. 11A to FIG. 11C in this application. For specific content, refer to the descriptions in the foregoing method embodiments in this application. Details are not described herein again.

Figure 15:
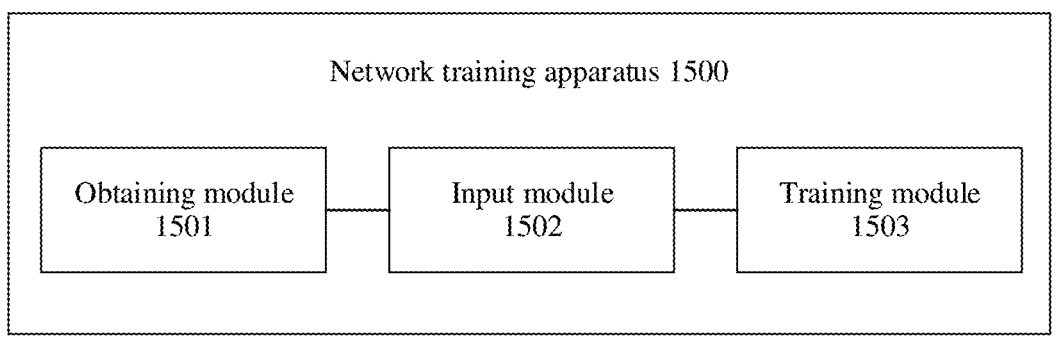
FIG. 15 is a schematic diagram of a structure of a network training apparatus according to an embodiment of this application.

An embodiment of this application further provides a network training apparatus. For details, refer to FIG. 15. FIG. 15 is a schematic diagram of a structure of a network training apparatus according to an embodiment of this application. A network training apparatus 1500 may include an obtaining module 1501, an input module 1502, and a training module 1503. The obtaining module 1501 is configured to obtain a training image and labeled data of the training image, where the training image includes a second vehicle. When a side face of the second vehicle is exposed in the training image, the labeled data includes labeled coordinates of a wheel of the second vehicle and a first labeled angle of the second vehicle. A first angle of the second vehicle indicates an included angle between a side line of the second vehicle and a first axis of the training image. The side line of the second vehicle is an intersection line between the exposed side face of the second vehicle and the ground plane on which the second vehicle is located. The first axis of the training image is parallel to one side of the training image. The input module 1502 is configured to input the training image into an image processing network to obtain a third result output by the image input network, where the third result includes generated coordinates of the wheel of the second vehicle and a first generated angle of the second vehicle. The training module 1503 is configured to train the image processing network based on the labeled data and the third result by using a loss function until a convergence condition of the loss function is met; and output a trained image processing network, where the loss function is used to shorten similarity between the generated coordinates and the labeled coordinates, and shorten similarity between the first generated angle and the first labeled angle.

In a possible design, when the side face and a main face of the second vehicle are exposed in the training image, the labeled data further includes labeled location information of a boundary of the second vehicle and a second labeled angle of the second vehicle. The third result further includes generated location information of the boundary of the second vehicle and a second generated angle of the second vehicle. The loss function is further used to shorten similarity between the generated location information and the labeled location information, and shorten similarity between the second generated angle and the second labeled angle.

The main face of the second vehicle is a front face or rear face of the second vehicle, and the boundary is a boundary between the side face and the main face. A second angle of the second vehicle indicates an included angle between a main side line of the second vehicle and the first axis of the training image, and the main side line of the second vehicle is an intersection line between the exposed main face of the second vehicle and the ground plane on which the second vehicle is located.

In a possible design, the image processing network includes a two-stage detection network and a three-dimensional feature extraction network, and the two-stage detection network includes a region proposal network (RPN). The input module 1502 is specifically configured to: input the training image into the two-stage detection network, to obtain location information that is of a 2D bounding frame of the second vehicle and that is output by the RPN in the two-stage detection network; and input a first feature map into the three-dimensional feature extraction network to obtain the third result output by the three-dimensional feature extraction network, where the first feature map is a feature map that is in feature maps of the training image and that is located in the 2D bounding frame output by the RPN. The training module 1503 is specifically configured to output the image processing network including the two-stage detection network and the three-dimensional feature extraction network.

It should be noted that content such as information exchange between and an execution process and beneficial effects of the modules/units in the network training apparatus 1500 is based on a same concept as the method embodiments corresponding to FIG. 8 to FIG. 10 in this application. For specific content, refer to the descriptions in the foregoing method embodiments in this application. Details are not described herein again.

Figure 16:
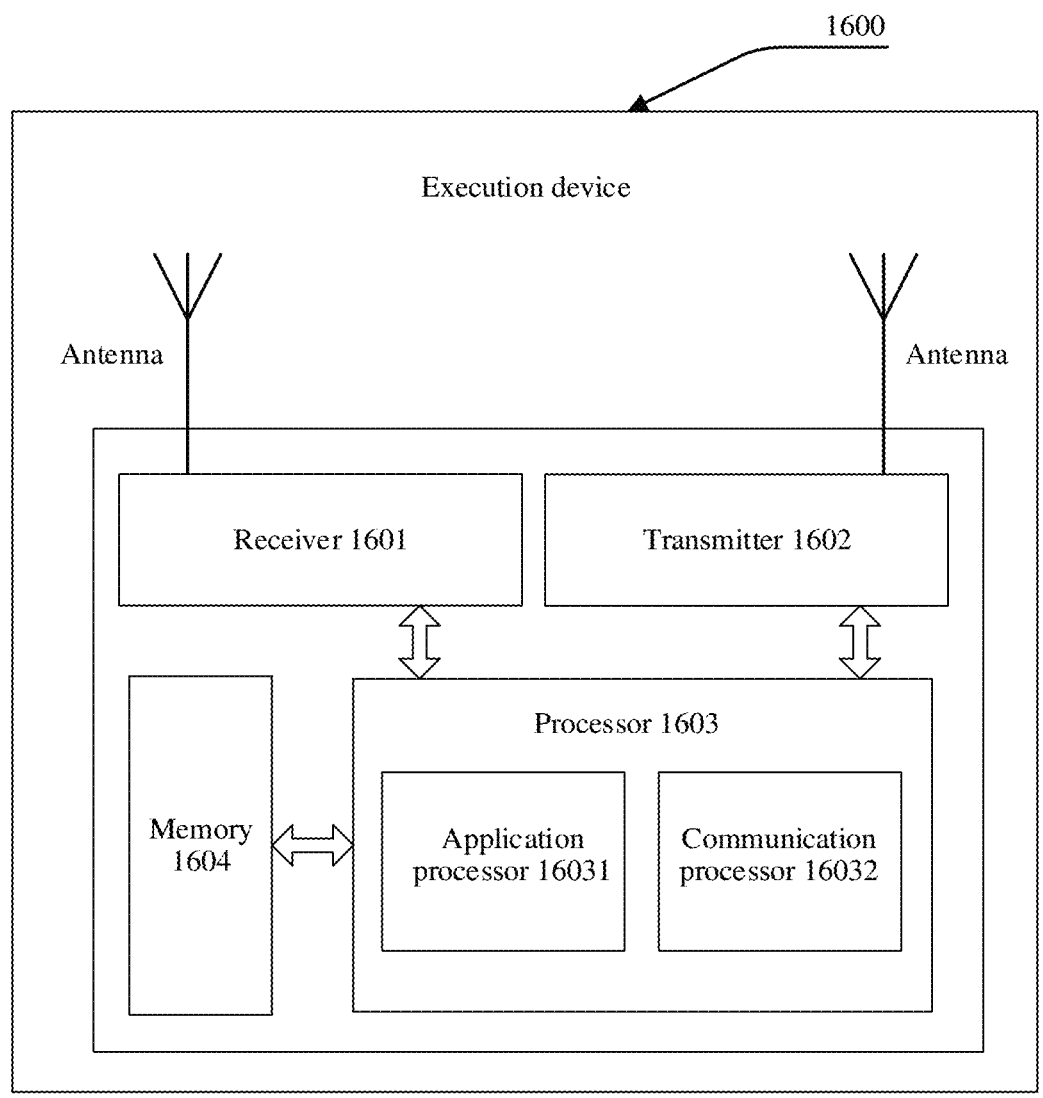
FIG. 16 is a schematic diagram of a structure of an execution device according to an embodiment of this application.

An embodiment of this application further provides an execution device. FIG. 16 is a schematic diagram of a structure of an execution device according to an embodiment of this application. An execution device 1600 may be specifically represented as an autonomous vehicle, a processing chip in an autonomous vehicle, another product form, or the like. The image processing apparatus 1300 described in the embodiment corresponding to FIG. 13 may be deployed on the execution device 1600, to implement functions of the vehicle equipped with the image processing apparatus in the embodiments corresponding to FIG. 3A to FIG. 7. Alternatively, the image processing apparatus 1400 described in the embodiment corresponding to FIG. 14 may be deployed on the execution device 1600, to implement functions of the vehicle equipped with the image processing apparatus in the embodiment corresponding to FIG. 11A to FIG. 11C. The execution device 1600 includes a receiver 1601, a transmitter 1602, a processor 1603, and a memory 1604 (there may be one or more processors 1603 in the execution device 1600, and one processor is used as an example in FIG. 16). The processor 1603 may include an application processor 16031 and a communication processor 16032. In some embodiments of embodiments of this application, the receiver 1601, the transmitter 1602, the processor 1603, and the memory 1604 may be connected through a bus or in another manner.

The memory 1604 may include a read-only memory and a random access memory, and provide instructions and data for the processor 1603. A part of the memory 1604 may further include a non-volatile random access memory (NVRAM). The memory 1604 stores a processor and operation instructions, an executable module or a data structure, or a subset thereof or an extended set thereof. The operation instructions may include various operation instructions for implementing various operations.

The processor 1603 controls an operation of a data generation apparatus. In specific application, components of the data transmission apparatus are coupled together through a bus system. In addition to a data bus, the bus system includes a power bus, a control bus, and a status signal bus. However, for clear description, various types of buses in the figure are referred to as the bus system.

The methods disclosed in embodiments of this application may be applied to the processor 1603 or may be implemented by the processor 1603. The processor 1603 may be an integrated circuit chip and has a signal processing capability. In an implementation process, various steps in the foregoing method may be completed by using an integrated logic circuit of hardware in the processor 1603 or instructions in a form of software. The processor 1603 may be a general-purpose processor, a digital signal processor (DSP), a microprocessor, or a microcontroller, and may further include an application-specific integrated circuit (ASIC), a field-programmable gate array (FPGA) or another programmable logic device, a discrete gate or transistor logic device, or a discrete hardware component. The processor 1603 may implement or perform the methods, steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1604, and the processor 1603 reads information in the memory 1604 and completes the steps in the foregoing methods in combination with hardware of the processor.

The receiver 1601 may be configured to receive input digit or character information, and generate signal input related to a related setting and function control of the data generation apparatus. The transmitter 1602 may be configured to output digit or character information through a first interface. The transmitter 1602 may be further configured to send an instruction to a disk group through the first interface, to modify data in the disk group. The transmitter 1602 may further include a display device such as a display screen.

Figure 17:
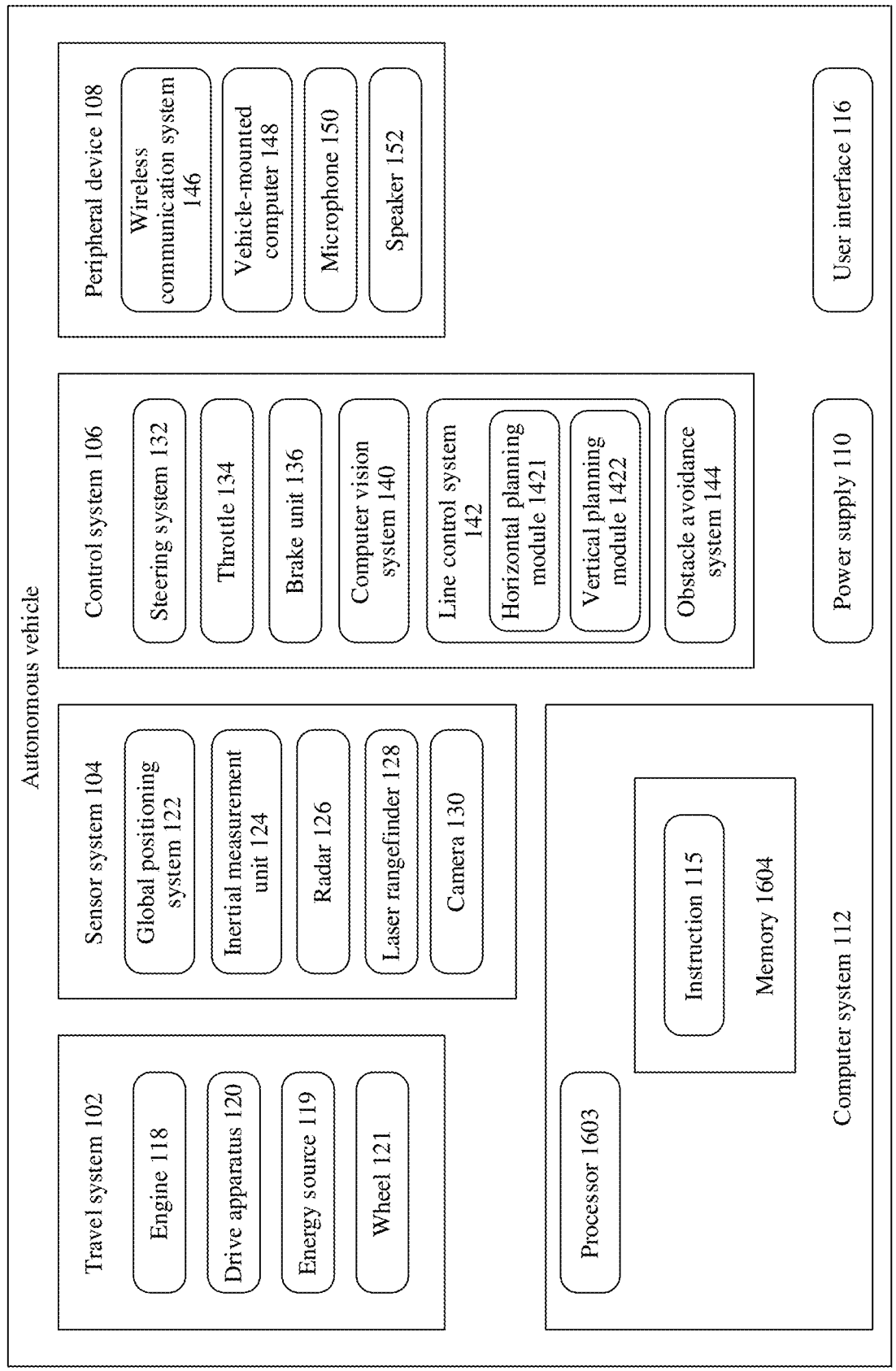
FIG. 17 is a schematic diagram of a structure of an autonomous vehicle according to an embodiment of this application.

If the execution device is specifically represented as the autonomous vehicle, refer to FIG. 17. FIG. 17 is a schematic diagram of a structure of an autonomous vehicle according to an embodiment of this application. A system of the autonomous vehicle is further described by using FIG. 17. The autonomous vehicle is configured to be in a fully or partially autonomous driving mode. For example, the autonomous vehicle may control itself while being in the autonomous driving mode, and may determine a current status of the vehicle and a current status of an ambient environment of the vehicle by using a manual operation, determine possible behavior of at least one other vehicle in the ambient environment, determine a confidence level corresponding to a possibility that the other vehicle performs the possible behavior, and control the autonomous vehicle based on determined information. When the autonomous vehicle is in the autonomous driving mode, it may be set that the autonomous vehicle may operate in a case of not interacting with a person.

The autonomous vehicle may include various subsystems, for example, a travel system 102, a sensor system 104, a control system 106, one or more peripheral devices 108, a power supply 110, a computer system 112, and a user interface 116. Optionally, the autonomous vehicle may include more or fewer subsystems, and each subsystem may include a plurality of elements. In addition, the subsystems and the elements of the autonomous vehicle may be interconnected in a wired or wireless manner.

The travel system 102 may include components that power the autonomous vehicle. In an embodiment, the travel system 102 may include an engine 118, an energy source 119, a drive apparatus 120, and a wheel/tire 121.

The engine 118 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 118 converts the energy source 119 into mechanical energy. Examples of the energy source 119 include gasoline, diesel, other oil-based fuels, propane, other compressed gas-based fuels, ethanol, solar panels, batteries, and other power sources. The energy source 119 may further provide energy for another system of the autonomous vehicle. The drive apparatus 120 may transmit mechanical power from the engine 118 to the wheel 121. The drive apparatus 120 may include a gearbox, a differential, and a drive shaft. In an embodiment, the drive apparatus 120 may further include another component, for example, a clutch. The drive shaft may include one or more shafts that may be coupled to one or more wheels 121.

The sensor system 104 may include several sensors that sense information about an ambient environment of the autonomous vehicle. For example, the sensor system 104 may include a positioning system 122 (the positioning system may be a global positioning system (GPS), a BeiDou system, or another positioning system), an inertial measurement unit (IMU) 124, a radar 126, a laser rangefinder 128, and a camera 130. The sensor system 104 may further include a sensor that monitors an internal system of the autonomous vehicle (for example, a vehicle-mounted air quality monitor, a fuel gauge, or an oil temperature gauge). One or more pieces of sensor data from these sensors may be used to detect objects and corresponding features (a location, a shape, a direction, a velocity, and the like) of the objects. Detection and recognition are key functions for implementing a secure operation by the autonomous vehicle.

The positioning system 122 may be configured to estimate a geographical location of the autonomous vehicle. The IMU 124 is configured to sense a location and an orientation change of the autonomous vehicle based on inertial acceleration. In an embodiment, the IMU 124 may be a combination of an accelerometer and a gyroscope. The radar 126 may sense an object in the ambient environment of the autonomous vehicle by using a radio signal, and may be specifically represented as a millimeter-wave radar or a laser radar. In some embodiments, in addition to the object, the radar 126 may be further configured to sense a velocity and/or a moving direction of the object. The laser rangefinder 128 may use a laser to sense an object in an environment in which the autonomous vehicle is located. In some embodiments, the laser rangefinder 128 may include one or more laser sources, a laser scanner, one or more detectors, and another system component. The camera 130 may be configured to capture a plurality of images of the ambient environment of the autonomous vehicle. The camera 130 may be a static camera or a video camera.

The control system 106 controls operations of the autonomous vehicle and components of the autonomous vehicle. The control system 106 may include various components, including a steering system 132, a throttle 134, a brake unit 136, a computer vision system 140, a line control system 142, and an obstacle avoidance system 144.

The steering system 132 may operate to adjust a moving direction of the autonomous vehicle. For example, in an embodiment, the steering system may be a steering wheel system. The throttle 134 is configured to control an operating speed of the engine 118 and further control a speed of the autonomous vehicle. The brake unit 136 is configured to control the autonomous vehicle to decelerate. The brake unit 136 may use friction to reduce a rotational speed of the wheel 121. In another embodiment, the brake unit 136 may convert kinetic energy of the wheel 121 into a current. The brake unit 136 may alternatively use another form to reduce a rotational speed of the wheel 121, so as to control the speed of the autonomous vehicle. The computer vision system 140 may operate to process and analyze an image captured by the camera 130, so as to recognize objects and/or features in the ambient environment of the autonomous vehicle. The objects and/or the features may include a traffic signal, a road boundary, and an obstacle. The computer vision system 140 may use an object recognition algorithm, a structure from motion (SFM) algorithm, video tracking, and other computer vision technologies. In some embodiments, the computer vision system 140 may be configured to: draw a map for an environment, trail an object, estimate an object speed, and the like. The line control system 142 is configured to determine a traveling route and a traveling velocity of the autonomous vehicle. In some embodiments, the line control system 142 may include a horizontal planning module 1421 and a vertical planning module 1422. The horizontal planning module 1421 and the vertical planning module 1422 are respectively configured to determine the traveling route and the traveling velocity of the autonomous vehicle based on data from the obstacle avoidance system 144, the GPS 122, and one or more predetermined maps. The obstacle avoidance system 144 is configured to: identify, evaluate, and avoid, or pass, in another manner, obstacles in the environment of the autonomous vehicle. The obstacles may be specifically represented as an actual obstacle and a virtual moving object that may collide with the autonomous vehicle. In an instance, the control system 106 may add or include a component as replacement other than the components shown and described. Alternatively, the control system may not include some of the components shown above.

The autonomous vehicle interacts with an external sensor, another vehicle, another computer system, or a user by using the peripheral device 108. The peripheral device 108 may include a wireless communication system 146, a vehicle-mounted computer 148, a microphone 150, and/or a speaker 152. In some embodiments, the peripheral device 108 provides a means for the user of the autonomous vehicle to interact with the user interface 116. For example, the vehicle-mounted computer 148 may provide information for the user of the autonomous vehicle. The user interface 116 may further operate the vehicle-mounted computer 148 to receive an input of the user. The vehicle-mounted computer 148 may be operated by using a touchscreen. In other cases, the peripheral device 108 may provide means used by the autonomous vehicle to communicate with another device located in a vehicle. For example, the microphone 150 may receive audio (for example, a voice command or another audio input) from the user of the autonomous vehicle. Likewise, the speaker 152 may output audio to the user of the autonomous vehicle. The wireless communication system 146 may communicate wirelessly with one or more devices directly or through a communication network. For example, the wireless communication system 146 may use 3G cellular communication such as CDMA, EVDO, or GSM/GPRS, 4G cellular communication such as LTE, or 5G cellular communication, or perform communication through a 5G cellular network. The wireless communication system 146 may perform communication by using a wireless local area network (WLAN). In some embodiments, the wireless communication system 146 may directly communicate with a device by using an infrared link, Bluetooth, or ZigBee. Other wireless protocols, for example, various vehicle communication systems such as the wireless communication system 146, may include one or more dedicated short range communication (DSRC) devices, which may include public and/or private data communication between vehicles and/or roadside stations.

The power supply 110 may supply power to the components of the autonomous vehicle. In an embodiment, the power supply 110 may be a rechargeable lithium-ion or lead-acid battery. One or more battery packs of such a battery may be configured as a power supply to supply power to the components of the autonomous vehicle. In some embodiments, the power supply 110 and the energy source 119 may be implemented together, for example, in some pure electric vehicles.

Some or all functions of the autonomous vehicle are controlled by the computer system 112. The computer system 112 may include at least one processor 1603. The processor 1603 executes instructions 115 stored in a non-transitory computer-readable medium such as the memory 1604. The computer system 112 may alternatively be a plurality of computing devices that control individual components or subsystems of the autonomous vehicle in a distributed manner. Specific forms of the processor 1603 and the memory 1604 are not described herein again. In the aspects described herein, the processor 1603 may be located far away from the autonomous vehicle and perform wireless communication with the autonomous vehicle. In other aspects, some of the processes described herein are performed on the processor 1603 disposed inside the autonomous vehicle, while others are performed by a remote processor. The processes include necessary steps for performing a single operation.

In some embodiments, the memory 1604 may include the instructions 115 (for example, program logic), and the instructions 115 may be executed by the processor 1603 to perform various functions of the autonomous vehicle, including those functions described above. The memory 1604 may further include additional instructions, including instructions used to send data to, receive data from, interact with, and/or control one or more of the travel system 102, the sensor system 104, the control system 106, and the peripheral device 108. In addition to the instructions 115, the memory 1604 may further store data, such as a road map, route information, a location, a direction, a speed, and other vehicle data of the vehicle, and other information. Such information may be used by the autonomous vehicle and the computer system 112 when the autonomous vehicle operates in an autonomous mode, a semi-autonomous mode, and/or a manual mode. The user interface 116 is configured to provide information for or receive information from the user of the autonomous vehicle. Optionally, the user interface 116 may include one or more input/output devices within a set of peripheral devices 108, such as the wireless communication system 146, the vehicle-mounted computer 148, the microphone 150, and the speaker 152.

The computer system 112 may control functions of the autonomous vehicle based on input received from each of the subsystems (for example, the travel system 102, the sensor system 104, and the control system 106) and from the user interface 116. For example, the computer system 112 may use input from the control system 106 to control the steering system 132 to avoid an obstacle detected by the sensor system 104 and the obstacle avoidance system 144. In some embodiments, the computer system 112 may operable to provide control over many aspects of the autonomous vehicle and the subsystems of the autonomous vehicle.

Optionally, one or more of the foregoing components may be installed separately from or associated with the autonomous vehicle. For example, the memory 1604 may be partially or completely separated from the autonomous vehicle. The foregoing components may be communicatively coupled together in a wired and/or wireless manner.

Optionally, the foregoing components are merely examples. During actual application, components in the foregoing modules may be added or removed based on an actual requirement. FIG. 1 should not be construed as a limitation on this embodiment of this application. An autonomous vehicle driving on a road, such as the autonomous vehicle, may identify an object in an ambient environment of the autonomous vehicle to determine an adjustment to a current speed. The object may be another vehicle, a traffic control device, or another type of object. In some examples, the autonomous vehicle may independently consider each identified object, and may determine a to-be-adjusted speed of the autonomous vehicle based on characteristics of each identified object, such as a current speed of the object, acceleration of the object, and a distance between the object and the autonomous vehicle.

Optionally, the autonomous vehicle or a computing device associated with the autonomous vehicle (for example, the computer system 112, the computer vision system 140, or the memory 1604 in FIG. 1) may predict behavior of the identified object based on a characteristic of the identified object and a state of the ambient environment (for example, traffic, rain, and ice on a road). Optionally, identified objects depend on behavior of each other, and therefore all the identified objects may be considered together to predict behavior of a single identified object. The autonomous vehicle can adjust the speed of the autonomous vehicle based on the predicted behavior of the identified object. In other words, the autonomous vehicle can determine, based on the predicted behavior of the object, a specific stable state (for example, acceleration, deceleration, or stop) to which the vehicle needs to be adjusted. In this process, another factor may also be considered to determine the speed of the autonomous vehicle, for example, a horizontal location of the autonomous vehicle on a road on which the autonomous vehicle travels, a curvature of the road, and proximity between a static object and a dynamic object. In addition to providing an instruction for adjusting the speed of the autonomous vehicle, the computing device may provide an instruction for modifying a steering angle of the autonomous vehicle, so that the autonomous vehicle follows a given trajectory and/or maintains safe transverse and longitudinal distances from an object (for example, a car in an adjacent lane on the road) next to the autonomous vehicle.

The autonomous vehicle may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in this embodiment of the present invention.

In this embodiment, the processor 1603 performs, by using the application processor 16031, the image processing method performed by the vehicle equipped with the image processing apparatus in the embodiments corresponding to FIG. 3A to FIG. 7, or performs the image processing method performed by the vehicle equipped with the image processing apparatus in the embodiment corresponding to FIG. 11A to FIG. 11C. For specific implementations and beneficial effects of performing the image processing method by the application processor 16031, refer to descriptions in the method embodiments corresponding to FIG. 3A to FIG. 7, or refer to descriptions in the method embodiments corresponding to FIG. 11A to FIG. 11C. Details are not described herein again.

Figure 18:
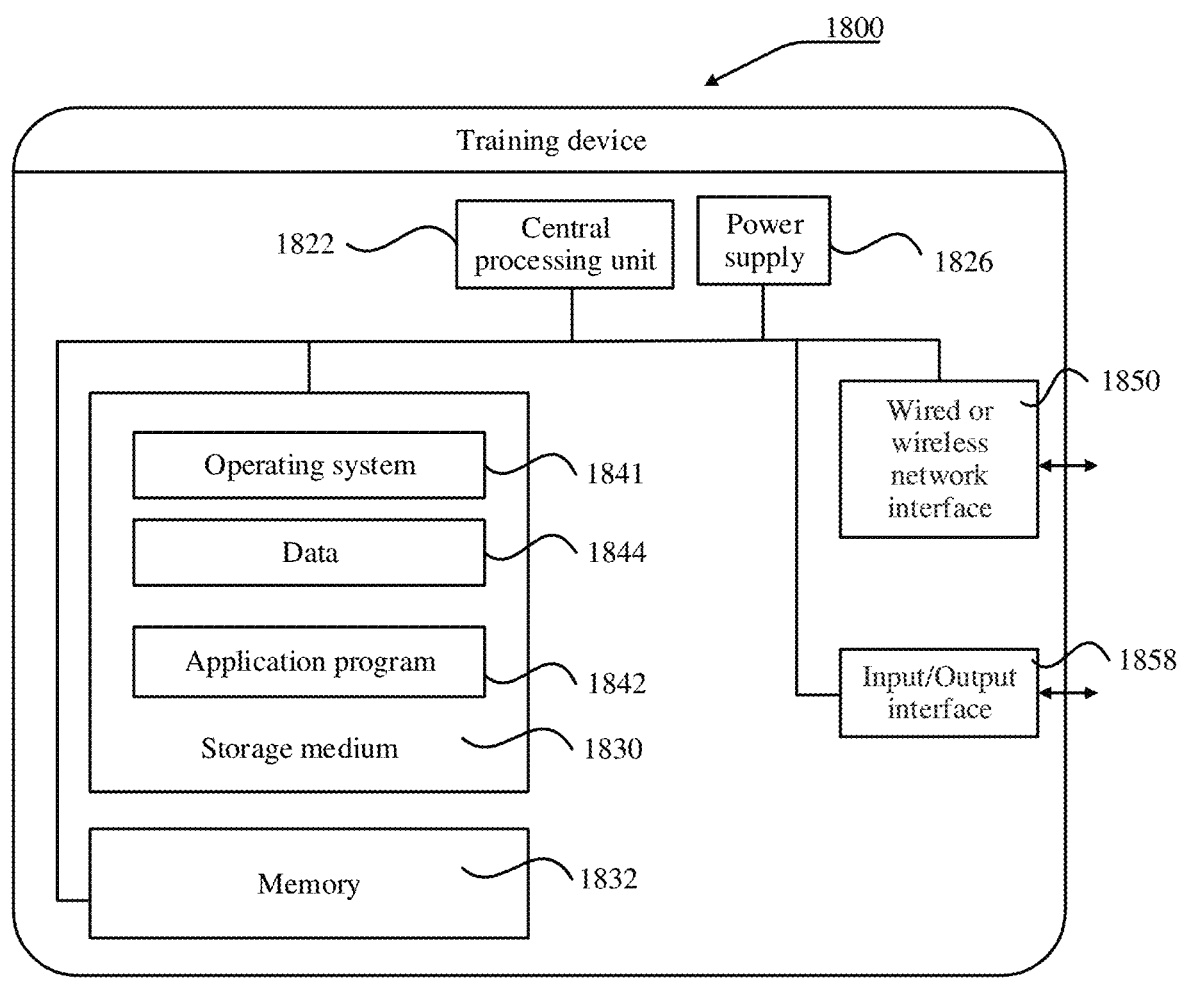
FIG. 18 is a schematic diagram of a structure of a training device according to an embodiment of this application.

An embodiment of this application further provides a training device. FIG. 18 is a schematic diagram of a structure of a training device according to an embodiment of this application. The network training apparatus 1500 described in the embodiment corresponding to FIG. 15 may be deployed on a training device 1800, to implement functions of the training device in the embodiments corresponding to FIG. 8 to FIG. 10. Specifically, the training device 1800 is implemented by one or more servers. The training device 1800 may vary greatly due to different configurations or performance, and may include one or more central processing units (CPU) 1822 (for example, one or more processors), a memory 1832, and one or more storage medium 1830 (for example, one or more mass storage devices) that store an application program 1842 or data 1844. The memory 1832 and the storage medium 1830 may be transient storage or persistent storage. A program stored in the storage medium 1830 may include one or more modules (not shown in the figure), and each module may include a series of instruction operations for the training device. Further, the central processing unit 1822 may be configured to communicate with the storage medium 1830, and perform, on the training device 1800, the series of instruction operations in the storage medium 1830.

The training device 1800 may further include one or more power supplies 1826, one or more wired or wireless network interfaces 1850, one or more input/output interfaces 1858, and/or one or more operating systems 1841, such as Windows Server™, Mac OS X™, Unix™, Linux™, and FreeBSD™.

In this embodiment, the central processing unit 1822 is configured to perform the network training method performed by the training device in the embodiments corresponding to FIG. 8 to FIG. 10. For specific implementations and beneficial effects of performing the network training method by the central processing unit 1822, refer to descriptions in the method embodiments corresponding to FIG. 8 to FIG. 10. Details are not described herein again.

An embodiment of this application further provides a computer-readable storage medium. The computer-readable storage medium stores a program. When the program is run on a computer, the computer is enabled to perform the steps performed by the vehicle equipped with the image processing apparatus in the method described in the embodiments shown in FIG. 3A to FIG. 7, or the computer is enabled to perform the steps performed by the vehicle equipped with the image processing apparatus in the method described in the embodiment shown in FIG. 11A to FIG. 11C, or the computer is enabled to perform the steps performed by the training device in the methods described in the embodiments shown in FIG. 8 to FIG. 10.

An embodiment of this application further provides a computer program product. When the computer program product runs on a computer, the computer is enabled to perform the steps performed by the vehicle equipped with the image processing apparatus in the method described in the embodiments shown in FIG. 3A to FIG. 7, or the computer is enabled to perform the steps performed by the vehicle equipped with the image processing apparatus in the method described in the embodiment shown in FIG. 11A to FIG. 11C, or the computer is enabled to perform the steps performed by the training device in the methods described in the embodiments shown in FIG. 8 to FIG. 10.

An embodiment of this application further provides a circuit system. The circuit system includes a processing circuit. The processing circuit is configured to perform the steps performed by the vehicle equipped with the image processing apparatus in the method described in the embodiments shown in FIG. 3A to FIG. 7, or perform the steps performed by the vehicle equipped with the image processing apparatus in the method described in the embodiment shown in FIG. 11A to FIG. 11C, or perform the steps performed by the training device in the methods described in the embodiments shown in FIG. 8 to FIG. 10.

The vehicle equipped with the image processing apparatus, the training device, the image processing apparatus, or the network training apparatus provided in embodiments of this application may be specifically a chip. The chip includes a processing unit and a communication unit. The processing unit may be, for example, a processor, and the communication unit may be, for example, an input/output interface, a pin, a circuit, or the like. The processing unit may execute computer-executable instructions stored in a storage unit, so that the chip performs the steps performed by the vehicle equipped with the image processing apparatus in the method described in the embodiments shown in FIG. 3A to FIG. 7, or performs the steps performed by the vehicle equipped with the image processing apparatus in the method described in the embodiment shown in FIG. 11A to FIG. 11C, or performs the steps performed by the training device in the methods described in the embodiments shown in FIG. 8 to FIG. 10. Optionally, the storage unit is a storage unit in the chip, for example, a register or a cache; or the storage unit may be a storage unit that is in the radio access device end and that is located outside the chip, for example, a read-only memory (ROM), another type of static storage device that can store static information and instructions, or a random access memory (RAM).

Figure 19:
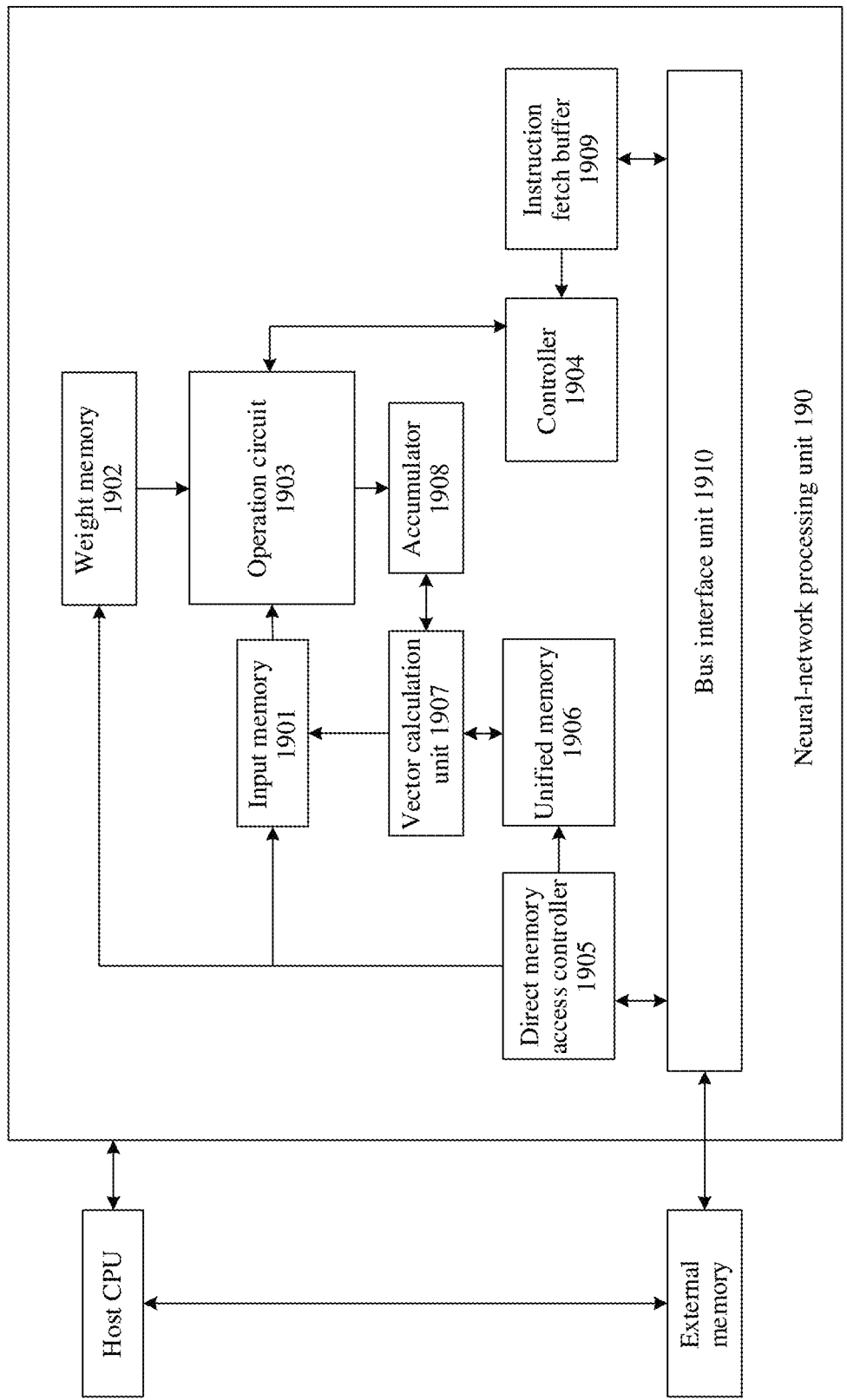
FIG. 19 is a schematic diagram of a structure of a chip according to an embodiment of this application.

Specifically, refer to FIG. 19. FIG. 19 is a schematic diagram of a structure of a chip according to an embodiment of this application. The chip may be represented as a neural-network processing unit (NPU) 190. The NPU 190 is mounted to a host CPU as a coprocessor, and the host CPU allocates a task. A core part of the NPU is an operation circuit 1903, and a controller 1904 controls the operation circuit 2103 to extract matrix data in a memory and perform a multiplication operation.

In some implementations, the operation circuit 1903 internally includes a plurality of processing units (PEs). In some implementations, the operation circuit 1903 is a two-dimensional systolic array. The operation circuit 1903 may alternatively be a one-dimensional systolic array or another electronic circuit capable of performing mathematical operations such as multiplication and addition. In some implementations, the operation circuit 1903 is a general-purpose matrix processor.

For example, it is assumed that there is an input matrix A, a weight matrix B, and an output matrix C. The operation circuit fetches data corresponding to the matrix B from a weight memory 1902, and buffers the data on each PE in the operation circuit. The operation circuit fetches data of the matrix A from an input memory 1901 to perform a matrix operation on the matrix B, to obtain a partial result or a final result of the matrix, which is stored in an accumulator 1908.

A unified memory 1906 is configured to store input data and output data. Weight data is directly transferred to the weight memory 1902 by using a direct memory access controller (DMAC) 1905. The input data is also transferred to the unified memory 1906 by using the DMAC.

A BIU, bus interface unit, that is, a bus interface unit 1910, is configured for interaction between an AXI bus and the DMAC and interaction between the AXI bus and an instruction fetch buffer (IFB) 1909.

The bus interface unit 1910 (BIU for short) is configured to obtain an instruction from an external memory by the instruction fetch buffer 1909, and is further configured to obtain original data of the input matrix A or the weight matrix B from the external memory by the direct memory access controller 1905.

The DMAC is mainly configured to transfer input data in the external memory DDR to the unified memory 1906, transfer weight data to the weight memory 1902, or transfer input data to the input memory 1901.

A vector calculation unit 1907 includes a plurality of operation processing units. When necessary, further processing is performed on output of the operation circuit, such as vector multiplication, vector addition, an exponential operation, a logarithmic operation, or value comparison. The vector calculation unit 1907 is mainly configured to perform network computing, such as batch normalization, pixel-level summation, and upsampling of a feature plane, on a non-convolutional/fully-connected layer in a neural network.

In some implementations, the vector calculation unit 1907 can store a processed output vector in the unified memory 1906. For example, the vector calculation unit 1907 may apply a linear function or a non-linear function to the output of the operation circuit 1903, for example, perform linear interpolation on a feature plane extracted at a convolutional layer. For another example, the linear function or the non-linear function is applied to a vector of an accumulated value to generate an activation value. In some implementations, the vector calculation unit 1907 generates a normalized value, a pixel-level summation value, or both. In some implementations, the processed output vector can be used as an activation input into the operation circuit 1903, for example, to be used in a subsequent layer in the neural network.

The instruction fetch buffer 1909 connected to the controller 1904 is configured to store instructions used by the controller 1904.

The unified memory 1906, the input memory 1901, the weight memory 1902, and the instruction fetch buffer 1909 are all on-chip memories. The external memory is private for the NPU hardware architecture.

An operation at each layer in a recurrent neural network may be performed by the operation circuit 1903 or the vector calculation unit 1907.

The processor mentioned anywhere above may be a general-purpose central processing unit, a microprocessor, an ASIC, or one or more integrated circuits that are configured to control program execution of the method according to the first aspect.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected based on actual needs to achieve the objectives of the solutions of embodiments. In addition, in the accompanying drawings of the apparatus embodiments provided by this application, connection relationships between modules indicate that the modules have communication connections with each other, which may be specifically implemented as one or more communication buses or signal cables.

According to the descriptions of the foregoing implementations, a person skilled in the art may clearly understand that this application may be implemented by software in addition to necessary universal hardware, or by dedicated hardware, including an application-specific integrated circuit, a dedicated CLU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions in this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the methods in embodiments of this application.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

What is claimed is:

1. An image processing method, wherein the method comprising:
   obtaining a first image comprising a first vehicle;
   inputting the first image into an image processing network to obtain a first result output by the image processing network, wherein when a side face of the first vehicle is exposed in the first image, the first result comprises location information of a two-dimensional (2D) bounding frame of the first vehicle, coordinates of a wheel of the first vehicle, and a first angle of the first vehicle; the first angle of the first vehicle indicates an included angle between a side line of the first vehicle and a first axis of the first image; the side line of the first vehicle is an intersection line between the exposed side face of the first vehicle and a ground plane on which the first vehicle is located; and the first axis of the first image is parallel to one side of the first image; and
   generating location information of a three-dimensional (3D) outer bounding box of the first vehicle based on the location information of the 2D bounding frame of the first vehicle, the coordinates of the wheel, and the first angle, wherein the location information of the 3D outer bounding box of the first vehicle comprises coordinates of at least two first points, the at least two first points are all located on a side of the 3D outer bounding box of the first vehicle, the side of the 3D outer bounding box of the first vehicle is located using two first points in the at least two first points, and the 3D outer bounding box of the first vehicle is located using the coordinates of the at least two first points.

2. The method according to claim 1, wherein when only the side face of the first vehicle is exposed in the first image, the at least two first points comprise two intersection points between the side line of the first vehicle and the 2D bounding frame of the first vehicle.

3. The method according to claim 2, wherein the generating location information of a 3D outer bounding box of the first vehicle based on the location information of the 2D bounding frame, the coordinates of the wheel, and the first angle comprises:

generating location information of the side line of the first vehicle based on the coordinates of the wheel of the first vehicle and the first angle of the first vehicle; and
generating coordinates based on the location information of the side line of the first vehicle and the location information of the 2D bounding frame of the first vehicle, to obtain the coordinates of the at least two first points.

4. The method according to claim 1, wherein when the side face and a main face of the first vehicle are exposed in the first image, the first result further comprises location information of a boundary of the first vehicle and a second angle of the first vehicle; the boundary is a boundary between the side face and the main face; the main face of the first vehicle is a front face or rear face of the first vehicle; the second angle of the first vehicle indicates an included angle between a main side line of the first vehicle and the first axis of the first image; and the main side line of the first vehicle is an intersection line between the exposed main face of the first vehicle and the ground plane on which the first vehicle is located; and
   the at least two first points comprise a first intersection point, a second intersection point, and a third intersection point; the first intersection point is an intersection point between the side line of the first vehicle and the boundary of the first vehicle, and the first intersection point is a vertex of the 3D outer bounding box of the first vehicle; the second intersection point is an intersection point between the side line of the first vehicle and the 2D bounding frame of the first vehicle; and the third intersection point is an intersection point between the main side line of the first vehicle and the 2D bounding frame of the first vehicle.

5. The method according to claim 4, wherein the generating location information of a three-dimensional (3D) outer bounding box of the first vehicle based on the location information of the 2D bounding frame of the first vehicle, the coordinates of the wheel, and the first angle comprises:
   generating location information of the side line of the first vehicle based on the coordinates of the wheel of the first vehicle and the first angle of the first vehicle;
   generating coordinates of the first intersection point based on the location information of the side line of the first vehicle and the location information of the boundary of the first vehicle;
   generating coordinates of the second intersection point based on the location information of the side line of the first vehicle and the location information of the 2D bounding frame of the first vehicle;
   generating location information of the main side line of the first vehicle based on the coordinates of the first intersection point and the second angle of the first vehicle; and
   generating coordinates of the third intersection point based on the location information of the main side line of the first vehicle and the location information of the 2D bounding frame of the first vehicle.

6. The method according to claim 1, further comprising:
   when the side face of the first vehicle is exposed in the first image, generating an orientation angle of the first vehicle relative to a vehicle equipped with an image processing apparatus based on coordinates of a first point.

7. The method according to claim 6, wherein before the generating an orientation angle based on coordinates of a first point, the method further comprises:

generating a distance between the first point and the vehicle equipped with the image processing apparatus based on the coordinates of the first point and a ground plane assumption principle; and the generating an orientation angle based on coordinates of a first point comprises:

upon determining, based on the distance between the first point and the vehicle equipped with the image processing apparatus, that a distance between the first vehicle and the vehicle equipped with the image processing apparatus does not exceed a preset-threshold, generating the orientation angle based on the coordinates of the first point according to a first calculation rule; or upon determining, based on the distance between the first point and the vehicle equipped with the image processing apparatus, that a distance between the first vehicle and the vehicle equipped with the image processing apparatus exceeds a threshold, generating the orientation angle based on the coordinates of the first point according to a second calculation rule, wherein the second calculation rule and the first calculation rule are different.

8. The method according to claim 7, wherein when a distance between any one of the at least two first points and the vehicle equipped with the image processing apparatus does not exceed the threshold, it is determined that the distance between the first vehicle and the vehicle equipped with the image processing apparatus does not exceed the threshold; or when a distance between any one of the at least two first points and the vehicle equipped with the image processing apparatus exceeds the threshold, it is determined that the distance between the first vehicle and the vehicle equipped with the image processing apparatus exceeds the threshold.

9. The method according to claim 7, wherein the generating the orientation angle based on the coordinates of the first point according to a first calculation rule comprises:

generating three-dimensional coordinates of the first point in a vehicle body coordinate system based on the coordinates of the first point and the ground plane assumption principle, wherein a coordinate system origin of the vehicle body coordinate system is located inside the vehicle equipped with the image processing apparatus; and generating the orientation angle based on the three-dimensional coordinates of the first point.

10. The method according to claim 7, wherein the generating the orientation angle based on the coordinates of the first point according to a second calculation rule comprises:

generating the location information of the side line of the first vehicle based on the coordinates of the first point and the first angle of the first vehicle, and generating coordinates of a vanishing point based on the location information of the side line of the first vehicle and location information of a vanishing line of the first image, wherein the vanishing point is an intersection point between the side line of the first vehicle and the vanishing line of the first image; and generating the orientation angle based on the coordinates of the vanishing point and a two-point perspective principle.

11. An image processing apparatus, comprising at least one processor and at least one memory storing instructions that, when executed by the at least one processor, cause the image processing apparatus to:

obtain a first image including a first vehicle;

input the first image into an image processing network to obtain a first result output by the image processing network, wherein when a side face of the first vehicle is exposed in the first image, the first result comprises location information of a two-dimensional (2D) bounding frame of the first vehicle, coordinates of a wheel of the first vehicle, and a first angle of the first vehicle; the first angle of the first vehicle indicates an included angle between a side line of the first vehicle and a first axis of the first image; the side line of the first vehicle is an intersection line between the exposed side face of the first vehicle and a ground plane on which the first vehicle is located; and the first axis of the first image is parallel to one side of the first image; and generate location information of a three-dimensional (3D) outer bounding box of the first vehicle based on the location information of the 2D bounding frame of the first vehicle, the coordinates of the wheel, and the first angle, wherein the location information of the 3D outer bounding box of the first vehicle comprises coordinates of at least two first points, the at least two first points are all located on a side of the 3D outer bounding box of the first vehicle, the side of the 3D outer bounding box of the first vehicle is located using two first points in the at least two first points, and the 3D outer bounding box of the first vehicle is located using the coordinates of the at least two first points.

12. The apparatus according to claim 11, wherein when only the side face of the first vehicle is exposed in the first image, the at least two first points comprise two intersection points between the side line of the first vehicle and the 2D bounding frame of the first vehicle.

13. The apparatus according to claim 12, wherein the generation of the location information of the 3D outer bounding box of the first vehicle based on the location information of the 2D bounding frame of the first vehicle, the coordinates of the wheel, and the first angle comprises:

generating location information of the side line of the first vehicle based on the coordinates of the wheel of the first vehicle and the first angle of the first vehicle; and generating coordinates based on the location information of the side line of the first vehicle and the location information of the 2D bounding frame of the first vehicle, to obtain the coordinates of the at least two first points.

14. The apparatus according to claim 11, wherein when the side face and a main face of the first vehicle are exposed in the first image, the first result further comprises location information of a boundary of the first vehicle and a second angle of the first vehicle; the boundary is a boundary between the side face and the main face; the main face of the first vehicle is a front face or rear face of the first vehicle; the second angle of the first vehicle indicates an included angle between a main side line of the first vehicle and the first axis of the first image; and the main side line of the first vehicle is an intersection line between the exposed main face of the first vehicle and the ground plane on which the first vehicle is located; and the at least two first points comprise a first intersection point, a second intersection point, and a third intersection point; the first intersection point is an intersection point between the side line of the first vehicle and the boundary of the first vehicle, and the first intersection point is a vertex of the 3D outer bounding box of the first vehicle; the second intersection point is an intersection point between the side line of the first vehicle and the 2D bounding frame of the first vehicle; and the third intersection point is an intersection point between the main side line of the first vehicle and the 2D bounding frame of the first vehicle.

15. The apparatus according to claim 14, wherein the generation of the location information of the 3D outer-boundary box of the first vehicle based on the location information of the 2D bounding frame of the first vehicle, the coordinates of the wheel, and the first angle comprises:
generating location information of the side line of the first vehicle based on the coordinates of the wheel of the first vehicle and the first angle of the first vehicle;
generating coordinates of the first intersection point based on the location information of the side line of the first vehicle and the location information of the boundary of the first vehicle;
generating coordinates of the second intersection point based on the location information of the side line of the first vehicle and the location information of the 2D bounding frame of the first vehicle;
generating location information of the main side line of the first vehicle based on the coordinates of the first intersection point and the second angle of the first vehicle; and
generating coordinates of the third intersection point based on the location information of the main side line of the first vehicle and the location information of the 2D bounding frame of the first vehicle.

16. The apparatus according to claim 11, wherein the instructions, when executed by the at least one processor, further cause the apparatus to:
when the side face of the first vehicle is exposed in the first image, generate an orientation angle of the first vehicle relative to a vehicle equipped with the image processing apparatus based on coordinates of a first point.

17. The apparatus according to claim 16, wherein the instructions, when executed by the at least one processor, further cause the apparatus to generate a distance between the first point and the vehicle equipped with the image processing apparatus based on the coordinates of the first point and a ground plane assumption principle; and
the generation of the orientation angle based on the coordinates of the first point comprises:
upon determining, based on the distance between the first point and the vehicle equipped with the image processing apparatus, that a distance between the first vehicle and the vehicle equipped with the image processing apparatus does not exceed a threshold, generating the orientation angle based on the coordinates of the first point according to a first calculation rule; or
upon determining, based on the distance between the first point and the vehicle equipped with the image processing apparatus, that a distance between the first vehicle and the vehicle equipped with the image processing apparatus exceeds a threshold, generating the orientation angle based on the coordinates of the first point according to a second calculation rule, wherein the second calculation rule and the first calculation rule are different.

18. The apparatus according to claim 17, wherein
when a distance between any one of the at least two first points and the vehicle equipped with the image processing apparatus does not exceed the threshold, it is determined that the distance between the first vehicle and the vehicle equipped with the image processing apparatus does not exceed the threshold; or
when a distance between any one of the at least two first points and the vehicle equipped with the image processing apparatus exceeds the threshold, it is determined that the distance between the first vehicle and the vehicle equipped with the image processing apparatus exceeds the threshold.

19. The apparatus according to claim 17, wherein the generation of the orientation angle based on the coordinates of the first point according to the first calculation rule comprises:
generating three-dimensional coordinates of the first point in a vehicle body coordinate system based on the coordinates of the first point and the ground plane assumption principle, wherein a coordinate system origin of the vehicle body coordinate system is located inside the vehicle equipped with the image processing apparatus; and
generating the orientation angle based on the three-dimensional coordinates of the first point.

20. A non-transitory computer-readable storage medium, storing a program that, when executed by a computer, enable the computer to perform operations comprising:
obtaining a first image comprising a first vehicle;
inputting the first image into an image processing network to obtain a first result output by the image processing network, wherein when a side face of the first vehicle is exposed in the first image, the first result comprises location information of a two-dimensional (2D) bounding frame of the first vehicle, coordinates of a wheel of the first vehicle, and a first angle of the first vehicle; the first angle of the first vehicle indicates an included angle between a side line of the first vehicle and a first axis of the first image; the side line of the first vehicle is an intersection line between the exposed side face of the first vehicle and a ground plane on which the first vehicle is located; and the first axis of the first image is parallel to one side of the first image; and
generating location information of a three-dimensional (31) outer bounding box of the first vehicle based on the location information of the 2D bounding frame of the first vehicle, the coordinates of the wheel, and the first angle, wherein the location information of the 3D outer bounding box of the first vehicle comprises coordinates of at least two first points, the at least two first points are all located on a side of the 3D outer bounding box of the first vehicle, the side of the 3D outer bounding box of the first vehicle is located using two first points in the at least two first points, and the 3D outer bounding box of the first vehicle is located using the coordinates of the at least two first points.

\* \* \* \* \*

UNITED STATES PATENT AND TRADEMARK OFFICE
CERTIFICATE OF CORRECTION

PATENT NO. : 12,223,740 B2
APPLICATION NO. : 17/975922
DATED : February 11, 2025
INVENTOR(S) : Xinhai Zhao et al.

Page 1 of 1

It is certified that error appears in the above-identified patent and that said Letters Patent is hereby corrected as shown below:

In the Specification

Column 65, Line 35, change "EVDO" to --EVD0--;

In the Claims

Column 71, Claim 1, Lines 28 and 29, change "wherein the method comprising" to --comprising--;

Column 73, Claim 7, Line 11, change "a preset-threshold" to --a threshold--;

Column 75, Claim 15, Lines 5 and 6, change "outer-boundary" to --outer bounding--; and Column 76, Claim 20, Line 47, change "(31)" to --(3D)--.

Signed and Sealed this
Eleventh Day of March, 2025

Coke Morgan Stewart
*Acting Director of the United States Patent and Trademark Office*